US008191049B2

(12) United States Patent
Levine et al.

(10) Patent No.: US 8,191,049 B2
(45) Date of Patent: *May 29, 2012

(54) METHOD AND APPARATUS FOR MAINTAINING PERFORMANCE MONITORING STRUCTURES IN A PAGE TABLE FOR USE IN MONITORING PERFORMANCE OF A COMPUTER PROGRAM

(75) Inventors: Frank Eliot Levine, Austin, TX (US); Christopher Michael Richardson, Austin, TX (US); Edward John Silha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

This patent is subject to a terminal disclaimer.

(21) Appl. No.: 12/062,416

(22) Filed: Apr. 3, 2008

(65) Prior Publication Data
US 2008/0189687 A1 Aug. 7, 2008

Related U.S. Application Data

(63) Continuation of application No. 10/757,250, filed on Jan. 14, 2004, now Pat. No. 7,526,757.

(51) Int. Cl.
*G06F 9/45* (2006.01)
(52) U.S. Cl. ......... 717/127; 717/130; 717/131; 717/141
(58) Field of Classification Search .................. None
See application file for complete search history.

(56) References Cited

U.S. PATENT DOCUMENTS

| | | | |
|---|---|---|---|
| 3,707,725 A | 12/1972 | Dellheim | |
| 4,034,353 A | 7/1977 | Denny et al. | |
| 4,145,735 A | 3/1979 | Soga | |
| 4,291,371 A | 9/1981 | Holtey | |
| 4,316,245 A | 2/1982 | Luu et al. | |
| 4,794,472 A | 12/1988 | Doyama | |
| 4,821,178 A | 4/1989 | Levin et al. | |
| 4,825,359 A | 4/1989 | Ohkami et al. | |
| 5,051,944 A | 9/1991 | Fetterolf et al. | |
| 5,103,394 A | 4/1992 | Blasciak | |
| 5,113,507 A | 5/1992 | Jaeckel | |
| 5,142,634 A | 8/1992 | Fite et al. | |

(Continued)

FOREIGN PATENT DOCUMENTS
JP 2000029731 12/1999
(Continued)

OTHER PUBLICATIONS
Office Action issued on Sep. 2, 2011 for U.S. Appl. No. 12/185,254.
(Continued)

*Primary Examiner* — Chuck Kendall
(74) *Attorney, Agent, or Firm* — Yee & Associates, P.C.; David A. Mims, Jr.

(57) ABSTRACT

A method and apparatus in a data processing system for measuring events associated with the execution of instructions are provided. Instructions are received at a processor in the data processing system. If a selected indicator is associated with the instruction, counting of each event associated with the execution of the instruction is enabled. In some embodiments, the performance indicators, counters, thresholds, and other performance monitoring structures may be stored in a page table that is used to translate virtual addresses into physical storage addresses. A standard page table is augmented with additional fields for storing the performance monitoring structures. These structures may be set by the performance monitoring application and may be queried and modified as events occur that require access to physical storage.

11 Claims, 23 Drawing Sheets

U.S. PATENT DOCUMENTS

| | | |
|---|---|---|
| 5,151,981 A | 9/1992 | Westcott et al. |
| 5,212,794 A | 5/1993 | Pettis et al. |
| 5,276,833 A | 1/1994 | Auvinen et al. |
| 5,287,481 A | 2/1994 | Lin |
| 5,355,487 A | 10/1994 | Keller et al. |
| 5,394,529 A | 2/1995 | Brown, III et al. |
| 5,404,500 A | 4/1995 | Legvold et al. |
| 5,450,349 A | 9/1995 | Brown et al. |
| 5,537,572 A | 7/1996 | Michelsen et al. |
| 5,544,342 A | 8/1996 | Dean |
| 5,548,762 A | 8/1996 | Creedon et al. |
| 5,555,432 A | 9/1996 | Hinton et al. |
| 5,564,015 A | 10/1996 | Bunnell |
| 5,581,482 A | 12/1996 | Wiedenman et al. |
| 5,581,778 A | 12/1996 | Chin et al. |
| 5,590,352 A | 12/1996 | Zuraski et al. |
| 5,594,864 A | 1/1997 | Trauben |
| 5,603,004 A | 2/1997 | Kurpanek et al. |
| 5,652,858 A | 7/1997 | Okada et al. |
| 5,657,253 A | 8/1997 | Dreyer et al. |
| 5,659,679 A | 8/1997 | Alpert et al. |
| 5,691,920 A | 11/1997 | Levine et al. |
| 5,708,803 A | 1/1998 | Ishimi et al. |
| 5,710,881 A | 1/1998 | Gupta et al. |
| 5,740,413 A | 4/1998 | Alpert et al. |
| 5,745,770 A | 4/1998 | Thangadurai et al. |
| 5,752,062 A | 5/1998 | Gover et al. |
| 5,754,839 A | 5/1998 | Pardo et al. |
| 5,758,168 A | 5/1998 | Mealey et al. |
| 5,761,103 A | 6/1998 | Oakland et al. |
| 5,768,500 A | 6/1998 | Agrawal et al. |
| 5,774,724 A | 6/1998 | Heisch |
| 5,794,028 A | 8/1998 | Tran |
| 5,797,019 A | 8/1998 | Levine et al. |
| 5,805,879 A | 9/1998 | Hervin et al. |
| 5,822,578 A | 10/1998 | Frank et al. |
| 5,822,763 A | 10/1998 | Baylor et al. |
| 5,822,790 A | 10/1998 | Mehrotra |
| 5,857,097 A | 1/1999 | Henzinger et al. |
| 5,875,294 A | 2/1999 | Roth et al. |
| 5,887,159 A | 3/1999 | Burrows |
| 5,896,538 A | 4/1999 | Blandy et al. |
| 5,926,640 A | 7/1999 | Mason et al. |
| 5,928,334 A | 7/1999 | Mandyam et al. |
| 5,930,508 A | 7/1999 | Faraboschi et al. |
| 5,937,437 A | 8/1999 | Roth et al. |
| 5,938,760 A | 8/1999 | Levine et al. |
| 5,938,778 A | 8/1999 | John, Jr. et al. |
| 5,940,618 A | 8/1999 | Blandy et al. |
| 5,950,003 A | 9/1999 | Kaneshiro et al. |
| 5,950,009 A | 9/1999 | Bortnikov et al. |
| 5,966,537 A | 10/1999 | Ravichandran |
| 5,966,538 A | 10/1999 | Granston et al. |
| 5,987,250 A | 11/1999 | Subrahmanyam |
| 5,987,598 A | 11/1999 | Levine et al. |
| 5,991,708 A | 11/1999 | Levine et al. |
| 6,006,033 A | 12/1999 | Heisch |
| 6,009,514 A | 12/1999 | Henzinger et al. |
| 6,026,235 A | 2/2000 | Shaughnessy |
| 6,067,644 A | 5/2000 | Levine et al. |
| 6,070,009 A | 5/2000 | Dean et al. |
| 6,094,709 A | 7/2000 | Baylor et al. |
| 6,101,524 A | 8/2000 | Choi et al. |
| 6,105,129 A | 8/2000 | Meier et al. |
| 6,112,317 A | 8/2000 | Berc et al. |
| 6,119,075 A | 9/2000 | Dean et al. |
| 6,134,676 A | 10/2000 | VanHuben et al. |
| 6,145,077 A | 11/2000 | Sidwell et al. |
| 6,145,123 A | 11/2000 | Torrey et al. |
| 6,148,321 A | 11/2000 | Hammond |
| 6,149,318 A | 11/2000 | Chase et al. |
| 6,161,187 A | 12/2000 | Mason et al. |
| 6,163,840 A | 12/2000 | Chrysos et al. |
| 6,185,652 B1 | 2/2001 | Shek et al. |
| 6,185,671 B1 | 2/2001 | Pentovski et al. |
| 6,189,072 B1 | 2/2001 | Levine et al. |
| 6,189,141 B1 | 2/2001 | Benitez et al. |
| 6,189,142 B1 | 2/2001 | Johnston et al. |
| 6,192,513 B1 | 2/2001 | Subrahmanyam |
| 6,199,204 B1 | 3/2001 | Donohue |
| 6,202,207 B1 | 3/2001 | Donohue |
| 6,206,584 B1 | 3/2001 | Hastings |
| 6,223,338 B1 | 4/2001 | Smolders |
| 6,233,679 B1 | 5/2001 | Holmberg |
| 6,237,141 B1 | 5/2001 | Holzle et al. |
| 6,240,510 B1 | 5/2001 | Yeh et al. |
| 6,243,804 B1 | 6/2001 | Cheng |
| 6,247,113 B1 | 6/2001 | Jaggar |
| 6,253,338 B1 | 6/2001 | Smolders |
| 6,256,771 B1 | 7/2001 | O'Neil et al. |
| 6,256,775 B1 | 7/2001 | Flynn |
| 6,275,893 B1 | 8/2001 | Bonola |
| 6,285,974 B1 | 9/2001 | Mandyam et al. |
| 6,286,132 B1 | 9/2001 | Tanaka et al. |
| 6,324,689 B1 | 11/2001 | Lowney et al. |
| 6,330,662 B1 | 12/2001 | Patel et al. |
| 6,349,406 B1 | 2/2002 | Levine et al. |
| 6,351,844 B1 | 2/2002 | Bala |
| 6,374,364 B1 | 4/2002 | McElroy et al. |
| 6,378,064 B1 | 4/2002 | Edwards et al. |
| 6,381,679 B1 | 4/2002 | Matsubara et al. |
| 6,408,386 B1 | 6/2002 | Hammond et al. |
| 6,430,741 B1 | 8/2002 | Mattson, Jr. et al. |
| 6,442,585 B1 | 8/2002 | Dean et al. |
| 6,446,029 B1 | 9/2002 | Davidson et al. |
| 6,460,135 B1 | 10/2002 | Suganuma |
| 6,480,938 B2 | 11/2002 | Vondran, Jr. |
| 6,480,966 B1 | 11/2002 | Rawson, III |
| 6,505,292 B1 | 1/2003 | Witt |
| 6,539,458 B2 | 3/2003 | Holmberg |
| 6,542,985 B1 | 4/2003 | Johnson et al. |
| 6,549,959 B1 | 4/2003 | Yates et al. |
| 6,549,998 B1 | 4/2003 | Pekarich et al. |
| 6,560,693 B1 | 5/2003 | Puzak et al. |
| 6,574,727 B1 | 6/2003 | Davidson et al. |
| 6,594,820 B1 | 7/2003 | Ungar |
| 6,598,153 B1 | 7/2003 | Flachs et al. |
| 6,601,233 B1 | 7/2003 | Underwood |
| 6,631,514 B1 | 10/2003 | Le |
| 6,636,950 B1 | 10/2003 | Mithal et al. |
| 6,647,301 B1 | 11/2003 | Sederlund et al. |
| 6,662,295 B2 | 12/2003 | Yamaura |
| 6,681,387 B1 | 1/2004 | Hwu et al. |
| 6,687,794 B2 | 2/2004 | Malik |
| 6,708,296 B1 | 3/2004 | Gover et al. |
| 6,721,875 B1 | 4/2004 | McCormick et al. |
| 6,735,666 B1 | 5/2004 | Koning |
| 6,757,771 B2 | 6/2004 | Christie |
| 6,772,322 B1 | 8/2004 | Merchant et al. |
| 6,775,728 B2 | 8/2004 | Zimmer et al. |
| 6,775,825 B1 | 8/2004 | Grumann et al. |
| 6,782,454 B1 | 8/2004 | Damron |
| 6,820,155 B1 | 11/2004 | Ito |
| 6,832,296 B2 | 12/2004 | Hooker |
| 6,842,850 B2 | 1/2005 | Ganapathy et al. |
| 6,848,029 B2 | 1/2005 | Coldewey |
| 6,848,030 B2 | 1/2005 | Tokar et al. |
| 6,865,666 B2 | 3/2005 | Yoshida et al. |
| 6,871,298 B1 | 3/2005 | Cavanaugh et al. |
| 6,918,106 B1 | 7/2005 | Burridge et al. |
| 6,925,424 B2 | 8/2005 | Jones et al. |
| 6,928,521 B1 | 8/2005 | Burton et al. |
| 6,928,582 B2 | 8/2005 | Adl-Tabatabai et al. |
| 6,944,720 B2 | 9/2005 | Sperber et al. |
| 6,948,032 B2 | 9/2005 | Kadambi et al. |
| 6,961,681 B1 | 11/2005 | Choquier et al. |
| 6,961,925 B2 | 11/2005 | Callahan, II et al. |
| 6,966,057 B2 | 11/2005 | Lueh |
| 6,973,417 B1 | 12/2005 | Maxwell et al. |
| 6,973,542 B1 | 12/2005 | Schmuck et al. |
| 7,035,996 B2 | 4/2006 | Woodall et al. |
| 7,089,535 B2 | 8/2006 | Bates et al. |
| 7,131,115 B2 | 10/2006 | Hundt et al. |
| 7,181,723 B2 | 2/2007 | Luk et al. |
| 7,421,684 B2 | 9/2008 | Dimpsey et al. |
| 7,480,899 B2 | 1/2009 | Dimpsey et al. |
| 7,926,041 B2 | 4/2011 | Dimpsey et al. |

| | | | |
|---|---|---|---|
| 2001/0032305 A1 | 10/2001 | Barry | |
| 2002/0019976 A1 | 2/2002 | Patel et al. | |
| 2002/0073406 A1 | 6/2002 | Gove | |
| 2002/0124237 A1 | 9/2002 | Sprunt et al. | |
| 2002/0129309 A1 | 9/2002 | Floyd et al. | |
| 2002/0147965 A1 | 10/2002 | Swaine et al. | |
| 2002/0157086 A1 | 10/2002 | Lewis et al. | |
| 2002/0199179 A1 | 12/2002 | Lavery et al. | |
| 2003/0014741 A1 | 1/2003 | Megiddo et al. | |
| 2003/0040955 A1 | 2/2003 | Anaya et al. | |
| 2003/0041096 A1 | 2/2003 | Johnson | |
| 2003/0066055 A1 | 4/2003 | Spivey | |
| 2003/0101367 A1 | 5/2003 | Bartfai et al. | |
| 2003/0126590 A1 | 7/2003 | Burrows et al. | |
| 2003/0131343 A1 | 7/2003 | French et al. | |
| 2003/0135719 A1 | 7/2003 | DeWitt, Jr. et al. | |
| 2003/0135720 A1 | 7/2003 | DeWitt et al. | |
| 2003/0154463 A1 | 8/2003 | Betker et al. | |
| 2003/0191900 A1 | 10/2003 | Hooker | |
| 2003/0225917 A1 | 12/2003 | Partamian et al. | |
| 2004/0030870 A1 | 2/2004 | Buser | |
| 2004/0049712 A1 | 3/2004 | Betker et al. | |
| 2004/0153612 A1 | 8/2004 | Mutz et al. | |
| 2004/0194076 A1 | 9/2004 | Comp et al. | |
| 2004/0205302 A1 | 10/2004 | Cantrill | |
| 2004/0268316 A1 | 12/2004 | Fisher et al. | |
| 2005/0071515 A1 | 3/2005 | DeWitt, Jr. et al. | |
| 2005/0071516 A1 | 3/2005 | Levine et al. | |
| 2005/0071608 A1 | 3/2005 | DeWitt, Jr. et al. | |
| 2005/0071609 A1 | 3/2005 | Levine et al. | |
| 2005/0071610 A1 | 3/2005 | Levine et al. | |
| 2005/0071611 A1 | 3/2005 | DeWitt, Jr. et al. | |
| 2005/0071612 A1 | 3/2005 | DeWitt, Jr. et al. | |
| 2005/0071816 A1 | 3/2005 | Levine et al. | |
| 2005/0071817 A1 | 3/2005 | DeWitt, Jr. et al. | |
| 2005/0071821 A1 | 3/2005 | Levine et al. | |
| 2005/0071822 A1 | 3/2005 | DeWitt, Jr. et al. | |
| 2005/0091456 A1 | 4/2005 | Huck | |
| 2005/0102493 A1 | 5/2005 | DeWitt, Jr. et al. | |
| 2005/0108483 A1 | 5/2005 | Bungo | |
| 2005/0154811 A1 | 7/2005 | DeWitt, Jr. et al. | |
| 2005/0154812 A1 | 7/2005 | DeWitt, Jr. et al. | |
| 2005/0154813 A1 | 7/2005 | DeWitt, Jr. et al. | |
| 2005/0154838 A1 | 7/2005 | DeWitt, Jr. et al. | |
| 2005/0154839 A1 | 7/2005 | DeWitt, Jr. et al. | |
| 2005/0154867 A1 | 7/2005 | DeWitt, Jr. et al. | |
| 2005/0155018 A1 | 7/2005 | DeWitt, Jr. et al. | |
| 2005/0155019 A1 | 7/2005 | Levine et al. | |
| 2005/0155020 A1 | 7/2005 | DeWitt, Jr. et al. | |
| 2005/0155021 A1 | 7/2005 | DeWitt, Jr. et al. | |
| 2005/0155022 A1 | 7/2005 | DeWitt, Jr. et al. | |
| 2005/0155025 A1 | 7/2005 | DeWitt, Jr. et al. | |
| 2005/0155026 A1 | 7/2005 | DeWitt, Jr. et al. | |
| 2005/0155030 A1 | 7/2005 | DeWitt, Jr. et al. | |
| 2005/0177822 A1 | 8/2005 | Kuch et al. | |
| 2005/0257092 A1 | 11/2005 | Alexander et al. | |
| 2009/0287729 A1 | 11/2009 | Chen et al. | |
| 2009/0300587 A1 | 12/2009 | Zheng et al. | |

FOREIGN PATENT DOCUMENTS

| | | |
|---|---|---|
| JP | 2000347863 | 12/2000 |

OTHER PUBLICATIONS

Ramirez et al., "The Effect of Code Reordering on Branch Prediction", Proceedings of the International Conference on Parallel Architectures and Compilation Techniques, Oct. 2000, pp. 189-198.

Yang et al., "Improving Performance by Branch Reordering", Proceedings of the ACM SIGPLAN 1998 Conference onProgramming Language Design and Implementation, Montreal Canada, 1008, pp. 130-141.

Conte et al., "Accurate and Practical Profile-Driven Compilation Using the Profile Buffer", Proceedings of the 29th Annual ACM/IEEE International Symposium on Microarchitecture, Paris, France, 1996, pp. 36-45.

Conte et al., "Using Branch Handling Hardware to Support Profile-Driven Optimization", Proceedings of the 27th Annual International Symposium on Microarchitecture, San Jose CA, 1994, pp. 12-21.

Fisher, "Trace Scheduling: A Technique for Global Microcode Compaction", IEEE Transactions on Computers, vol. C30, No. 7, Jul. 1981, pp. 478-490.

Chang et al., "Using Profile Information to Assist Classic Code Optimizations", Software Pract. Exper. 21, Dec. 1991, pp. 1301-1321.

Schmidt et al., "Profile-Directed Restructuring of Operating System Code", IBM Systems Journal, 1998, vol. 37, No. 2, pp. 270-297.

Aho et al., "Compilers: Principles, Techniques, and Tools", Addison-Wesley, 1988, pp. 488-497.

Intel, "Intel IA-64 Architecture Software Developer's Manual", Revision 1.1, vol. 4, No. 245320.002, Jul. 2001.

"CPU Cache", Wikipedia, pp. 1-14 retrieved Nov. 1, 2006 http://en.wikip;edia.org/wiki/CPU_cache.

Ammons et al., "Exploiting Hardware Performance Counters with Flow and Context Sensitive Profiling", 1997, ACM, pp. 85-96.

"Method for the dynamic prediction of nonsequential memory accesses", Sep. 25, 2002, pp. 1-4, ip.com IPCOM000009888D.

"Cache Miss Director—A Means of Prefetching Cache Missed Lines", Aug. 1, 1982, IBM Technical Disclosure Bulletin, vol. 25, Issue 3A, pp. 1286.

Kikuchi, "Parallelization Assist System", Joho Shori, vol. 34, No. 9, Sep. 1993, pp. 1158-1169.

Cohen et al., "Hardware-Assisted Characterization of NAS Benchmarks", Cluster Computing, vol. 4, No. 3, Jul. 2001, pp. 189-196.

Talla et al., "Evaluating Signal Processing and Multimedia Applications on SIMD, VLIW and Super Scalar Architectures", International Conference on Computer Design, Austin, Sep. 17-20, 2000, pp. 163-172.

Iwasawa et al., "Parallelization Method of Fortran DO Loops by Parallelizing Assist System", Transactions of Information Processings Society of Japan, vol. 36, No. 8, Aug. 1995, pp. 1995-2006.

Talla et al., "Execution Characteristics of Multimedia Applications on a Pentium II Processor", IEEE International Performance, Computing, and Communications Conference, 19th, Phoenix, Feb. 20-22, 2000, pp. 516-524.

IBM Research Disclosure Bulletin 444188, "Enable Debuggers as an Objective Performance Measurement Tool for Software Development Cost Reduction", Apr. 2001, pp. 686-688.

Jeong et al., "Cost Sensitive Cache Replacement Algorithms", Jun. 2002, Second Workshop on Cashing, Coherence and Consistency, NY, pp. 1-14.

Wikipedia "JavaServer Pages" downloaded Jan. 24, 2006 http://en.wikipedia.org/wiki/JavaServer_Pages.

"Hardware Cycle Based memory Residency", IBM, May 22, 2003, ip.com, IPCOM000012728D, pp. 1-2.

Hyde, "The Art of Assembly Language", 2001, Linux Edition, pp. 247-248, retrieved Mar. 1, 2005 from http://webster.cs.ucr.edu/AoA/Linux/PDFs/0_PDFIndexLinux.html.

Tanenbaum, "Structured Computer Organization", 1984, Prentice-Hall, Inc., 2nd Edition, pp. 10-12.

Torrellas et al., "False Sharing and Spatial Locality in Multiprocessor Caches", Jun. 1994, IEEE Transactions on Computers, vol. 43, No. 6, pp. 651-663.

Rothman et al., "Analysis of Shared Memory Misses and Reference Patterns", 2000, IEEE, pp. 187-198.

Short, "Embedded Microprocessor Systems Design: An Introduction Using the Intel 80C188EB" Prentice-Hall, Inc.: 1998, p. 761.

Mano, "Computer System Architecture", Prentice-Hall, Inc., 2$^{nd}$ Ed., 1982, pp. 434-443.

Inoue, "Digital mobile communication system designed for nationwide police activities—WIDE system", IEEEXplore, Oct. 1996, pp. 1-2.

Merten et al., "A Hardware Driven Profiling Scheme for Identifying Program Hot Spots to Support Runtime Optimization", IEEE, 1999, pp. 136-147.

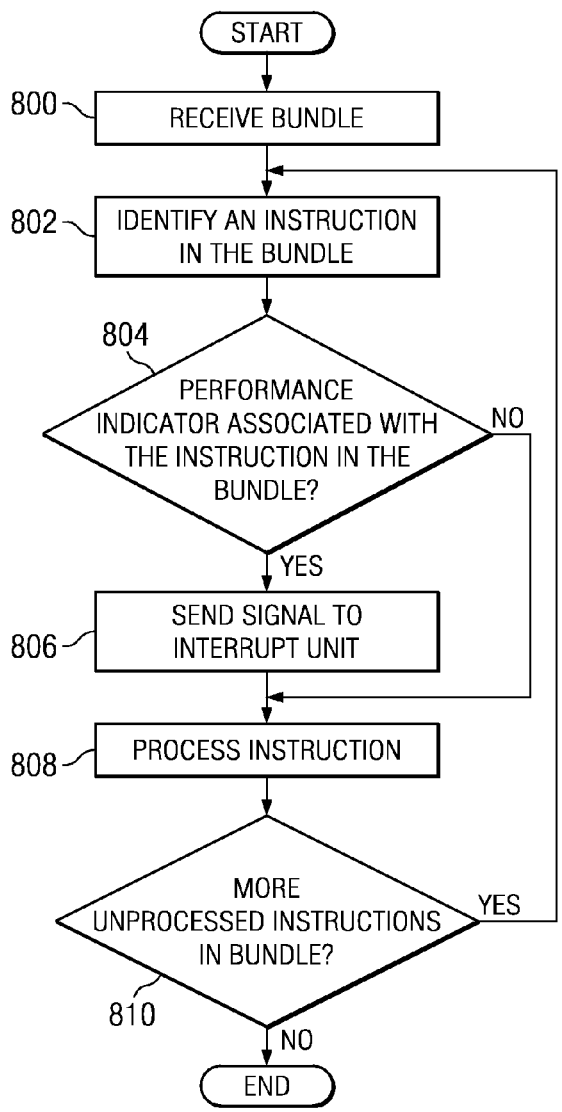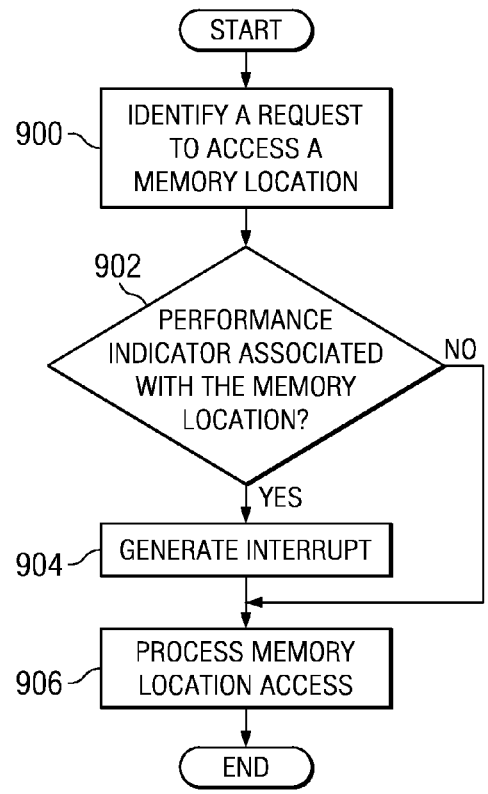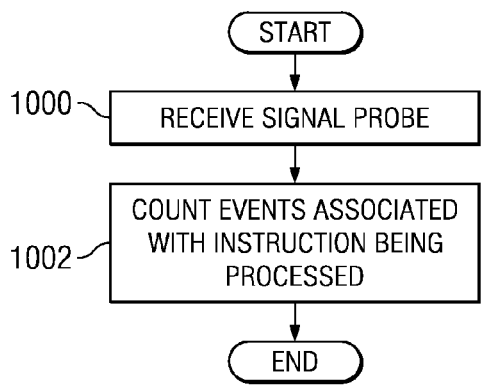

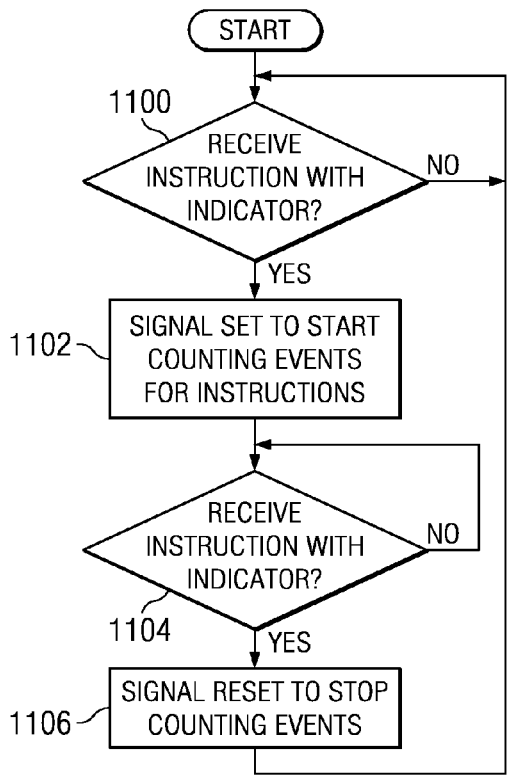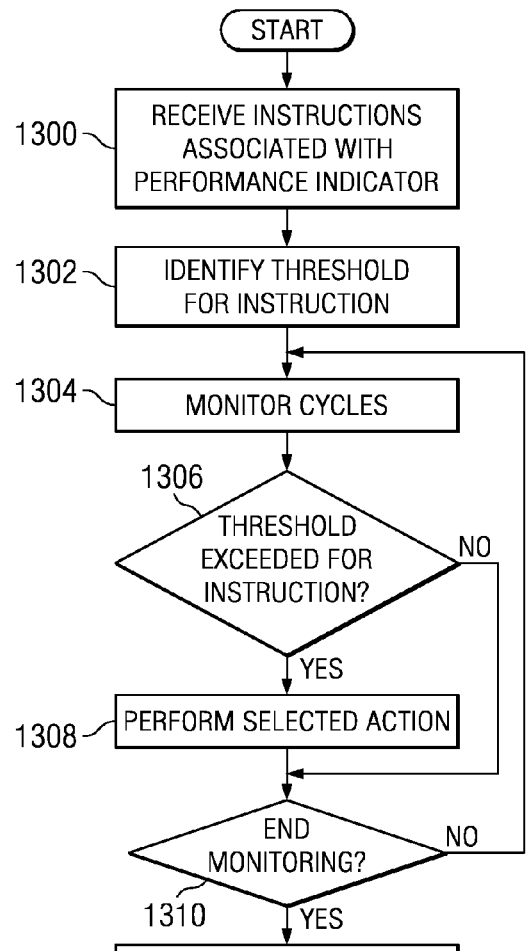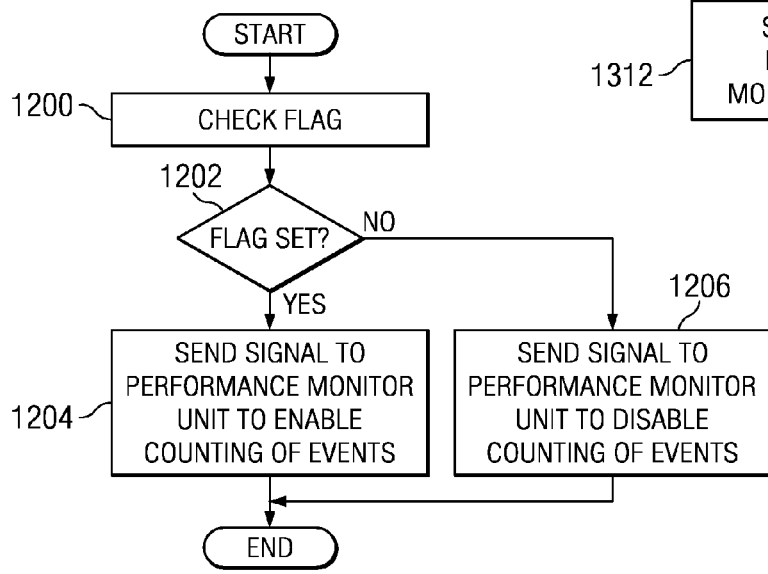

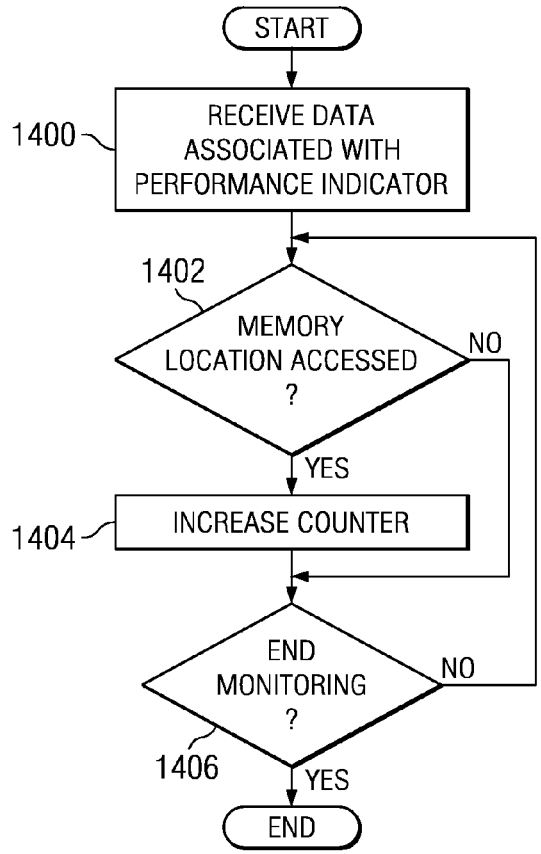
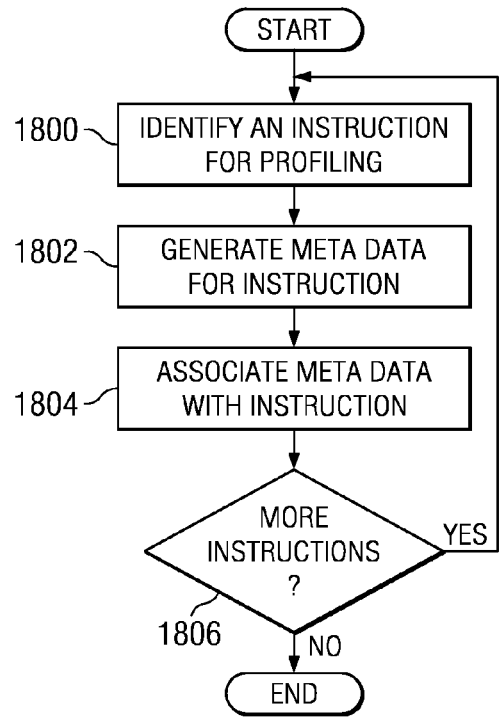
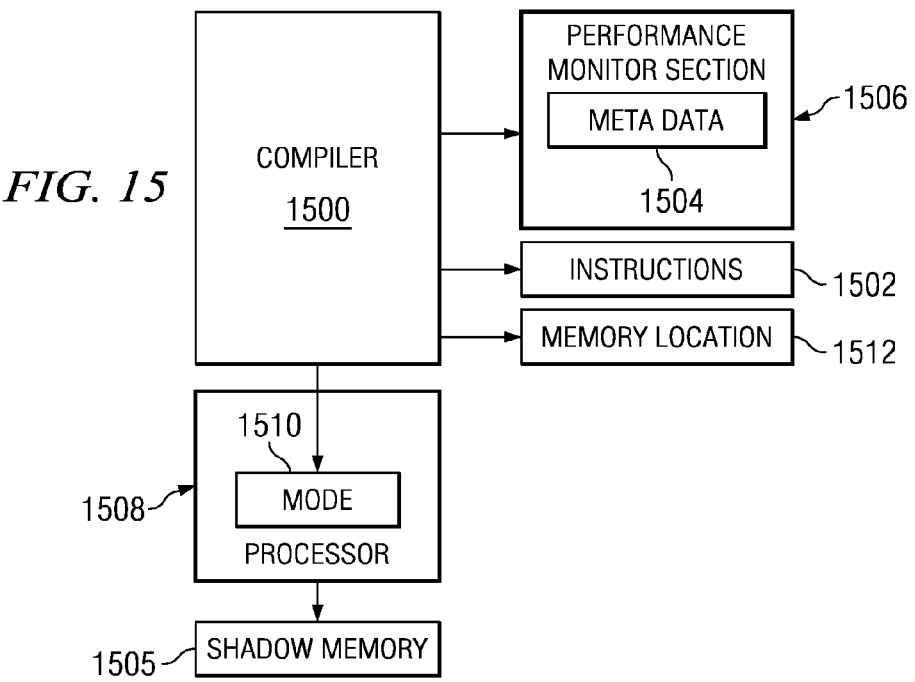

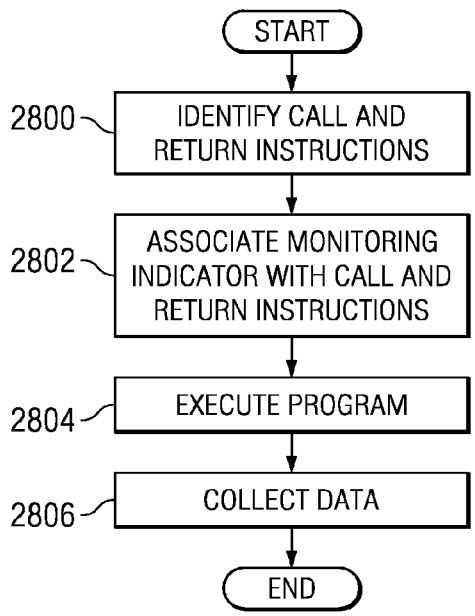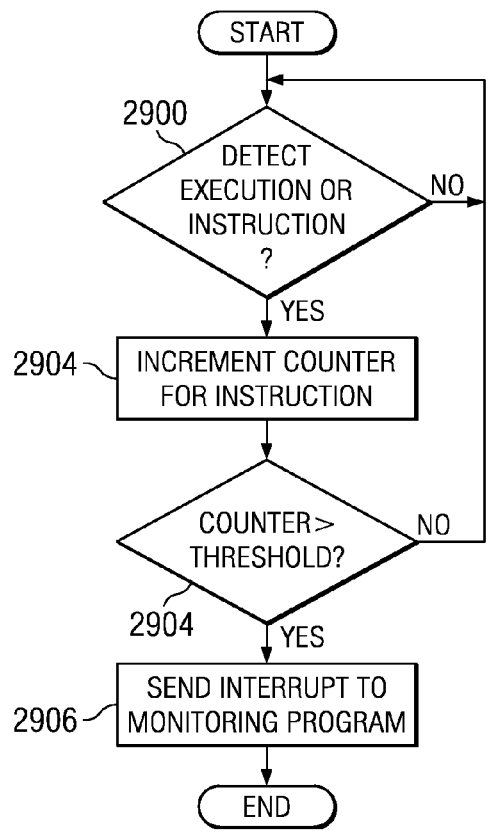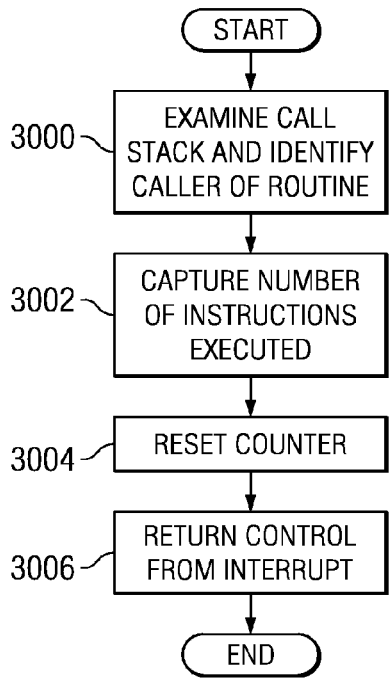

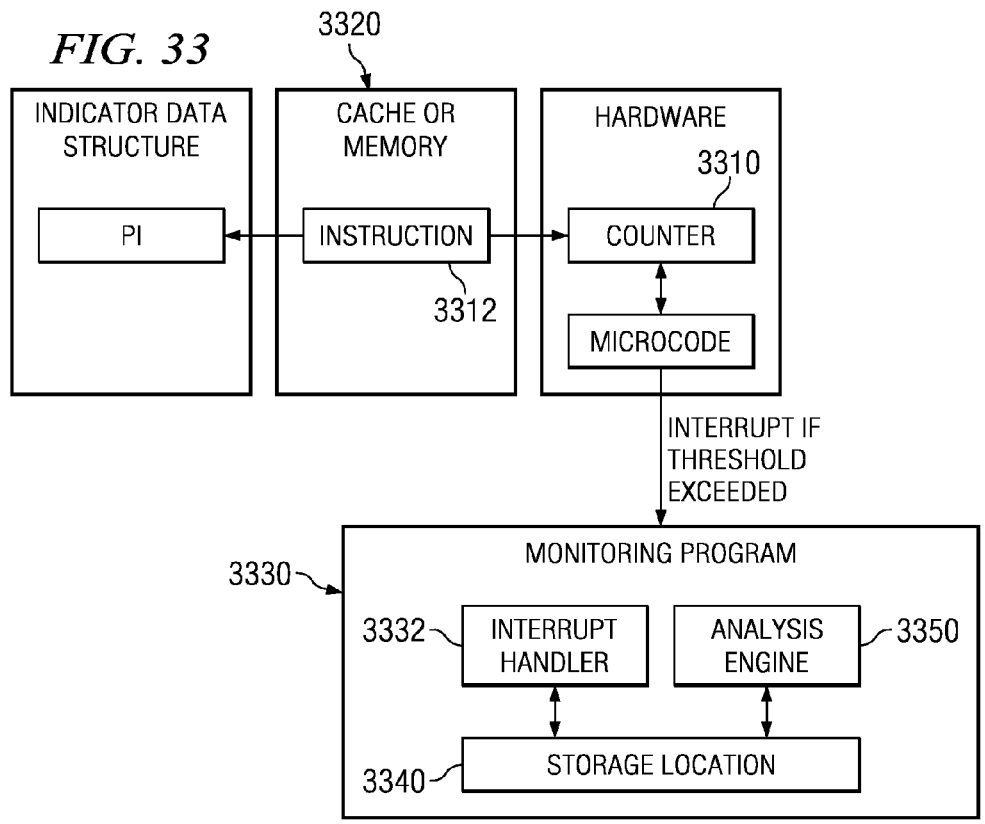
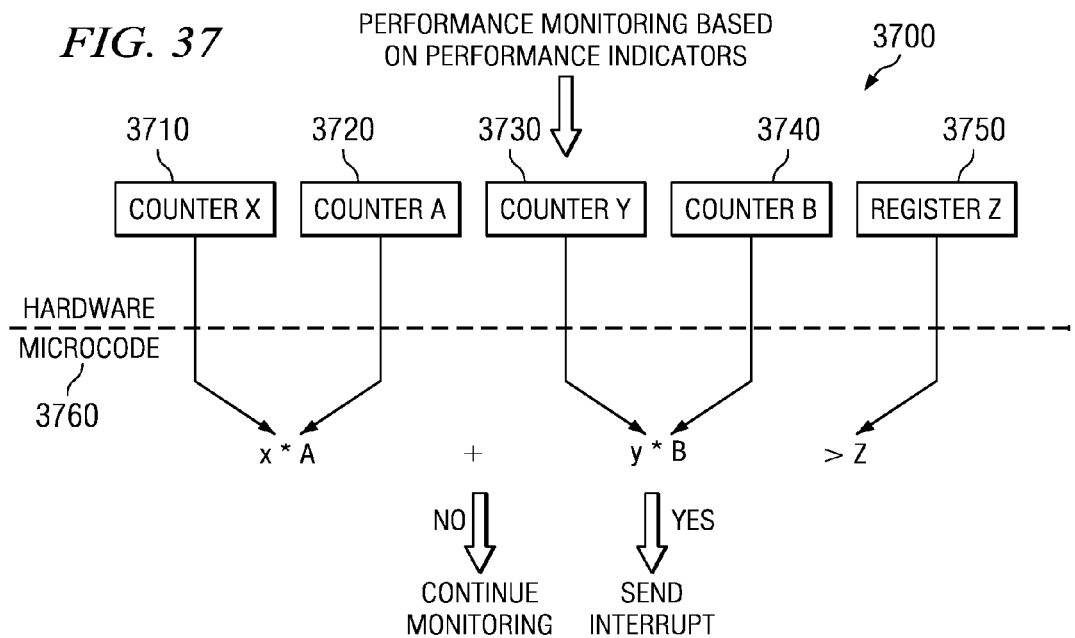

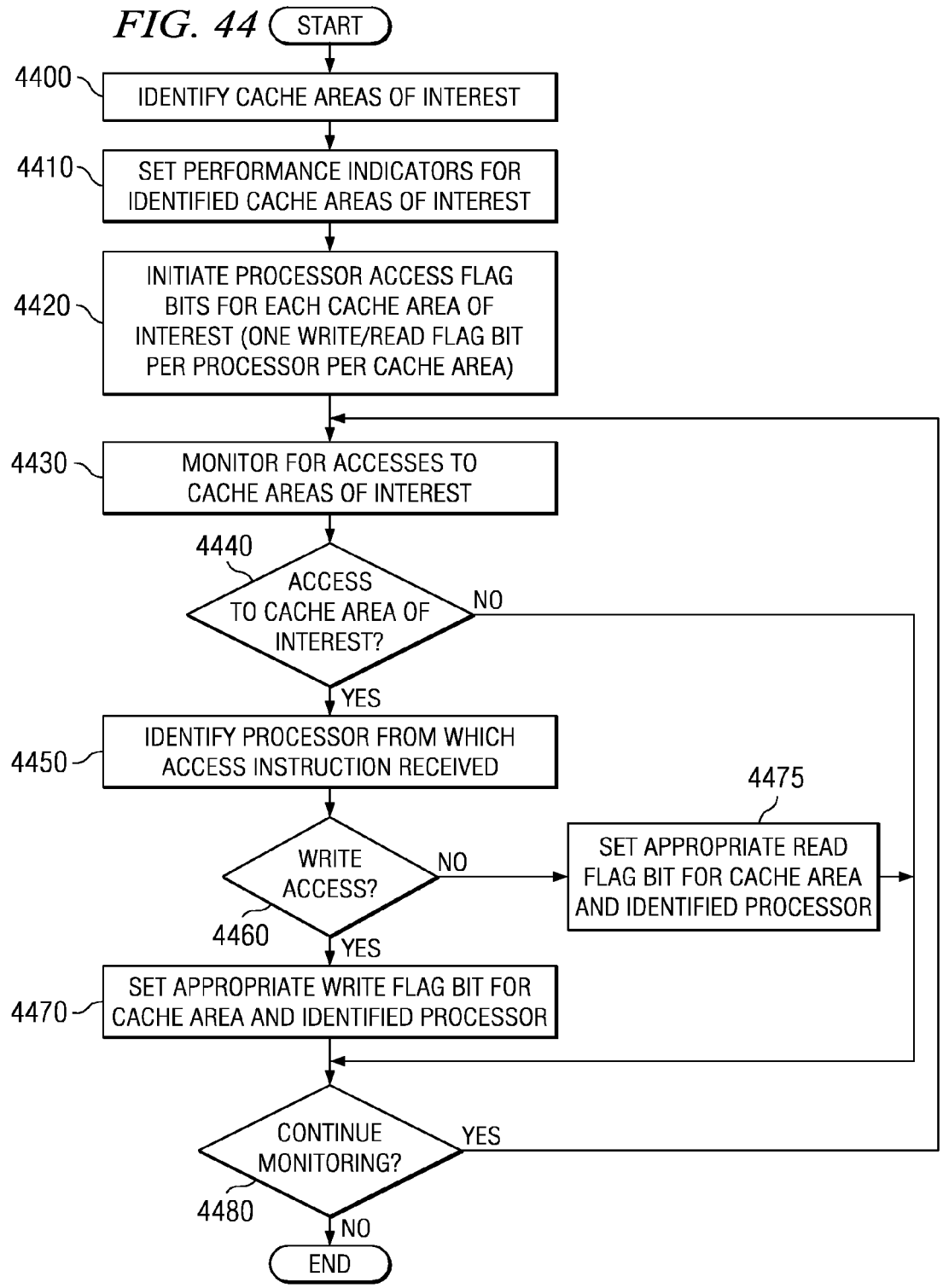

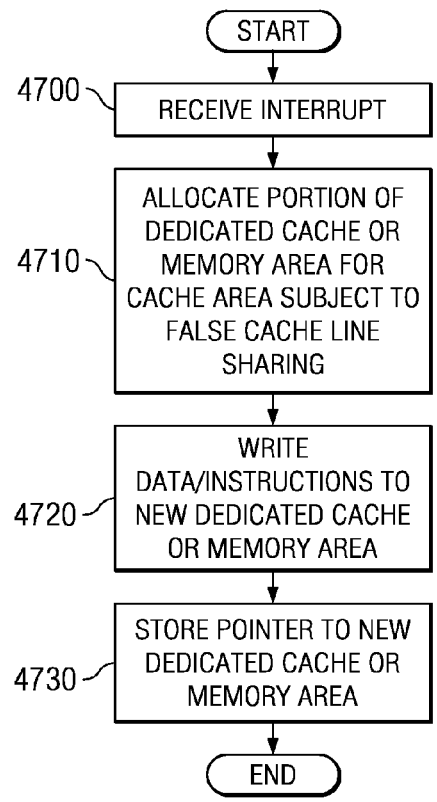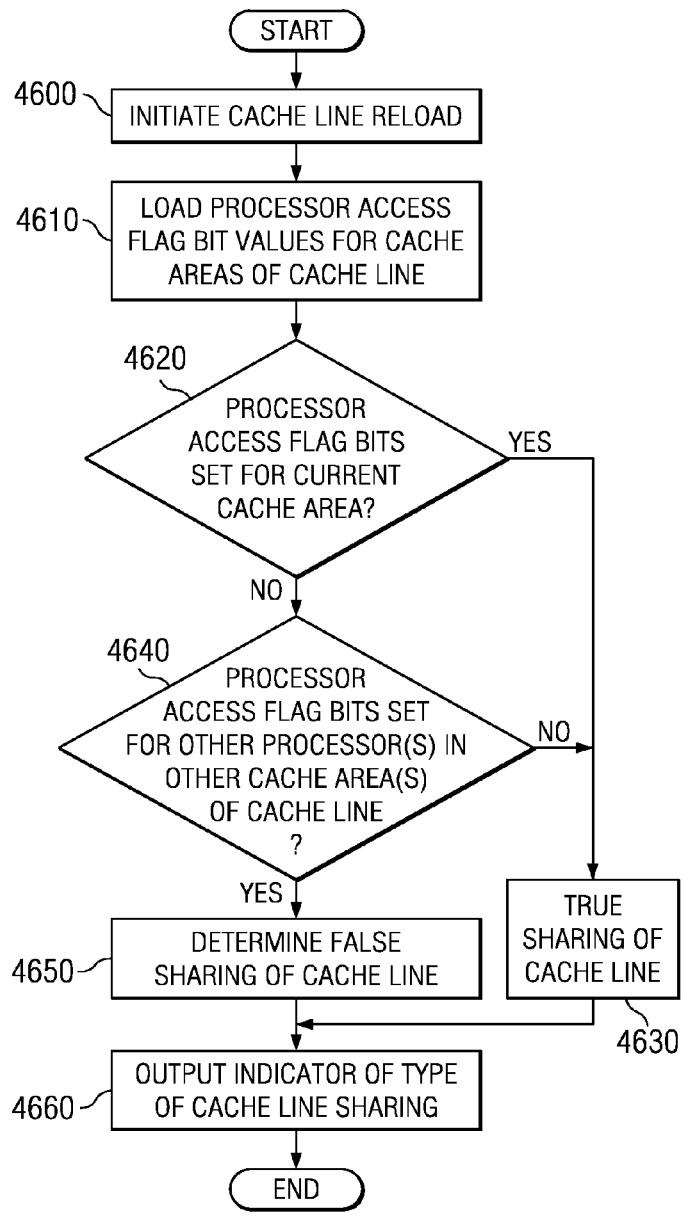

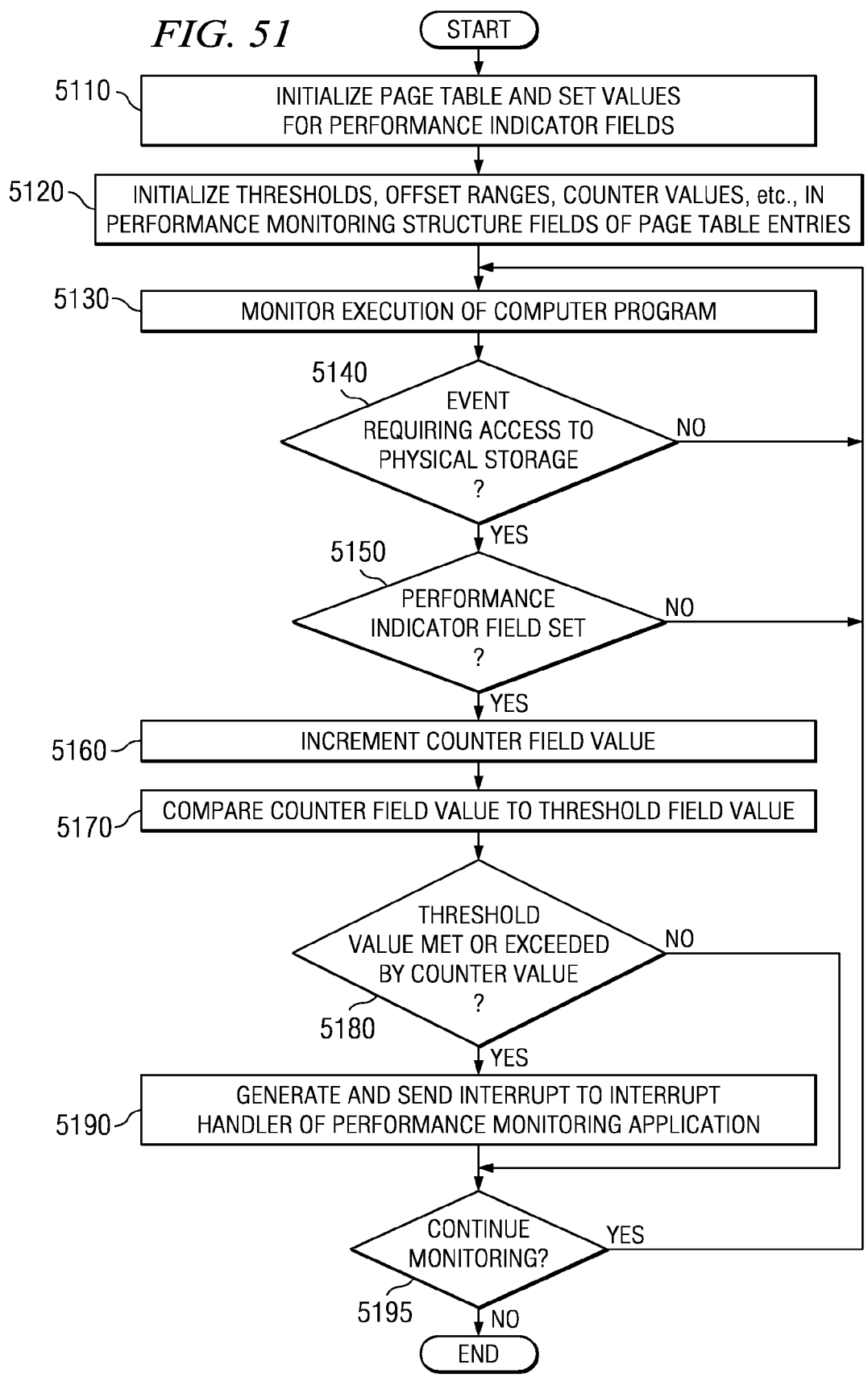

METHOD AND APPARATUS FOR MAINTAINING PERFORMANCE MONITORING STRUCTURES IN A PAGE TABLE FOR USE IN MONITORING PERFORMANCE OF A COMPUTER PROGRAM

CROSS REFERENCE TO RELATED APPLICATIONS

This application is a continuation of application Ser. No. 10/757,250, filed Jan. 14, 2004, now U.S. Pat. No. 7,526,757 issued Apr. 28, 2009.

The present invention is related to the following applications entitled "Method and Apparatus for Counting Instruction Execution and Data Accesses", Ser. No. 10/675,777, filed on Sep. 30, 2003; "Method and Apparatus for Selectively Counting Instructions and Data Accesses", Ser. No. 10/674,604, filed on Sep. 30, 2003; "Method and Apparatus for Generating Interrupts Upon Execution of Marked Instructions and Upon Access to Marked Memory Locations", Ser. No. 10/675,831, filed on Sep. 30, 2003; "Method and Apparatus for Counting Data Accesses and Instruction Executions that Exceed a Threshold", Ser. No. 10/675,778, filed on Sep. 30, 2003; "Method and Apparatus for Counting Execution of Specific Instructions and Accesses to Specific Data Locations", Ser. No. 10/675,776, filed on Sep. 30, 2003; "Method and Apparatus for Debug Support for Individual Instructions and Memory Locations", Ser. No. 10/675,751, filed on Sep. 30, 2003; "Method and Apparatus to Autonomically Select Instructions for Selective Counting", Ser. No. 10/675,721, filed on Sep. 30, 2003; "Method and Apparatus to Autonomically Count Instruction Execution for Applications", Ser. No. 10/674,642, filed on Sep. 30, 2003; "Method and Apparatus to Autonomically Take an Exception on Specified Instructions", Ser. No. 10/674,606, filed on Sep. 30, 2003; "Method and Apparatus to Autonomically Profile Applications", Ser. No. 10/675,783, filed on Sep. 30, 2003; "Method and Apparatus for Counting Instruction and Memory Location Ranges", Ser. No. 10/675,872, filed on Sep. 30, 2003; "Method and Apparatus for Counting Instruction Execution and Data Accesses to Identify Hot Spots", Ser. No. 10/757,248, filed on Jan. 14, 2004; "Method and Apparatus for Autonomically Initiating Measurement of Secondary Metrics Based on Hardware Counter Values for Primary Metrics", Ser. No. 10/757,269, filed on Jan. 14, 2004; "Method and Apparatus for Generating Interrupts Based on Arithmetic Combinations of Performance Counter Values", Ser. No. 10/757,212, filed on Jan. 14, 2004; and "Method and Apparatus for Optimizing Code Execution Using Annotated Trace Information Having Performance Indicator and Counter Information", Ser. No. 10/757,197, filed on Jan. 14, 2004. All of the above related applications are assigned to the same assignee, and incorporated herein by reference.

BACKGROUND OF THE INVENTION

1. Technical Field

The present invention relates generally to an improved data processing system. In particular, the present invention provides a method and apparatus for obtaining performance data in a data processing system. Still more particularly, the present invention provides a method and apparatus for hardware assistance to software tools in obtaining performance data in a data processing system.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas which might benefit most from improvements to the code.

Another trace technique involves periodically sampling a program's execution flows to identify certain locations in the program in which the program appears to spend large amounts of time. This technique is based on the idea of periodically interrupting the application or data processing system execution at regular intervals, so-called sample-based profiling. At each interruption, information is recorded for a predetermined length of time or for a predetermined number of events of interest. For example, the program counter of the currently executing thread, which is an executable portion of the larger program being profiled, may be recorded at each interval. These values may be resolved against a load map and symbol table information for the data processing system at post-processing time and a profile of where the time is being spent may be obtained from this analysis.

Creating tools such as these to find answers related to specific situations or problems can take much effort and can be very difficult to calibrate as the software tools themselves affect the system under test. The present invention recognizes that hardware assistance for tool development and problem analysis can significantly ease the amount of effort needed to develop software performance tools. Further, with the increasing density of processors, hardware assistance can be included to provide additional debug and analysis features.

Therefore, it would be advantageous to have an improved method, apparatus, and computer instructions for providing hardware assistance for performance tools to analyzing the performance of data processing systems.

SUMMARY OF THE INVENTION

The present invention provides a method, apparatus, and computer instructions in a data processing system for processing instructions. Instructions are received at a processor in the data processing system. If a selected indicator is associated with the instruction, counting of each event associated with the execution of the instruction is enabled.

In some embodiments of the present invention, the counts associated with the indicators may be checked to determine if the counts are above a threshold. If a count is above a threshold, the associated instruction/data address may be identified as a hot spot and optimization of the execution of the code may be performed based on the identification of the hot spot.

In further embodiments of the present invention, arithmetic combinations of counter values generated based on the encountering of performance indicators may be generated and compared to threshold values to determine whether to generate interrupts to the monitoring application. In such embodiments, the microcode of the processor is programmed to check the counter values of counters specified by the monitoring application, combine the counter values in a manner specified by the monitoring application, and then compare the combined value to a threshold value supplied by the performance monitoring application. In this way, more complex conditioning of interrupts may be provided within the hardware of the processor.

In other embodiments of the present invention, functionality is provided in the performance monitoring application for initiating the measurement of secondary metrics with regard to identified instructions, data addresses, ranges of identified instructions, or ranges of identified data addresses, based on counter values for primary metrics. Thus, for example, when a primary metric counter, or a combination of primary metric counters, meets or exceeds a predetermined threshold value, an interrupt may be generated. In response to receiving the interrupt, counters associated with the measuring of secondary metrics of a range of instructions/data addresses may be initiated. In this way, areas of particular interest may first be identified using the primary metric performance counters with more detailed information being obtained through the use of secondary metric performance counters directed to measuring metrics associated with the particular area of interest.

In additional embodiments of the present invention, the performance indicators and counter values may be used as a mechanism for identifying cache hits and cache misses. With such an embodiment, performance indicators are associated with instructions for selected routines of interest in the computer program. Performance counters are incremented each time the instructions of the routines are executed and each time the instructions must be reloaded into the cache. From the values of these counters the cache hit-miss ratio may be determined.

When the cache hit-miss ratio becomes less than a predetermined threshold, i.e. there is a greater number of cache misses than cache hits, the present invention may determine that a problem condition has occurred. One contributor to such a small cache hit-miss ratio may be the "chase tail" condition. A "chase tail" condition occurs when a block of instructions/data must be loaded into cache but there is not enough available room in the cache to store the entire block of instructions/data. In such a case, the instructions/data are written to the available space in the cache and any overflow is written over the least recently used portion of the cache. This may cause cache misses on the instructions/data overwritten, thereby increasing the number of cache misses.

When a problem condition is detected due to the values of the performance counters indicating a low cache hit-miss ratio, the present invention may set a mode bit in a mode register indicating that the processor should implement a "chase tail" operation within the microcode of the processor. With this "chase tail" operation, upon processing a reload operation for reloading a block of instructions/data into the cache, the processor checks to determine if there is available space in the cache for the entire block of instructions/data. If there is available space in the cache, then the block of instructions/data are stored in the cache in a normal manner. However, if there is not sufficient space in the cache to store the block of instructions/data that is to be reloaded, then the block of instructions/data, or at least the overflow portion of the block of instructions/data, is loaded into a reserved portion of cache which is reloaded using a different algorithm than that of the instructions/data into a non-reserved area of the cache and overwriting instructions/data already present in the cache.

In addition, a performance indicator may be associated with the block of instructions indicating that when an instruction in this block of instructions is again executed, or when a data address in the block of data addresses is again accessed, the processor should look for the instruction/data in the reserved area of the cache.

Thus, by invoking the "chase tail" operation of the present embodiment when the cache hit-miss ratio is below a predetermined threshold, the present invention avoids the "chase the tail" situation by causing any reloads of instructions/data that cannot be accommodated by the available space in the cache to be stored in a reserved area of the cache rather than overwriting existing cache entries in the non-reserved area of the cache. In this way, the domino affect with regard to overwriting and reloads caused by overwriting the least recently used entries in the cache may be avoided.

In even further embodiments of the present invention, the performance indicators of the present invention may be utilized to obtain information regarding the nature of the cache hits and reloads of cache lines within the instruction or data cache. These embodiments of the present invention, for example, may be used to determine whether processors of a multiprocessor system, such as a symmetric multiprocessor (SMP) system, are truly sharing a cache line or if there is false sharing of a cache line. This determination may then be used as a means for determining how to better store the instructions/data of the cache line to prevent false sharing of the cache line.

The determination of true or false cache line sharing may be beneficial in determining the manner by which data and instructions are stored in a cache. That is, if it is determined that cache lines are being falsely shared and thus, cache line reloads are often being performed due to writes to areas of the cache line by a first processor that are not being accessed by the second processor, then appropriate measures may be taken to minimize the amount of false cache line sharing.

For example, in a further embodiment of the present invention, when it is determined that a cache line is being falsely shared using the mechanisms described above, the data or instructions being accessed may be written to a separate memory area dedicated to false cache line sharing data.

The code may then be modified by inserting a pointer to this new area of memory. Thus, when the code again attempts to access the original area of the memory, the access is redirected to the new memory area rather than to the previous area of the memory that was subject to false sharing. In this way, reloads of the cache line may be avoided.

In a further embodiment of the present invention, a compiler may obtain this performance profile data along with the instructions/data of the computer program and use this information to optimize the manner by which the computer program is executed, instructions/data are stored, and the like. That is, the compiler may take extra time during initial application load to optimize the application and instruction/data storage so that the runtime component of the application is optimized.

The manner by which the compiler optimizes the runtime aspects of the computer program may vary depending on the particular performance profile data obtained, which is annotated by the output obtained from the use of performance indicators, counters, flags, and the like, previously described. The optimizations may be to optimize the instruction paths, optimize the time spent in initial application load, the manner by which the cache and memory is utilized, and the like.

In yet other embodiments of the present invention, the performance indicators, counters, thresholds, and other performance monitoring structures may be stored in a page table that is used to translate virtual addresses into physical storage addresses. A standard page table is augmented with additional fields for storing the performance monitoring structures. These structures may be set by the performance monitoring application and may be queried and modified as events occur that require access to memory.

Logically, the page table must be consulted for every instruction fetch and data access to translate the program address, or virtual address, into a physical address. To improve performance, recently used page table entries are kept in a cache (a Translation Look-aside Buffer or an Effective to Real Address look-aside buffer) providing fast access to the information needed to translate a program address to a physical address. The performance tracking indicators contained in a page table entry can also be cached in the same look-aside buffers.

During the process of translating a program address to a physical address, it can be determined, from the performance monitoring structures whether the instruction/data has an associated performance indicator, counter values, threshold, and the like. The same functionality provided by the performance indicators and hardware counters described in other embodiments of the present invention may be provided via the augmented page table according to this embodiment of the present invention.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart of a process for selectively sending instructions to an interrupt unit in accordance with a preferred embodiment of the present invention;

FIG. 9 is a flowchart of a process for generating an interrupt in response to an access of a memory location associated with a performance indicator in accordance with a preferred embodiment of the present invention;

FIG. 10 is a flowchart of a process for counting events in accordance with a preferred embodiment of the present invention;

FIG. 11 is a flowchart of a process for selective counting of instructions in accordance with a preferred embodiment of the present invention;

FIG. 12 is a flowchart of a process for selective counting of instructions in accordance with a preferred embodiment of the present invention;

FIG. 13 is a flowchart of a process for identifying instructions exceeding a threshold in accordance with a preferred embodiment of the present invention;

FIG. 14 is a flowchart of a process for accesses to a memory location in accordance with a preferred embodiment of the present invention;

FIG. 15 is a block diagram illustrating components used for generating metadata, such as performance indicators, in accordance with a preferred embodiment of the present invention;

FIG. 18 is a flowchart of a process for generating metadata for instructions in accordance with a preferred embodiment of the present invention;

FIG. 28 is a flowchart of a process for identifying events associated with call and return instructions in which data is collected from a performance monitor unit in accordance with a preferred embodiment of the present invention;

FIG. 29 is a flowchart of a process for identifying instructions that have been executed more than a selected number of times in accordance with a preferred embodiment of the present invention;

FIG. 30 is a flowchart of a process for examining a call stack and identifying a caller of a routine when a particular instruction is executed more than some selected number of times in accordance with a preferred embodiment of the present invention;

FIG. 33 is an exemplary block diagram of the primary operational elements of one exemplary embodiment of the present invention when determining hot spots of a cache/memory;

FIG. 37 is an exemplary diagram illustrating an exemplary embodiment of the present invention when performing an arithmetic combination of counter values to determine whether to send an interrupt to a monitoring application or not;

FIG. 44 is a flowchart outlining an exemplary operation of one exemplary embodiment of the present invention when processing an access request to an area of a cache line;

FIG. 46 is a flowchart outlining an exemplary operation of an exemplary embodiment of the present invention when processing a cache line reload interrupt, such as that generated by the operation of FIG. 45;

FIG. 47 is a flowchart outlining an exemplary operation of an exemplary embodiment of the present invention in which cache areas identified as being falsely shared are moved to avoid the false sharing;

FIG. 51 is a flowchart outlining an exemplary operation of the present invention when using an augmented page table to store performance monitoring structures.

DETAILED DESCRIPTION OF THE PREFERRED EMBODIMENTS

Figure 1:
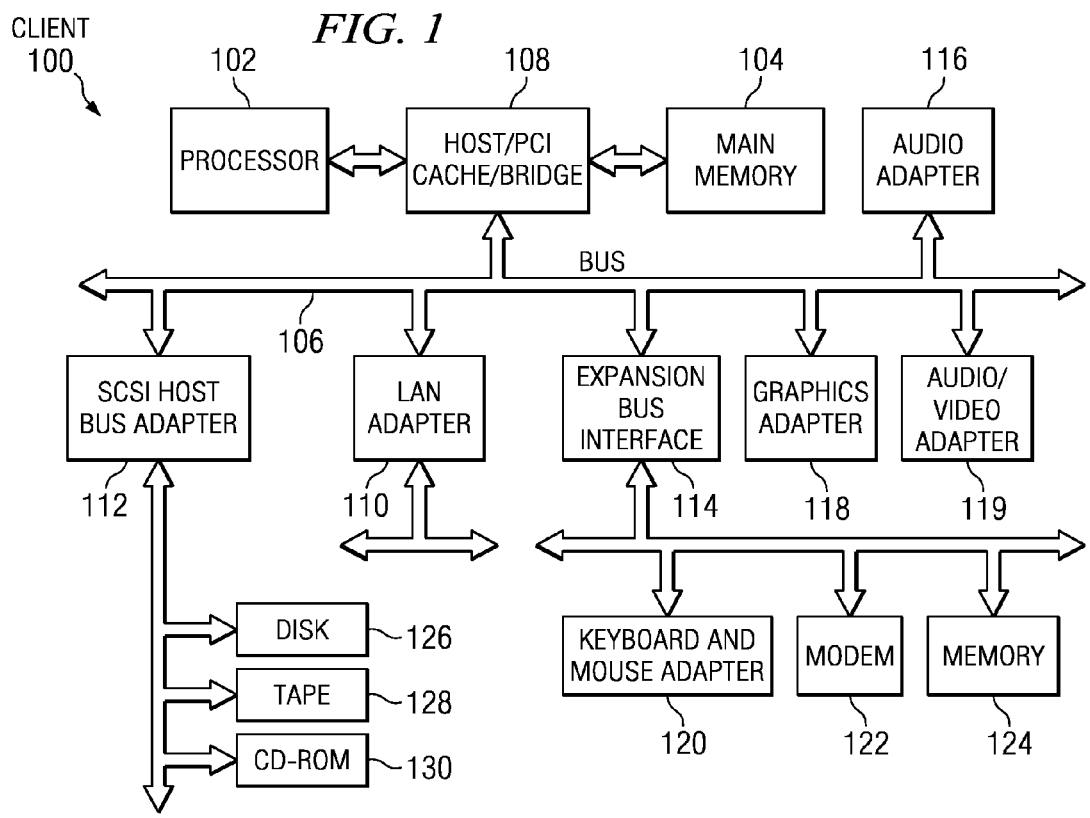
FIG. 1 is a block diagram of a data processing system in which the present invention may be implemented.

With reference now to FIG. 1, a block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCT bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, it optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Figure 2:
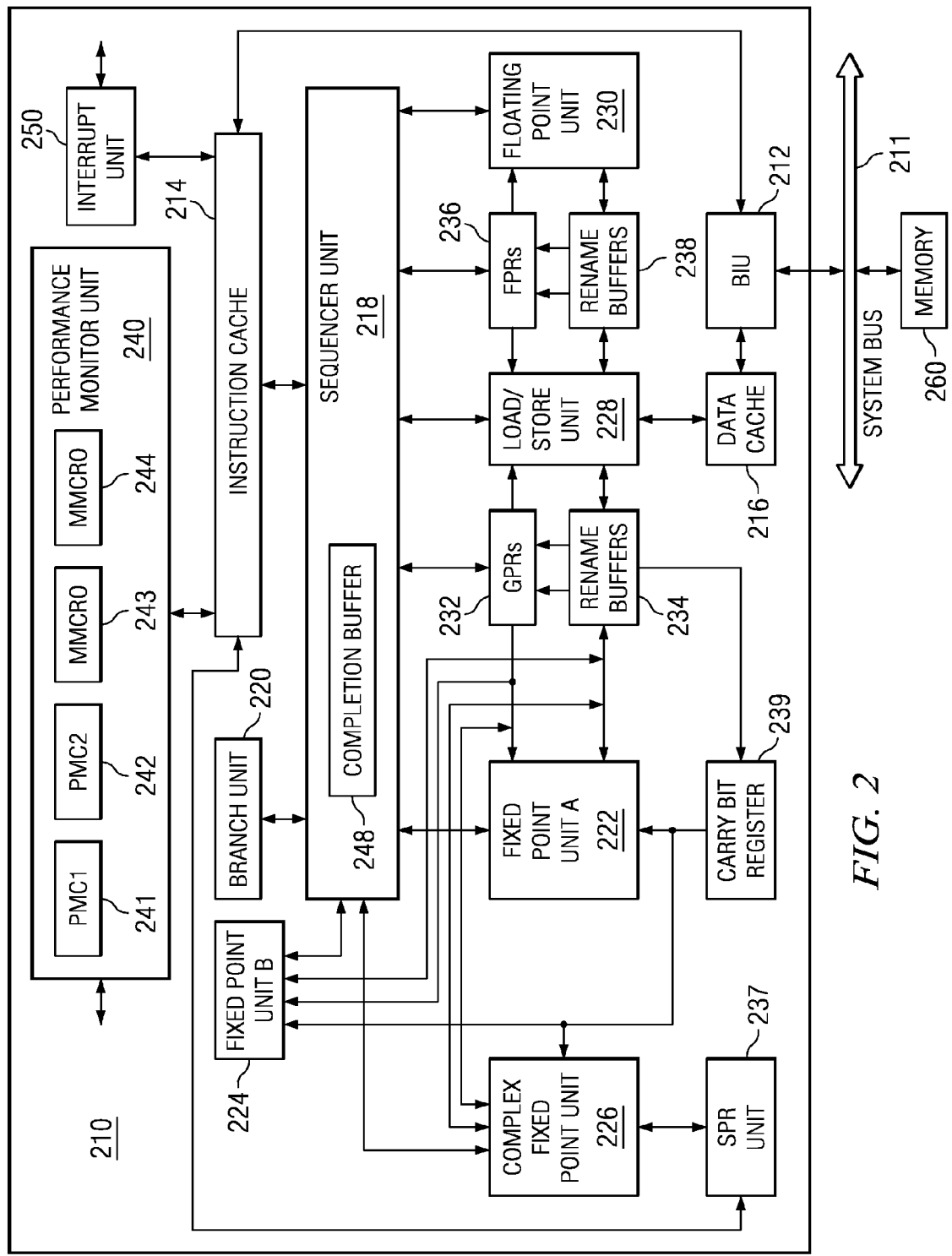
FIG. 2 is a block diagram of a processor system for processing information according to the preferred embodiment.

Turning next to FIG. 2, a block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 242. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 240.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or CA register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218.

In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

A completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes processor monitoring unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 26. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program.

The present invention provides an ability to monitor the execution of specific instructions as well as the access of specific memory locations during the execution of a program. Specifically, a spare field may be used to hold an indicator that identifies the instruction or memory location as one that is to be monitored by a performance monitor unit or by some other unit in a processor. Alternatively, the indicator may be stored in another location in association with the instruction or memory location. In the case in which the indicator is placed in the instruction, a spare field is typically used, but in some cases the instruction may be extended to include the space needed for the indicator. With this case, the architecture of the processor may require changes. For example, a 64 bit architecture may be changed to a 65 bit architecture to accommodate the indicator. With respect to accesses of data, an indicator may be associated with the data or memory locations in which the data is located.

Figure 3:
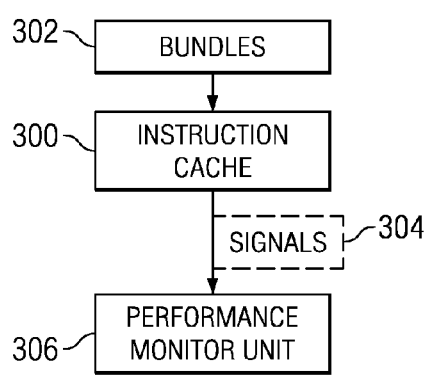
FIG. 3 is a diagram illustrating components used in processing instructions associated with indicators in accordance with a preferred embodiment of the present invention.

Turning now to FIG. 3, a diagram illustrating components used in processing instructions associated with indicators is depicted in accordance with a preferred embodiment of the present invention. Instruction cache 300 receives bundles 302. Instruction cache 300 is an example of instruction cache 214 in FIG. 2. A bundle is a grouping of instructions. This type of grouping of instructions is typically found in an IA-64 processor, which is available from Intel Corporation. Instruction cache 300 processes instructions for execution.

As part of this processing of instructions, instruction cache 300 determines which instructions are associated with indicators. These indicators are also referred to as "performance indicators" in these examples. Signals 304 have been associated with performance indicators. As a result, signals 304 for the instructions are sent to performance monitor unit 306. Performance monitor unit 306 is an example of performance monitor unit 240 in FIG. 2.

When instruction cache 300 determines that an instruction associated with an indicator is present, a signal is sent to indicate that a marked instruction is being executed. In these examples, a marked instruction is an instruction associated with a performance indicator. Alternatively, a performance indicator may indicate that all items or instructions in a bundle are marked to be counted. Additionally, signals for these instructions are sent by instruction cache 300 to the appropriate functional unit. Depending on the particular implementation, a functional unit other than performance monitor unit 306 may count execution of instructions. In the case that the performance indicators are in the instructions, or in the bundles, the cache unit, instruction cache 300, detects the indicators and sends signals to performance monitor unit 306.

When signals for these instructions are received by performance monitor unit 306, performance monitor unit 306 counts events associated with execution of instructions 304. As illustrated, performance monitor unit 306 is programmed only to count events for instructions associated with performance indicators. In other words, an indicator associated with an instruction or memory location is used to enable counting of events associated with the instruction or memory location by performance monitor unit 306. If an instruction is received by instruction cache 300 without a performance indicator, then events associated with that instruction are not counted. In summary, the performance indicators enable the counting on a per instruction or per memory location basis in a processor.

Performance monitor unit 306 counts events for instructions associated with performance indicators, if performance monitor unit 306 is set in a mode to count metrics enabled for these types of marked instructions. In some cases, performance monitor unit 306 may be set to perform some other type of counting, such as counting execution of all instructions, which is a currently available function.

With respect to the accessing of data in memory locations, the data and indicators are processed by a data cache, such as data cache 216 in FIG. 2, rather then by an instruction cache. The data cache sends signals indicating that marked memory locations are being accessed to performance monitor unit 308. Marked memory locations are similar to marked instructions. These types of memory locations are ones associated with a performance indicator.

Figure 4:
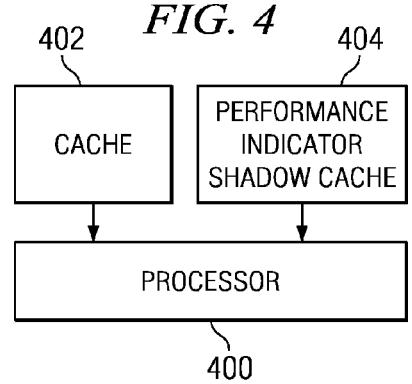
FIG. 4 is a diagram illustrating one mechanism for associating a performance indicator with an instruction or memory location in accordance with a preferred embodiment.

Turning next to FIG. 4, a diagram illustrating one mechanism for associating a performance indicator with an instruction or memory location is depicted in accordance with a preferred embodiment of the present invention. Processor 400 receives instructions from cache 402. In this example, the indicators are not stored with the instructions or in the memory locations in which data is found. Instead, the indicators are stored in a separate area of storage, performance instrumentation shadow cache 404. The storage may be any storage device, such as for example, a system memory, a flash memory, a cache, or a disk.

When processor 400 receives an instruction from cache 402, processor 400 checks performance instrumentation shadow cache 404 to see whether a performance indicator is associated with the instruction. A similar check is made with respect to accesses of memory locations containing data. In one embodiment, a full shadow word is provided for each corresponding word that does not affect the actual data segments. In other words, processor 400 allows for the architecture or configuration of cache 402 to remain unchanged. In these examples, the mapping described is word for word. However, some other type of mapping may be used, such as a shadow bit per data word in which a bit in performance instrumentation shadow cache 404 corresponds to one word of data.

With respect to this type of architecture, the compilers, using this feature, create the debug information in a separate work area from the data area themselves in a manner similar to debug symbols. When a module is loaded, the extra information, performance indicators, is prepared by the loader so that it will be available to incorporate into performance instrumentation shadow cache 404 when instructions are loaded into cache 402. These cache areas may be intermingled and either marked as such or understood by the mode of operation. Processor 400 uses the performance indicators to determine how the related data accesses and instruction executions are to be counted or made to take exceptions. In these examples, the process is programmed by a debugger or a performance analysis program to know whether to use the shadow information while it is executing instructions.

Figure 5:
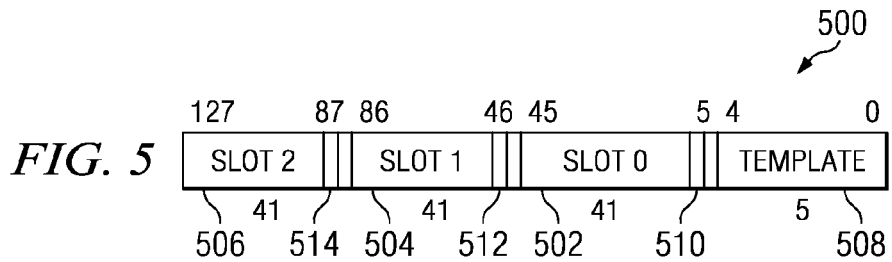
FIG. 5 is a diagram illustrating a bundle in accordance with a preferred embodiment of the present invention.

Turning next to FIG. 5, a diagram illustrating a bundle is depicted in accordance with a preferred embodiment of the present invention. Bundle 500 contains instruction slot 502, instruction 504, instruction slot 506 and template 508. As illustrated, bundle 500 contains 128 bits. Each instructions slot contains 41 bits, and template 508 contains 5 bits. Template 508 is used to identify stops within the current bundle and to map instructions within the slots to different types of execution units.

Spare bits within bundle 500 are used to hold indicators of the present invention. For example, indicators 510, 512, and 514 are located within instruction slots 502, 504, and 506, respectively. These indicators may take various forms and may take various sizes depending on the particular implementation. Indicators may use a single bit or may use multiple bits. A single bit may be used to indicate that events are to be counted in response to execution of that instruction. Multiple bits may be used to identify a threshold, such as a number of processor or clock cycles for instruction execution that may pass before events should be counted. Further, these bits may even be used as a counter for a particular instruction. A similar use of fields may be used for indicators that mark data or memory locations.

Alternatively, template 508 may be used to contain a bundle of related indicators, so that one bit is used to identify all the instructions in a bundle. Also, the bundle itself could be extended to be 256 bits or some other number of bits to contain the extra information for the performance indicators.

Figure 6A:
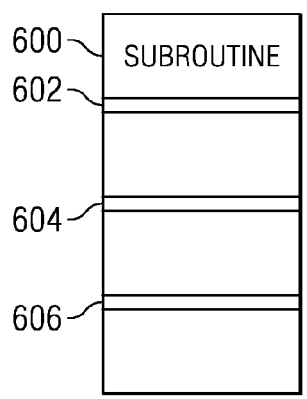
FIGS. 6A-6B are diagrams of a subroutine containing performance indicators in accordance with a preferred embodiment of the present invention.
Figure 6B:
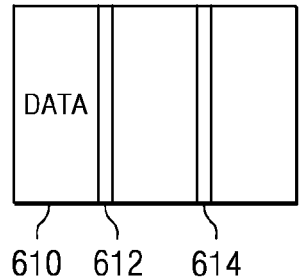

Turning next to FIGS. 6A and 6B, diagrams of a subroutine containing performance indicators and data containing performance indicators are depicted in accordance with a preferred embodiment of the present invention. In this example, subroutine 600 in FIG. 6A includes a number of instructions in which instructions 602, 604, and 606 are associated with performance indicators. These instructions also are referred to as marked instructions. When these instructions are executed, events associated with those instructions are counted to obtain data for software tools to analyze the performance of a data processing system executing a subroutine 600.

Data or memory locations containing data may be marked with indicators in a similar manner. These indicators are used in counting accesses to the data or memory locations in these examples. In FIG. 6B, data 610 includes data associated with performance indicators. Data 612 and data 614 are sections of data 612 that are associated with performance indicators. These sections of data, which are associated with performance indicators, also are referred to as marked data.

Figure 7:
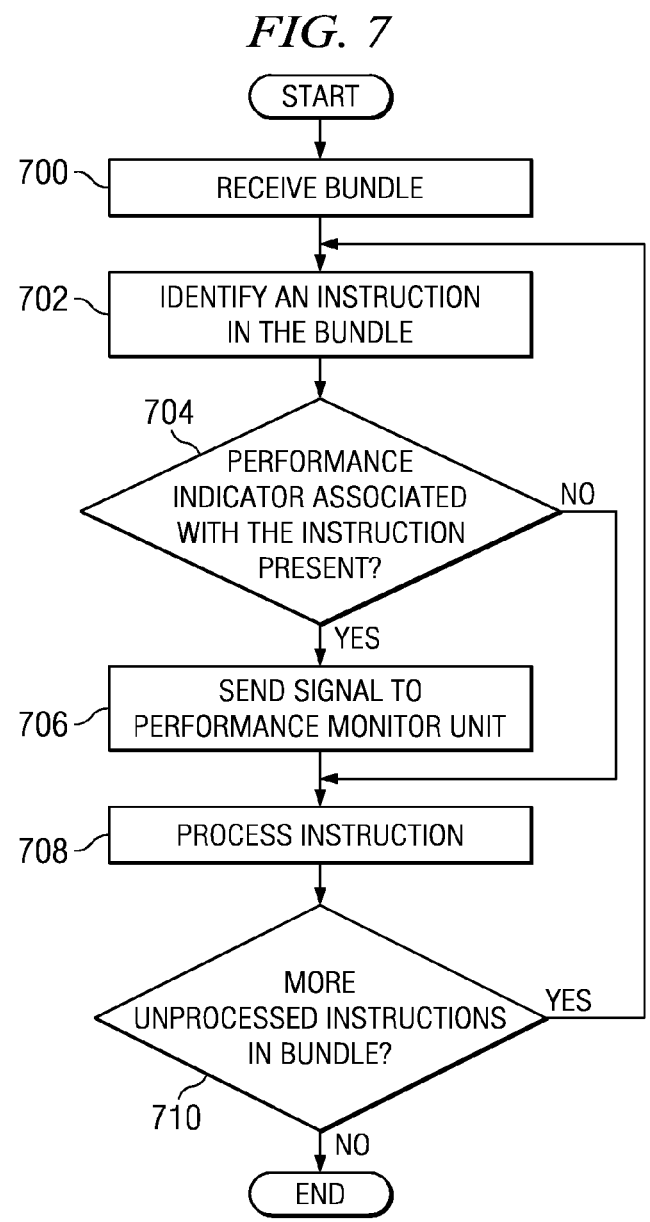
FIG. 7 is a flowchart of a process for processing instructions containing performance indicators in accordance with a preferred embodiment of the present invention.

Turning now to FIG. 7, a flowchart of a process for processing instructions containing performance indicators is depicted in accordance with a preferred embodiment of the present invention. The process illustrated in FIG. 7 may be implemented in an instruction cache, such as instruction cache 214 in FIG. 2.

The process begins by receiving a bundle (step 700). In these examples, each bundle has a format similar to bundle 500 in FIG. 5. An instruction in the bundle is identified (step 702). A determination is made as to whether a performance indicator associated with the instruction is present (step 704). This determination may be made by examining an appropriate field in the instruction or bundle. Alternatively, a performance instrumentation shadow cache, such as performance instrumentation shadow cache 404 in FIG. 4 may be checked to see if a performance indicator is associated with the instruction.

If a performance indicator is present, a signal is sent to a performance monitor unit (step 706). Upon receiving this signal, the performance monitor unit will count events associated with the execution of the instruction. Additionally, the instruction is processed (step 708). Processing of the instruction includes, for example, sending the instruction to the appropriate functional unit for execution.

Thereafter, a determination is made as to whether additional unprocessed instructions are present in the bundle (step 710). If additional unprocessed instructions are present in the bundle, the process returns to step 702 as described above. Otherwise, the process terminates. Turning back to step 704, if the performance indicator is not present, the process proceeds directly to step 708.

Turning now to FIG. 8 a flowchart of a process for selectively sending signals to an interrupt unit is depicted in accordance with a preferred embodiment of the present invention. The process illustrated in FIG. 8 may be implemented in an instruction cache, such as instruction cache 242 in FIG. 2. This process is employed in cases in which monitoring events using a performance monitor unit may miss certain events. For example, a performance monitor unit counts events. When a cache miss occurs, a signal is sent to the performance monitor unit. When the meta data for a corresponding cache line is loaded into the cache, the appropriate signal or signals also are raised. If the metadata indicates that an exception is to be raised, then a signal is sent to the interrupt unit in which the signal indicates that an exception is to be raised.

The process begins by receiving a bundle (step 800). An instruction in the bundle is identified (step 802). A determination is made as to whether a performance indicator associated with the instruction is present (step 804). The signal sent to the interrupt unit to indicate an exception is to be raised is different from the signal sent to the performance monitor unit. For example, an instruction may be associated with a specific performance indicator having a first value that causes a signal to be sent to the interrupt unit. A second value for a performance indicator may be used to send a different signal to the performance monitor unit. If a performance indicator having the first value is present, the signal is sent to an interrupt unit (step 806). Upon receiving this signal, the interrupt unit initiates appropriate call flow support to process this interrupt. The call flow support may, for example, record cache misses that may be missed by a functional unit trying to access instructions or data in a cache.

Additionally, the instruction is processed (step 808). Processing of the instruction includes, for example, sending the instruction to the appropriate functional unit for execution.

Thereafter, a determination is made as to whether additional unprocessed instructions are present in the bundle (step 810). If additional unprocessed instructions are present in the bundle, the process returns to step 802 as described above. Otherwise, the process terminates. Turning back to step 804, if the performance indicator is not present, the process proceeds directly to step 808.

With reference now to FIG. 9, a flowchart of a process for generating an interrupt in response to an access of a memory location associated with a performance indicator is depicted in accordance with a preferred embodiment of the present invention. The process illustrated in FIG. 9 may be implemented in a data cache, such as data cache 246 in FIG. 2.

The process begins by identifying a request to access a memory location (step 900). In response to identifying this request, a determination is made as to whether a performance indicator is associated with the memory location (step 902). If a performance indicator is associated with the memory location, an interrupt is generated by sending a signal to the interrupt unit (step 904). Thereafter, the access to the memory location is processed (step 906) with the process terminating thereafter.

In FIG. 10, a flowchart of a process for counting events is depicted in accordance with a preferred embodiment of the present invention. The process illustrated in FIG. 10 may be implemented in a performance monitor unit, such as performance monitor unit 240 in FIG. 2.

The process begins by receiving a signal from an instruction cache indicating that an instruction with a performance indicator is being processed (step 1000). Next, events associated with the instruction being processed are counted (step 1002) with the process terminating thereafter. The counting of events may be stored in a counter, such as counter 241 in FIG. 2.

With reference next to FIG. 11, a flowchart of a process for selective counting of instructions is depicted in accordance with a preferred embodiment of the present invention. The process illustrated in FIG. 11 may be implemented in an instruction cache, such as instruction cache 214 in FIG. 2.

The process begins by determining whether an instruction associated with a performance indicator has been received (step 1100). In this example, the indicator causes counting of events for this instruction and all subsequent instructions executed by the processor. Alternatively, the indicator could be an instruction itself which indicates the new mode of counting is to be started. If an instruction with an indicator has been received, a flag is set to start counting events for instructions (step 1102). This flag indicates that counting events for instructions should start.

Next, a determination is made as to whether an instruction with an indicator has been received (step 1104). Alternatively, the indicator could be an instruction itself which indicates the new mode of counting is to be stopped. If an instruction with an indicator is received, the flag is unset to stop counting the events (step 1106) with the process terminating thereafter.

The indicator in step 1100 and step 1104 may be the same indicator in which the indicator toggles the setting and unsetting of the flag. In another implementation, two different indicators may be used in which a first indicator only sets the flag. A second indicator is used to unset the flag. Communication between a cache unit, such as an instruction cache or a data cache, and the performance monitor unit to indicate a mode of counting may be implemented simply with a high signal when counting is to occur and a low signal when counting is no longer enabled.

With reference next to FIG. 12, a flowchart of a process for selective counting of instructions is depicted in accordance with a preferred embodiment of the present invention. The process illustrated in FIG. 12 may be implemented in an instruction cache, such as instruction cache 214 in FIG. 2.

The process begins by checking a flag (step 1200). A determination is made as to whether the flag is set (step 1202). If the flag is set, a signal is sent to the performance monitor unit to enable this unit to count events (step 1204) with the process terminating thereafter. Otherwise, a signal is sent to the performance monitor unit to disable the counting of events (step 1206) with the process terminating thereafter.

The processes illustrated in FIGS. 11 and 12 count events for all instructions after an instruction is associated with a performance indicator. In this manner, fewer bits may be used to toggle counting of events. Further, with the counting of all instructions, events associated with calls to external subroutines may be counted.

Turning now to FIG. 13, a flowchart of a process for identifying instructions exceeding a threshold is depicted in accordance with a preferred embodiment of the present invention. The process illustrated in FIG. 13 may be implemented in an instruction cache, such as instruction cache 214 in FIG. 2.

The process begins by receiving an instruction associated with a performance indicator (step 1300). A threshold is identified for the instruction (step 1302). In these examples, the threshold relates to a number of processor or clock cycles needed to complete an instruction. If the cache latency or amount of time needed to access the cache exceeds the threshold value, that event is counted. The threshold value is set within the indicator in these examples.

For example, three bits may be used to set eight different values for the threshold. For example, "xx1"=10 cycles, "x1x"=50 cycles, and "1xx"=100 cycles. Some combination of these three bits may be used to set values for the threshold. More or fewer bits may be used and different values may be assigned to the bits depending on the specific implementation. The meaning of the bits may also be controlled through an interface, such as a set of registers that may be used to set the meaning of each of the bits. These registers are ones that are added to the processor architecture for this specific purpose.

Cycles for executing the instruction are monitored (step 1304). A determination is made as to whether the threshold has been exceeded for this instruction (step 1306). If the threshold has been exceeded, then a selected action is performed (step 1308). This selected action may take different forms depending on the particular implementation. For example, a counter may be incremented each time the threshold is exceeded. Alternatively, an interrupt may be generated. The interrupt may pass control to another process to gather data. For example, this data may include a call stack and obtaining information about the call stack. A stack is a region of reserved memory in which a program or programs store status data, such as procedure and function call addresses, passed parameters, performance monitor counter values, and sometimes local variables.

A determination is made as to whether monitoring is to end (step 1310). Step 1310 may be implemented one instruction at a time. When an instruction is executed or the threshold is exceeded, a signal is sent. In this example, execution of a single instruction results in one signal being sent. In the case in which multiple instructions may be executed at the same time, multiple signals may be needed to indicate the execution of each instruction. In some embodiments, a sampling approach may be supported, where the threshold is only supported for one instruction at a time. This may be done by only supporting thresholds for those instructions that are in a particular position in the processor's instruction queue. In other embodiments, one signal may be sent if at least one of the marked instructions exceeds the threshold. For each instruction in which a threshold is exceeded, a separate signal is raised or generated for that instruction.

If the monitoring is to end, the collected information is sent to a monitoring program (step 1312), with the process terminating thereafter. Otherwise, the process returns to step 1304 as described above. In step 1306, if the threshold is not exceeded for the instruction, the process proceeds directly to step 1310.

A similar process may be implemented in a data cache, such as data cache 216 in FIG. 2 to monitor accesses to memory locations. The process illustrated in FIG. 13 may be adapted to identify the cycles needed to access data in a memory location. As with the execution of instructions, counting occurs or an interrupt is generated when the amount of time needed to access the data in a memory location exceeds a specified threshold.

As with the other examples, these indicators may be included as part of the instruction or with the data in a memory location. Alternatively, these indicators may be found in a performance instrumentation shadow cache or memory in association with the instruction or data.

With reference to FIG. 14, a flowchart of a process for monitoring accesses to a memory location is depicted in accordance with a preferred embodiment of the present invention. The process illustrated in FIG. 14 may be implemented in a data cache, such as data cache 216 in FIG. 2. This process is used to count accesses to data in a memory location.

The process begins by receiving data associated with a performance indicator (step 1400). A determination is made as to whether a memory location for the data has been accessed (step 1402). If the memory location has been accessed, then a counter is incremented (step 1404). A determination is made as to whether monitoring is to end (step 1406). If monitoring of the memory location is to end, the process terminates. Otherwise, the process returns to step 1402. In step 1402, if the memory location is not accessed, then the process proceeds to step 1406.

Turning to FIG. 15, a block diagram illustrating components used for generating metadata, such as performance indicators, is depicted in accordance with a preferred embodiment of the present invention. The compiler supports directives embedded in the source that indicate the metadata to be generated. Compiler 1500 may generate instructions 1502 for execution and metadata for monitoring. As instruction or data cache pages are loaded into memory, the operating system program loader/linker and/or the performance monitoring program, reads the metadata generated by compiler 1500 and loads the metadata into memory, such as performance monitor section 1506, in these examples. The section itself is marked as metadata 1504. The processor may accept metadata 1504 in the format of the compiler generated section data in performance monitor section 1506 and populate processor's internal performance instrumentation shadow cache with the data. A block oriented approach is described with reference to FIG. 17 below.

In one embodiment the format simply has a performance instrumentation shadow cache entry for each of its block or sector references and moves metadata 1504 to its corresponding shadow entry or entries. Instead of having a performance instrumentation shadow cache, the internal format of the cache itself may be modified to contain metadata 1504. In embodiments where the instruction stream itself is modified to contain the metadata, then either the loader updates the instruction stream to contain the appropriate indicators and work areas or compiler 1500 has generated the code to contain metadata 1504. In either case, after the code is loaded, the processor receives the metadata 1504

In addition, metadata 1504 may be placed into performance instrumentation shadow memory 1505 in association with instructions 1502. Compiler 1500 produces information in a table or debug data section. The performance monitoring program loads this information into shadow data areas in performance instrumentation shadow memory 1505. Alternatively, the debug areas may be automatically populated by the operating system and the processor working together.

Instructions 1502 may then be executed by processor 1508. Compiler 1500 may set a register such as mode register 1510 in processor 1508. When this register is set, processor 1508 looks at metadata 1504 in performance instrumentation shadow memory 1505 when executing instructions 1502 to determine whether performance indicators in metadata 1504 are associated with instructions that are being executed in instructions 1502. These performance indicators are handled using processes, such as those described above with reference to FIGS. 2-14. If mode register 1510 is not set, then metadata 1504 is ignored when instructions 1502 are executed.

A similar process may be performed with respect to data in memory location 1512. Depending on the particular implementation, metadata 1504 may be placed within the instruction or within the data, rather than in performance instrumentation shadow memory 1505. However, by placing metadata 1504 in performance instrumentation shadow memory 1505, the generation of metadata 1504 may be performed dynamically when metadata 1504 is placed in performance instrumentation shadow memory 1505.

This feature allows for selection and monitoring of instructions to occur without having to modify the program. In other words, compiler 1500 may generate metadata 1504 after instructions 1502 have been compiled for execution by processor 1508. Setting mode register 1510 causes processor 1508 to look for metadata 1504 in performance instrumentation shadow memory 1505 without having to modify instructions 1502. In these examples, metadata 1504 take the form of performance indicators that tell processor 1508 how to handle the execution of instructions 1502 and/or data accesses to memory location 1512.

Figure 16:
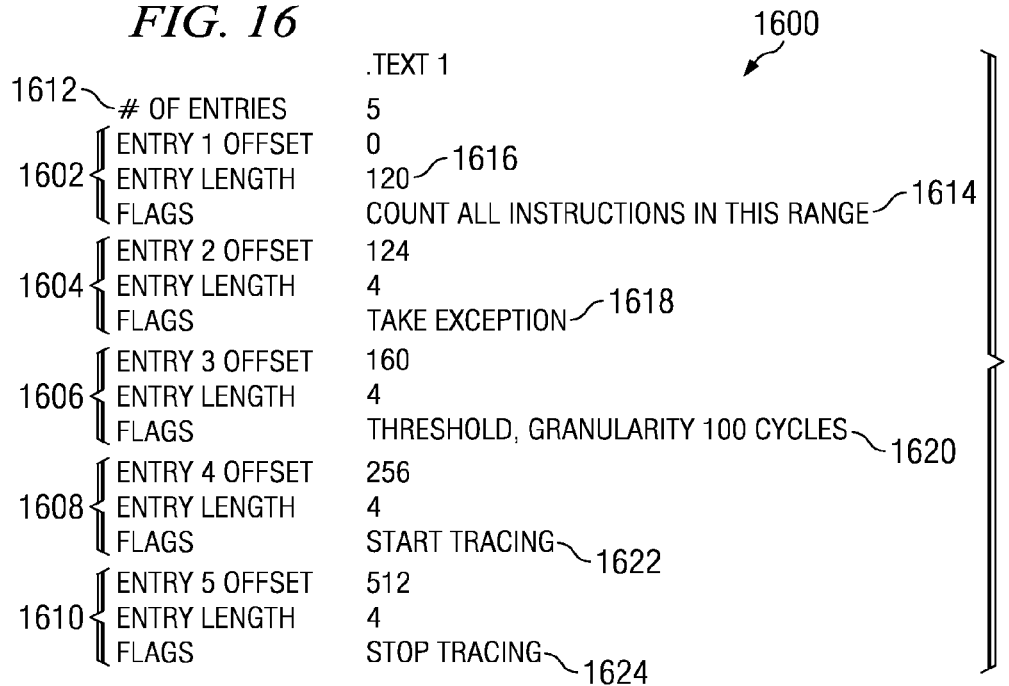
FIG. 16 is a diagram illustrating metadata in accordance with a preferred embodiment of the present invention.

Turning next to FIG. 16, a diagram illustrating metadata is depicted in accordance with a preferred embodiment of the present invention. Metadata 1600 is an example of metadata 1504 in FIG. 15. This metadata is generated by a compiler, such as compiler 1500.

In this example, metadata 1600 includes 5 entries, entry 1602, 1604, 1606, 1608, and 1610 as indicated by line 1612 in metadata 1600. Each of these entries includes an offset, a length, and a flag for describing the instrumentation of code in this example.

Entry 1602 has an offset of 0 with an entry length of 120 bytes. Flag 1614 indicates that all instructions within the range indicated by entry length 1616 need to be counted. In these examples, each instruction has a length of 4 bytes. Entry 1604 has an entry length of 4 bytes, which corresponds to an instruction. Flag 1618 indicates that an exception should be generated upon execution of this instruction.

In entry 1606, an instruction beginning at an offset of 160 bytes is associated with flag 1620. This flag indicates that the instruction should be counted if the threshold, 100 cycles, is exceeded.

Flag 1622 in entry 1608 indicates that tracing should start at the instruction having an offset of 256 bytes. Tracing stops as indicated by flag 1624 in entry 1610, which has a flag for the instruction at an offset of 512 bytes.

These flags are used to generate the performance indicators that are associated with the instructions. The operating system moves this metadata generated by the compiler and processes the metadata into a performance instrumentation shadow memory, such as performance instrumentation shadow memory 1506 in FIG. 15. Alternatively, this metadata may be placed into fields within the instructions depending on the particular implementation.

Figure 17:
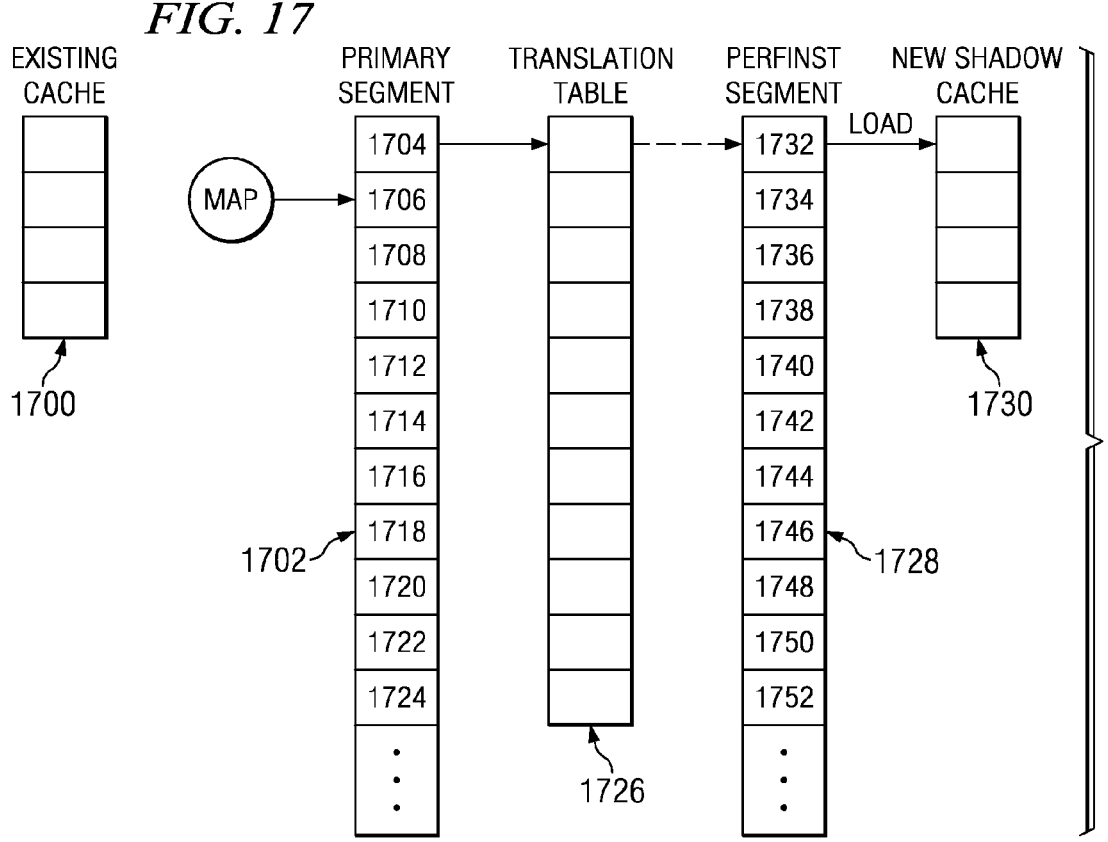
FIG. 17 is a diagram illustrating components involved in loading and maintaining a performance instrumentation shadow cache in accordance with a preferred embodiment of the present invention.

With reference now to FIG. 17, a diagram illustrating components involved in loading and maintaining a performance instrumentation shadow cache are depicted in accordance with a preferred embodiment of the present invention. In this example, existing cache 1700 contains primary segment 1702. Primary segment 1702 includes blocks 1704, 1706, 1708, 1710, 1712, 1714, 1716, 1718, 1720, 1722, and 1724. Translation table 1726 is used to provide a mapping for blocks 1704-1724 in primary segment 1702 to blocks in perfinst segment 1728. The data in this segment is placed into new performance instrumentation shadow cache 1730.

At program compile time, the compiler generates a new performance instrumentation data section as previously described. At program load time, the loader queries the processor to determine cache line size. The loader parses perfinst segment 1728 and constructs a shadow segment, in the format required by the processor, for any text or data segment that the loader loads. This shadow segment is placed into new performance instrumentation shadow cache 1730.

Each block in the shadow segment contains metadata for instructions or data in the corresponding primary cache block. This metadata includes, for example, flags, tag fields, threshold, and count fields for each tagged item in a block in primary segment 1702. This metadata also may include a flag that represents all the instructions or data in the block.

The loader constructs a table mapping, translation table 1726, for each block in primary segment 1702 to a corresponding perfinst block, such as block 1732, 1734, 1736, 1738, 1740, 1742, 1744, 1746, 1748, 1750, and 1752 in perfinst segment 1728. Further, the loader registers the head of this table, translation table 1726, and the location and size of primary segment 1702 with the processor.

At page replacement time, paging software provides a new interface to associate perfinst segment 1728 with the corresponding primary segment, primary segment 1702. When primary segment 1702 pages in or out, perfinst segment 1728 pages in or out as well.

At cache line replacement time, the processor contains new performance instrumentation shadow cache 1730 with cache frames directly associated with the frames in the existing data and instruction caches, such as existing cache 1700. When the processor's instruction or data cache loads a new line, it must also load the corresponding perfinst block into the performance instrumentation shadow cache, new performance instrumentation shadow cache 1730. The processor sees (from the registration data given by the loader at program load time) that the processor is bringing a block into its cache that has an associated perfinst segment, perfinst segment 1728. The processor looks in translation table 1726 associated with this segment, finds a reference to the perfinst block corresponding to the block it is about to load and loads the perfinst block into new performance instrumentation shadow cache 1730. In these examples, cache misses associated with metadata are not signaled or are treated differently from cache misses associated data in a primary cache block, such as in primary segment 1702.

With reference now to FIG. 18, a flowchart of a process for generating metadata for instructions is depicted in accordance with a preferred embodiment of the present invention. The process illustrated in FIG. 18 may be implemented by a performance monitoring program.

The process begins by identifying an instruction for profiling (step 1800). This instruction may be, for example, one that has been executed more than a selected number of times. Metadata is generated for the identified instruction (step 1802). This metadata takes the form of a performance indicator. The performance indicator may, for example, increment a counter each time the instruction is executed, increment a counter if the number of cycles needed to execute the instruction exceeds a threshold value, toggle counting of events for all instructions for all events after this instruction, or count events occurring in response to executing the instruction. In a preferred embodiment, the counters are in the associated performance instrumentation shadow cache and take some number of bits to allow for a one to one correspondence between the data or instructions in the cache and the bits reserved for counting.

The metadata is then associated with the instruction (step 1804). Next, a determination is made as to whether more instructions are present for processing (step 1806). If additional instructions are present, the process returns to step 1800. Otherwise, the process terminates. A similar process may be used to dynamically generate metadata for data in memory locations.

Figure 19:
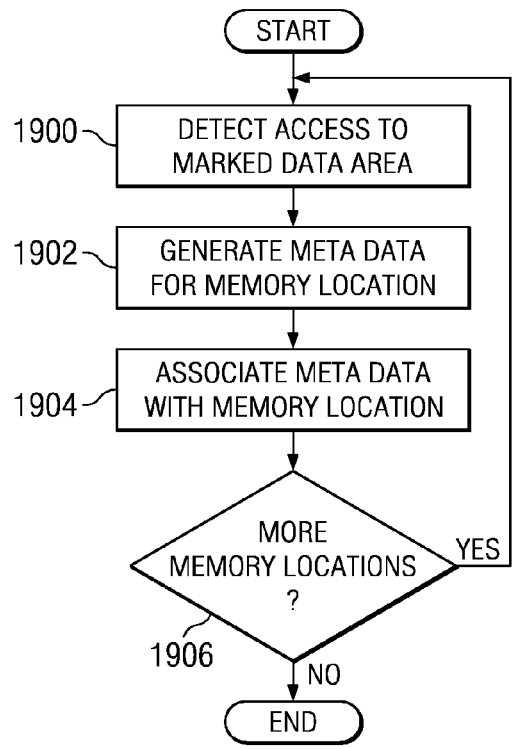
FIG. 19 is a flowchart of a process for generating metadata for memory locations in accordance with a preferred embodiment of the present invention.

With reference now to FIG. 19, a flowchart of a process for generating metadata for memory locations is depicted in accordance with a preferred embodiment of the present invention. The process illustrated in FIG. 19 may be implemented in a compiler such as compiler 1500 in FIG. 15.

The process begins by identifying a memory location for profiling (step 1900). Metadata is generated for the identified memory location (step 1902). This metadata takes the form of a performance indicator. The performance indicator may, for example, increment a counter each time the memory location is accessed, increment a counter if the number of cycles needed to access the memory location exceeds a threshold value, or toggle counting of all accesses to memory locations. The metadata is then associated with the memory location (step 1904). Next, a determination is made as to whether more memory locations are present for processing (step 1906). If additional memory locations are present, the process returns to step 1900. Otherwise, the process terminates.

Figure 20:
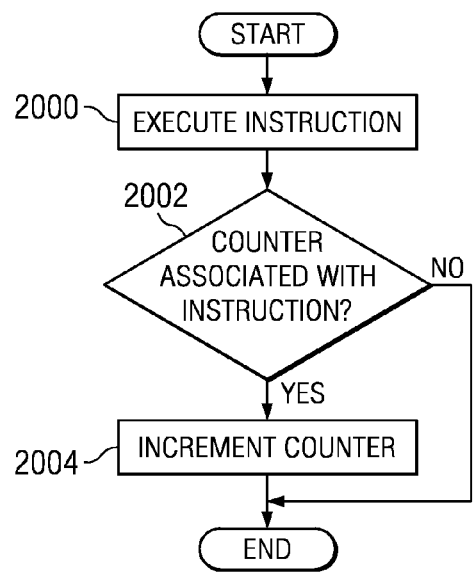
FIG. 20 is a flowchart of a process for counting execution for particular instructions in accordance with a preferred embodiment of the present invention.

Turning now to FIG. 20, a flowchart of a process for counting execution for particular instructions is depicted in accordance with a preferred embodiment of the present invention. The process illustrated in FIG. 20 may be implemented in an instruction cache such as instruction cache 214 in FIG. 2.

The process begins by executing an instruction (step 2000). A determination is made as to whether a counter is associated with the instruction (step 2002). The counter may be included in a field within the instruction or may be in a performance instrumentation shadow memory. If a counter is associated with the instruction, the counter is incremented (step 2004) with the process terminating thereafter. Otherwise, the process terminates without incrementing the counter. The counter may be reset if the counter exceeds a threshold value.

When the counter is implemented as part of the instructions, the counter may be of limited size. In this case, a threshold value for the counter may be set to indicate when the counter is in danger of overflowing. A value of the counter prior to the counter exceeding the threshold value or when the value is reached. The counter may then be reset after the value has been read. This value may be read by a performance monitor unit or by a program used to analyze data. APIs may be implemented to access this data.

Figure 21:
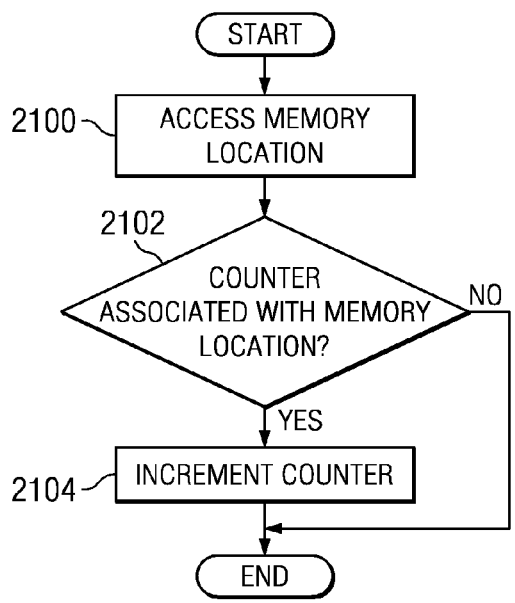
FIG. 21 is a flowchart of a process for counting accesses to a particular memory location in accordance with a preferred embodiment of the present invention.

Turning now to FIG. 21, a flowchart of a process for counting accesses to a particular memory location is depicted in accordance with a preferred embodiment of the present invention. The process illustrated in FIG. 21 may be implemented in a data cache, such as data cache 216 and instruction cache 214 in FIG. 2.

The process begins by detecting access to a memory location (step 2100). A determination is made as to whether a counter is associated with the memory location (step 2102). The counter may be included within the memory location or may be in a performance instrumentation shadow memory. If a counter is associated with the memory location, the counter is incremented (step 2104) with the process terminating thereafter. Otherwise, the process terminates without incrementing the counter.

Figure 22:
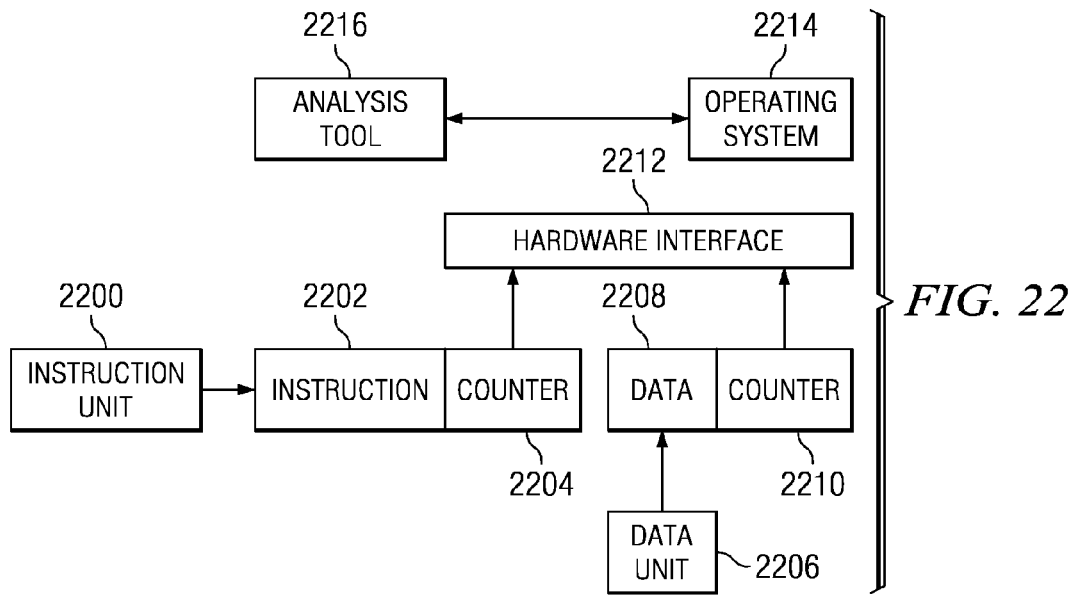
FIG. 22 is a diagram illustrating components used in accessing information collected with respect to the execution of instructions or the access of memory locations.

With reference next to FIG. 22, a diagram illustrating components used in accessing information collected with respect to the execution of instructions or the access of memory locations. In this example, instruction unit 2200 executes instruction 2202 and increments counter 2204. This counter is incremented each time instruction 2202 is executed. In this example, instruction unit 2200 may be implemented as instruction cache 214 in FIG. 2.

When the instruction or data cache pages are loaded into memory, the operating system program loader/linker and/or the performance monitoring program, reads the metadata generated by the compiler and determines that counting is associated with instruction or data access, then the loading process allocates data areas to maintain the counters as part of its perfinst segment. The size of the counters and the granularity of the data access determine the amount of work area to be allocated.

In a simple case, the granularity of the data or instruction access could be word size (so that an access to any byte in the word is considered an access) and the counts could also be a word size. In this case, one to many mapping is present between the primary segment and the perfinst segment (a full word to contain the counts or threshold is not required). The loading process allocates a shadow page or pages and tells the processor to use the shadow page(s) to contain the counts. Details of this mapping are described above with reference to FIG. 17. The cache unit in the processor maintains a shadow block entry to indicate the corresponding page to contain the count information. Different mapping and different levels of support could be provided.

In an alternative embodiment, the compiler allocates the work areas to maintain the counts and indicates the placement of these work areas in its generated data areas. An entry in the meta data could indicate the start of the data, the number of bytes of data, granularity of the data, the start of the count area, and the granularity of each counting unit. In either case, the metadata is loaded into the processor and the processor populates its internal (shadow) cache with the metadata. In embodiments in which the instruction stream itself is modified to contain the metadata, then either the loader updates the instruction stream to contain the appropriate indicators and work areas or the compiler has generated the code to contain the metadata. In either case, after the code is loaded, the processor receives the metadata.

Data unit 2206 may be implemented as data cache 206 in FIG. 2. In this example, each time data 2208 is accessed, counter 2210 is incremented. Data 2208 and counter 2210 are both located in a particular memory location. In these examples, a new instruction may be employed in which the instruction is called ReadDataAccessCount (RDAC) that takes a data address and a register and puts the count associated with that data address in the register.

Each of these events, instruction execution and data access, results in incrementing of a counter. The mechanism of the present invention provides an interface, hardware interface 2212, to access this collected data. In these examples, hardware interface 2212 takes the form of an application programming interface (API) for operating system 2214. In this way, analysis tool 2216 may obtain data from counter 2204 and counter 2210.

Although the examples in FIG. 22 illustrate providing an interface to an instruction unit and a data unit, hardware interface 2212 may be implemented to provide access to information from other units in a processor. For example, APIs may be created for hardware interface 2212 that allows for accessing information located in counters in a performance monitor unit, such as counter 241 and 242 in performance monitor unit 240 in FIG. 2.

Figure 23:
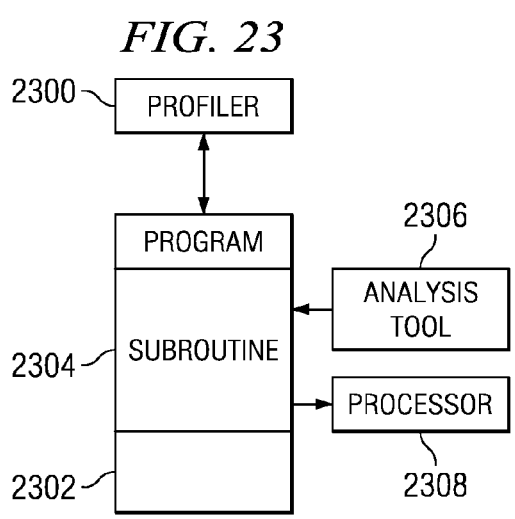
FIG. 23 is a block diagram of components used in autonomically modifying code in a program to allow selective counting or profiling of sections of code in accordance with a preferred embodiment of the present invention.

In FIG. 23, a block diagram of components used in autonomically modifying code in a program to allow selective counting or profiling of sections of code in accordance with a preferred embodiment of the present invention. In this example, profiler 2300 is a program, such as tprof, that may be used to identify routines of high usage in a program, such as program 2302. In these examples, "tprof" is a timer profiler, which ships with the Advanced Interactive Executive (AIX) operating system from International Business Machines (IBM) Corporation. This program takes samples, which are initiated by a timer. Upon expiration of a timer, tprof identifies the instruction executed. Tprof is a CPU profiling tool that can be used for system performance analysis. The tool is based on the sampling technique which encompasses the following steps: interrupt the system periodically by time or performance monitor counter; determine the address of the interrupted code along with process id (pid) and thread id (tid); record a TPROF hook in the software trace buffer; and return to the interrupted code.

Alternatively, a fixed number of counts of a performance monitor counter may be used instead of a timer. This program profiles subroutines that are used to indicate where time is spent within a program. A program having usage over a certain threshold also is referred to as being "hot". By using information from profiler 2300, routines of interest, such as subroutine 2304 in program 2302 may be identified.

With this information, the instructions in subroutine 2304 may be autonomically modified by analysis tool 2306 to allow counting of the execution of subroutine 2304. Additional routines may be identified for modification by analysis tool 2306. For example, subroutine 2304 also may be identified as a routine of interest with the instructions of this routine being modified to allow counting of the execution of subroutine 2304. The modification of the code in these routines includes associating performance indicators with one or more instructions within each of these subroutines.

After the instructions in these routines have been modified by analysis tool 2306, program 2302 is then executed by processor 2308. Processor 2308 executes program 2302 and provides counts for these routines. For example, the counting of instructions executed and the number of cycles used in executing a routine may be performed by processor 2308 using the mechanisms described above.

Figure 24:
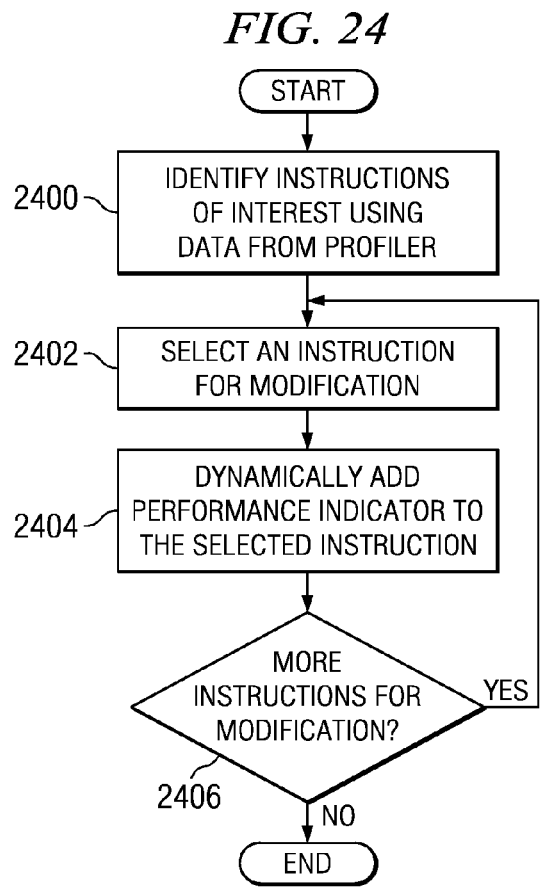
FIG. 24 is a flowchart of a process for dynamically adding or associating performance indicators to an instruction in accordance with a preferred embodiment of the present invention.

With reference to FIG. 24, a flowchart of a process for dynamically adding or associating performance indicators to an instruction is depicted in accordance with a preferred embodiment of the present invention. The process illustrated in FIG. 24 may be implemented in a program, such as analysis tool 2306 in FIG. 23.

The process begins by identifying instructions of interest using data from a profiler (step 2400). This profiler may be, for example, a timer profiler found in AIX. An instruction from the identified instructions is selected for modification (step 2402). Thereafter, a performance indicator is dynamically added to the selected instruction (step 2404).

In step 2404, the instruction may be added in a manner such that the instructions do not need to be modified for execution. A performance instrumentation shadow memory, such as performance instrumentation shadow memory 1506 in FIG. 15, may be employed to hold the performance indicators. In this situation, a register is set in the processor to indicate that the performance instrumentation shadow memory should be checked for performance indicators when executing instructions.

A determination is then made as to whether additional identified instructions are present for modification (step 2406). If additional instructions are present for modification, the process returns to step 2402. Otherwise, the process terminates.

Figure 25:
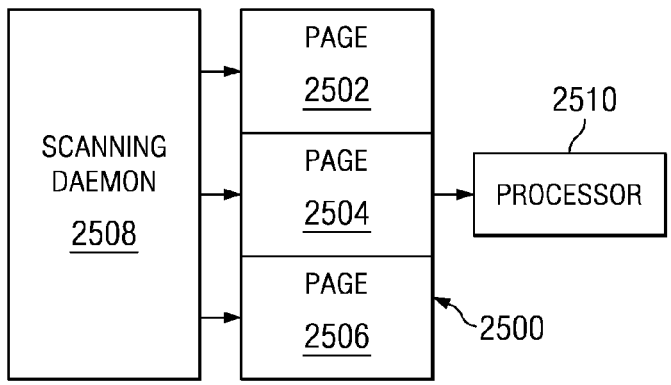
FIG. 25 is a diagram illustrating components used to scan pages through associating performance indicators with instructions in a page in accordance with a preferred embodiment of the present invention.

Turning next to FIG. 25, a diagram illustrating components used to scan pages through associating performance indicators with instructions in a page is depicted in accordance with a preferred embodiment of the present invention. The mechanism of the present invention uses performance indicators to allow instrumenting or modifying of instructions in a program one page at a time.

In this example, program 2500 contains three pages, page 2502, page 2504, and page 2506. Scanning daemon 2508 associates performance indicators with instructions in program 2500 one or more pages at a time. For example, the instructions in page 2502 may be associated with performance indicators by scanning daemon 2508. Program 2500 is then executed by processor 2510. Data from the execution of program 2500 may then be collected. This data includes, for example, counts of events occurring in response to instructions in page 2502, counting the number of times each instruction in page 2502 is executed, and/or identifying the number of visits to page 2502.

Next, scanning daemon may remove the performance indicators from instructions in page 2502 and associate performance indicators with instructions in page 2504. Program 2500 is then executed again by processor 2510, and data from execution of this program is collected. Then, instructions in page 2506 may be modified in program 2500 executed to collect data on that page.

In this manner, usages of routines typically not recorded by programs, such as a timer profiler, may be identified. A timer profiler may not record some usages of routines because interrupts may be inhibited or the timing of samples may cause synchronous non-random behavior. By modifying instructions in program 2500 counting a routine or other modules may be obtained in which the counts are unbiased and the system is unperturbed. In this manner, interrupt driven counting is avoided. Further, although the instrumenting of code is one page at a time, other groupings of instructions may be used in scanning a program, such as modules that form the program. For example, the grouping may be a single executable program, a library, a group of selected functions, and a group of selected pages.

Figure 26:
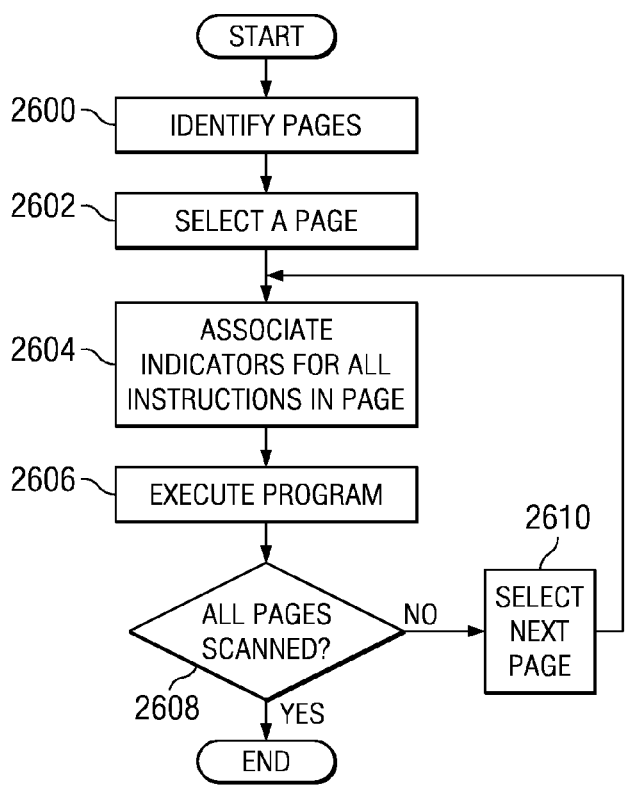
FIG. 26 is a flowchart of a process for associating indicators to instructions in a page in accordance with a preferred embodiment of the present invention.

Turning next to FIG. 26, a flowchart of a process for adding indicators to instructions in a page is depicted in accordance with a preferred embodiment of the present invention. The process illustrated in FIG. 26 may be implemented in a program, such as scanning daemon 2508 in FIG. 25.

First, a selection of pages is identified (step 2600). In this example, the pages are those in the program that are to be scanned or instrumented. Next, a page within the selection of pages is selected for modification (step 2602). Indicators are then associated with all of the instructions in the selected page (step 2604). The program is then executed (step 2606). Next, a determination is made as to whether all the pages with the selection have been scanned (step 2608). If all of the pages have been scanned, the process terminates thereafter. However, if not all pages have been scanned, the next page to be scanned is selected (step 2610), with the process returning to step 2604 as described above.

The process illustrated in FIG. 26 shows scanned groupings of instructions as pages. Depending on the particular implementation, other types of groupings of instructions, such as modules that form a program may be scanned or instrumented in this manner.

A program is employed to identify a caller from a routine from the information found in a call stack. This program allows for an identification of what has occurred in a routine and provides a summary of what has occurred in a program by identifying function calls that have been made. This program, however, requires instructions inserted in the code to obtain this information.

The mechanism of the present invention allows for identifying calls and returns without having to perform special code instrumentation. In particular, the function of generating an interrupt on a specific set of instructions may be used to gather information about the system and applications. In these examples, instructions for calls and returns are associated with a performance indicator that generates an interrupt.

By walking back up the call stack, a complete call stack can be obtained for analysis. A "stack walk" may also be described as a "stack unwind", and the process of "walking the stack" may also be described as "unwinding the stack." Each of these terms illustrates a different metaphor for the process. The process can be described as "walking" as the process must obtain and process the stack frames step-by-step or frame-by-frame. The process may also be described as "unwinding" as the process must obtain and process the stack frames that point to one another, and these pointers and their information must be "unwound" through many pointer dereferences.

The stack unwind follows the sequence of function/method calls at the time of an interrupt is generated in response to execution of an instruction associated with a performance indicator. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during interrupt processing or at post-processing initiated by execution of an instruction associated with a particular performance indicator, the generated sample-based profile information reflects a sampling of call stacks, not just leaves of the possible call stacks, as in some program counter sampling techniques. A leaf is a node at the end of a branch, i.e. a node that has no descendants. A descendant is a child of a parent node, and a leaf is a node that has no children.

Figure 27:
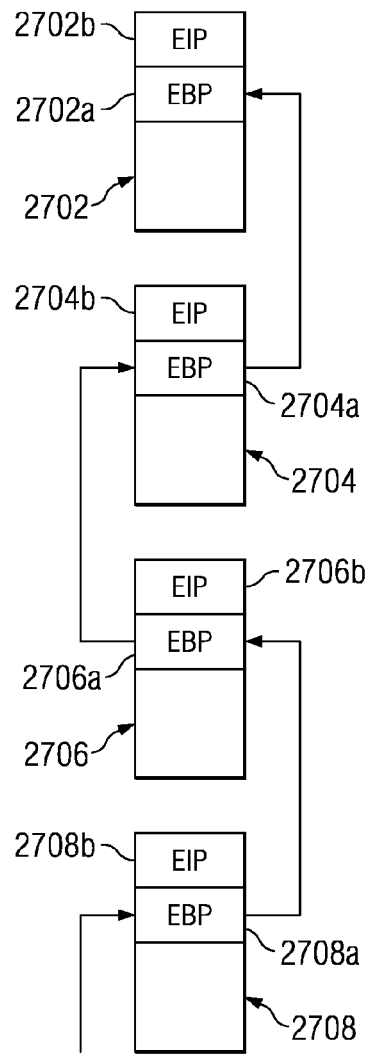
FIG. 27 is a diagram depicting call stack containing stack frames in accordance with a preferred embodiment of the present invention.

With reference now to FIG. 27, a diagram depicting call stack containing stack frames is depicted in accordance with a preferred embodiment of the present invention. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls—in other words, it reflects the function invocation sequence at any point in time.

Call stack 2700 includes information identifying the routine that is currently running, the routine that invoked it, and so on all the way up to the main program. Call stack 2700 includes a number of stack frames 2702, 2704, 2706, and 2708. In the depicted example, stack frame 2702 is at the top of call stack 2700, while stack frame 2708 is located at the bottom of call stack 2700. The top of the call stack is also referred to as the "root". The interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame).

By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architecture, this example is not a restriction. Most architectures employ linkage conventions that can be similarly navigated by a modified profiling interrupt handler.

When an interrupt occurs, the first parameter acquired is the program counter value. The next value is the pointer to the top of the current stack frame for the interrupted thread. In the depicted example, this value would point to EBP 2708a in stack frame 2708. In turn, EBP 2708 points to EBP 2706a in stack frame 2706, which in turn points to EBP 2704a in stack frame 2704. In turn, this EBP points to EBP 2702a in stack frame 2702. Within stack frames 2702-2708 are EIPs 2702b-2708b, which identify the calling routine's return address. The routines may be identified from these addresses. Thus, routines are defined by collecting all of the return addresses by walking up or backwards through the stack.

Obtaining a complete call stack may be difficult in some circumstances, because the environment may make tracing difficult, such as when an application having one call stack makes a call to a kernel having a different call stack. The hardware support provided by the mechanism of the present invention avoids some of these problems.

Turning next to FIG. 28, a flowchart of a process for identifying events associated with call and return instructions in which data is collected from a performance monitor unit is depicted in accordance with a preferred embodiment of the present invention. The process illustrated in FIG. 28 may also be implemented for an analysis tool, such as analysis tool 2216 in FIG. 22.

The process begins by identifying call and return instructions (step 2800). The instructions for calls and returns are ones of interest for determining when a routine has been called and when a routine completes. This may be accomplished for interrupts, interrupt returns, system calls, and returns from system calls.

Next, performance indicators are associated with the identified call and return instructions (step 2802). The program is then executed (step 2804), and data is collected from the performance monitor unit (step 2806) with the process terminating thereafter. This information may be collected through interfaces, such as hardware interface 2212 illustrated in FIG. 22 in which APIs are employed to obtain data collected by the different functional units in a processor.

With this data, identifications of callers of routines may be made. This information may be used to generate data structures, such as trees to track and present information regarding the execution of the program. This generation of data structures may be implemented using processes similar to those provided in analysis tools.

Turning next to FIG. 29, a flowchart of a process for identifying routines that have been executed more than a selected number of times is depicted in accordance with a preferred embodiment of the present invention. The process illustrated in FIG. 29 may be implemented in a functional unit within a processor, such as instruction cache 214 in FIG. 2. This process is used to identify counts of instructions that are executed and to generate an interrupt when these instructions have occurred more than some selected number of times.

First, a determination is made as to whether an execution of a selected instruction is detected (step 2900). This determination is made by examining each instruction that is executed to see whether a performance indicator is associated with the instruction. These performance indicators may be associated with the instructions through different tools, such as compiler 1500 in FIG. 15 or analysis tool 2216 in FIG. 22.

If execution of an instruction containing a performance indicator is not identified, the process returns to step 2900 until a selected instruction is detected. If a selected instruction is identified as being executed, a counter with a set threshold is incremented for that selected instruction to count how often that particular instruction is executed (step 2902). In these examples, each instruction identified for monitoring is assigned a counter.

Next, a determination is made as to whether the set threshold has been reached (step 2904). Threshold values are initially determined by using documented cache miss times, for each of the cache levels. However, increasing times are used to determine problems caused by cache interventions (accesses from other processors). Repeated runs with different values may be made to identify the areas with the worst performance.

In these examples, the instruction may be associated with an indicator that includes an indication that execution of the instruction is to be monitored as well as providing a counter. Further, count criteria may be included to identify when an interrupt is to be generated. For example, an interrupt may be generated when the instruction has been executed more than thirteen times.

If the threshold has not been reached, the process returns to step 2900 as described above. If the set threshold has been reached, an interrupt is sent to the monitoring program (step 2906) with the process terminating thereafter. This interrupt may be sent to an interrupt unit, such as interrupt unit 250 in FIG. 2, which passes control to the appropriate procedure or process to handle the interrupt.

This process may be especially useful for routines with many branches. In this case, all branch instructions would be flagged for counting. Information derived by this type of counting may be useful for identifying improvements for compiler and just-in-time (JIT) code generation by minimizing branches or adjusting hint flags, supported in the instruction architecture of the processor that is used.

Turning next to FIG. 30, a flowchart of a process for examining a call stack and identifying a caller of a routine when a particular instruction is executed more than some selected number of times is depicted in accordance with a preferred embodiment of the present invention. The process illustrated in FIG. 7 may be initiated by an interrupt unit, such as interrupt unit 250 in FIG. 2. This process is used to identify a call in routine and may be used to recursively obtain information for callers.

First, a call stack is examined and the caller of a routine is identified (step 3000). Next, a count of the number of instructions executed is captured from the instruction cache (step 3002). The count is for a counter used in step 2902 in FIG. 29. The counter is then reset (step 3004) with control thereafter returned from the interrupt (step 3006). The information obtained in the process in FIG. 30 may be used to identify additional routines for monitoring to recursively identify callers of routines.

Figure 31:
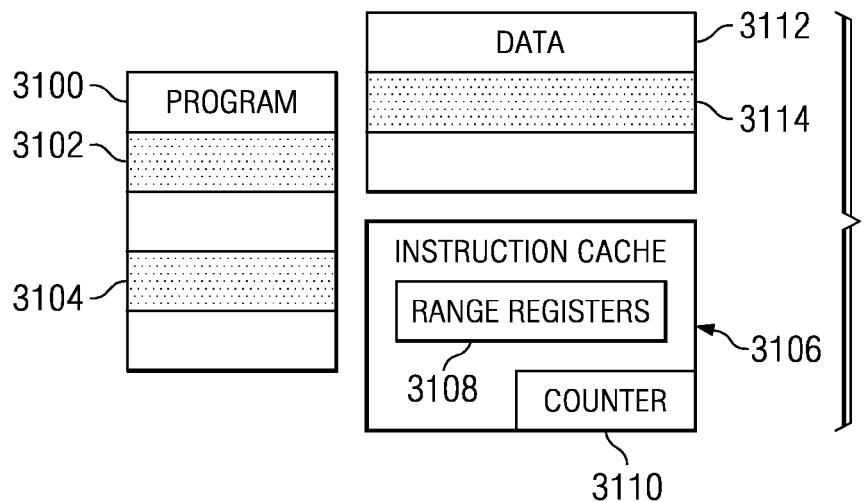
FIG. 31 is a diagram illustrating ranges of instructions and data that has been selected for monitoring in accordance with a preferred embodiment of the present invention.

Turning next to FIG. 31, a diagram illustrating ranges of instructions and data that has been selected for monitoring is depicted in accordance with a preferred embodiment of the present invention. In this example, program 3100 includes instruction range 3102 and 3104. Each of these ranges have been identified as ones of interest for monitoring. Each of these ranges is set within an instruction unit, such as instruction cache 214 in FIG. 2. Each range is used by the processors to count the number of instructions executed in a range, as well as the number of times a range is entered during execution of program 3100.

Instruction cache 3106 uses range registers 3108 to define instruction ranges. These registers may be existing registers or instruction cache 3106 may be modified to include registers to define instruction ranges. These ranges may be based on addresses of instructions. Additionally, range registers 3108 may be updated by various debugger programs and performance tools.

If an instruction is executed in a range, such as instruction range 3102 or instruction range 3104, a counter is incremented in instruction cache 3106. Alternatively, the instruction may be sent to a performance monitor unit, such as performance monitor unit 240 in FIG. 2. The performance monitor unit tracks the count of the number of instructions executed within the range and the number of times the instruction range is entered in these examples.

Data accesses may be monitored in a similar fashion. For example, data 3112 includes data range 3114. Data accesses to data range 3114 may be counted in a similar fashion to execution of instructions within instruction range 3102 or instruction range 3104. These ranges may be defined in registers within a data unit, such as data cache 216 in FIG. 2.

These ranges for data may be defined in the register as a range of memory locations for the data.

Figure 32:
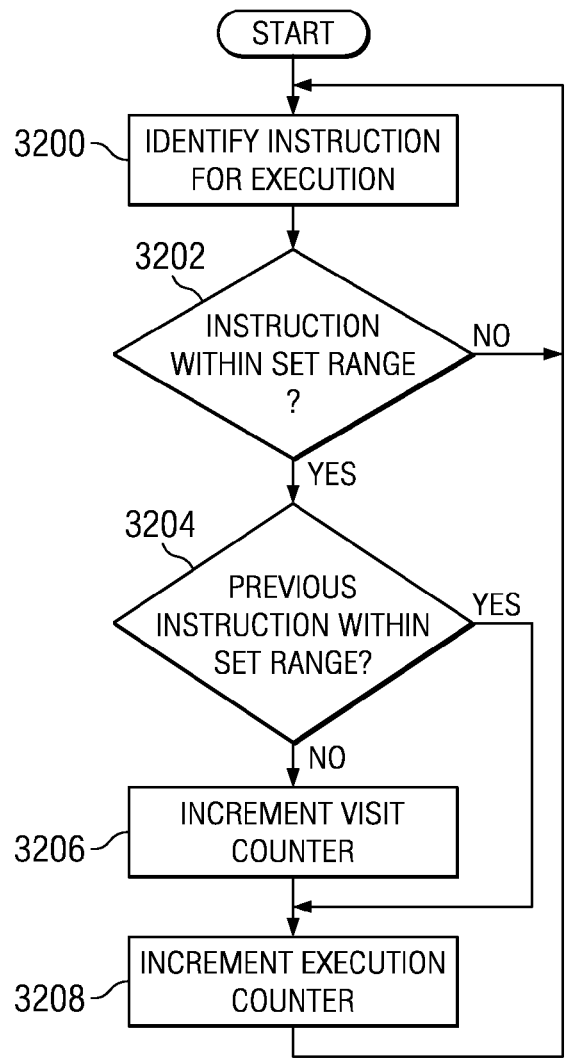
FIG. 32 is a flowchart of a process for counting the number of visits to a set range as well as the number instructions executed within a set range in accordance with a preferred embodiment of the present invention.

Turning next to FIG. 32, a flowchart of a process for counting the number of visits to a set range as well as the number of instructions executed within a set range is depicted in accordance with a preferred embodiment of the present invention. The process illustrated in FIG. 32 may be implemented in an instruction unit, such as instruction cache 214 in FIG. 2.

First, an instruction is identified for execution (step 3200). Next, a determination is made as to whether the instruction is within a set range of instructions (step 3202). The range may be identified by examining registers defining one or more instruction ranges. If the instruction is not within a set range of instructions, the process returns to step 3200 as described above. If the instruction is within a set range of instructions, a determination is made as to whether the previous instruction was within the set range (step 3204). If the previous instruction was not within the set range of instructions, a visit counter is incremented to tell the processor how many times the instruction range is entered (step 3204). Additionally, an execution counter is incremented to count the number of instructions executed within the set range of instructions (step 3206) with the process terminating thereafter.

With reference again to step 3204, if the previous instruction was within the set range of instructions, the process proceeds to step 3208 as described above.

A similar process to the one illustrated in FIG. 32 may be implemented for access to data. In this case, the process would typically be implemented in a data unit, rather than in an instruction unit.

As discussed above, there are many possible applications of the hardware assistance offered through the counting mechanisms of the present invention as well as the performance indicators associated with instructions/data addresses. The following descriptions are intended to provide additional embodiments of the present invention in which the performance indicators and counting mechanisms described above are utilized in different ways to achieve improved profiling ability with regard to computer programs. The embodiments described above and hereafter may be utilized separately or in various combinations without departing from the spirit and scope of the present invention.

Context switching needs to update the pointers to point to the appropriate metadata. The context may change from one thread to another or from one routine to another or to a library. Any of these transfers of control may have a new context. The registers that set up as part of the calling sequence, may include registers that indicate the new shadow cache data.

As previously described above with regard to FIGS. 13, 14 and 29, the performance indicators and counters of the present invention may be used to determine the number of times an instruction is executed, a data address is accessed, a routine is executed, and the like. In addition, a determination may be made as to whether the instruction, data area, or routine is executed/accessed more than a threshold number of times in order to determine whether to perform a subsequent action. In a further embodiment of the present invention, these mechanisms are utilized to determine hot spots within a cache or memory in order to improve the performance of the computer program being profiled by the mechanisms of the present invention.

That is, instructions and/or data areas of the computer program, cache or memory are instrumented by the addition of performance indicators in the manner previously described above. When counts of the instructions/data area accesses exceed established thresholds, this may be an indication of a "hot spot" area of the cache or memory, i.e. an area that consumes a relatively larger amount of processor time than other areas.

FIG. 33 is an exemplary block diagram of the primary operational elements of one exemplary embodiment of the present invention when determining hot spots of a cache/memory. With the depicted embodiment of the present invention, when the counter 3310 for an instruction 3312 or data address or range of addresses of a cache 3320 or memory is incremented in response to detection of a performance indicator (PI) associated with the instruction/data address or area, a determination is made as to whether the count exceeds a predetermined threshold, such as in steps 2900-2904 of FIG. 29, for example. If the predetermined threshold is exceeded, an interrupt is sent to a monitoring program 3330 (see step 2906 of FIG. 29).

With this embodiment of the present invention, upon receiving the interrupt, an interrupt handler 3332 of the monitoring program 3330 recognizes the interrupt and determines the instruction to be associated with a hot spot area of the cache or memory. The routine/method in which the instruction is located is determined to be the hot spot. As a result, the cache or memory addresses of the instructions of the routine/method determined to be a hot spot are identified.

The interrupt handler 3332 copies the metadata associated with these instructions at the cache/memory addresses of the routine/method to a storage location 3340 that is designated for use by an analysis engine 3350 to analyze the metadata to determine an optimization scheme for the routine/method. For example, the metadata may be stored to a trace file for later use in trace analysis. The detection of hot spots in this manner may be continued during the profiling of the computer program. If the same area is again detected to be a hot spot area, the information in the storage area may be updated with a new version of the metadata for the hot spot instructions/data areas.

Thereafter, such as during post-processing of the trace data obtained during profiling of the execution of the computer program, the metadata for the hot spots may be analyzed to determine performance improvement methodologies that may be used to increase the performance of the computer program. For example, particular instructions within the hot spot may be identified as being executed more often than others. The code for the routine/method may then be modified such that the execution of these instructions is optimized.

For example, if the instructions within a hot spot routine/method that are executed more than other instructions are associated with a particular branch, the code may be optimized by reorganizing the instructions to achieve a contiguous execution of the code flow. That is, computing cycles may be saved by reducing the amount of speculative processing by reorganizing the instructions of the routine such that the code that has the most often taken branches is repackaged into a set of instructions that are executed in a more contiguous manner with the other instructions of the hot spot routine/method thereby reducing the amount of branching of the code flow and cache misses.

In still another embodiment of the present invention, the range of cache or memory addresses associated with the hot spots are determined and the instructions/data associated with these cache or memory addresses are copied to a hot spot shadow data structure 3360. A mapping of the old address in the cache 3320 or memory to the new address in the hot spot shadow data structure 3360 is generated. The mapping may be implemented by a pointer associated with the old memory address location, a mapping table 3370, or the like. Thereafter, when accesses to the old address are attempted, the access attempt is mapped to the new data structure. Alternatively, the code itself may be modified such that the instructions that access the old address are changed to access the new address in the hot spot data structure.

By locating the hot spots of the cache in a shadow data structure 3360, the hot spot data is centrally located. This allows for a reduction in the cache flushing and fetching that would otherwise be needed. As a result, machine cycles are saved. If multiple processors are sharing the same cache-line for different data, then the data could be separated out by processor access. This will again prevent frequent cache flushes, which results in saving machine cycles. Furthermore, at some point, all of the addresses will be mapped to the cache or shadow cache data structure. This will result in faster memory accesses.

Other methods of optimizing code based on hot spot detection are generally known in the art. The present invention may make use of any known hot spot optimization technique. One of the principle differences between the known hot spot optimization techniques and the present invention is that the present invention identifies hot spots based on the performance indicators and counters described previously.

Figure 34:
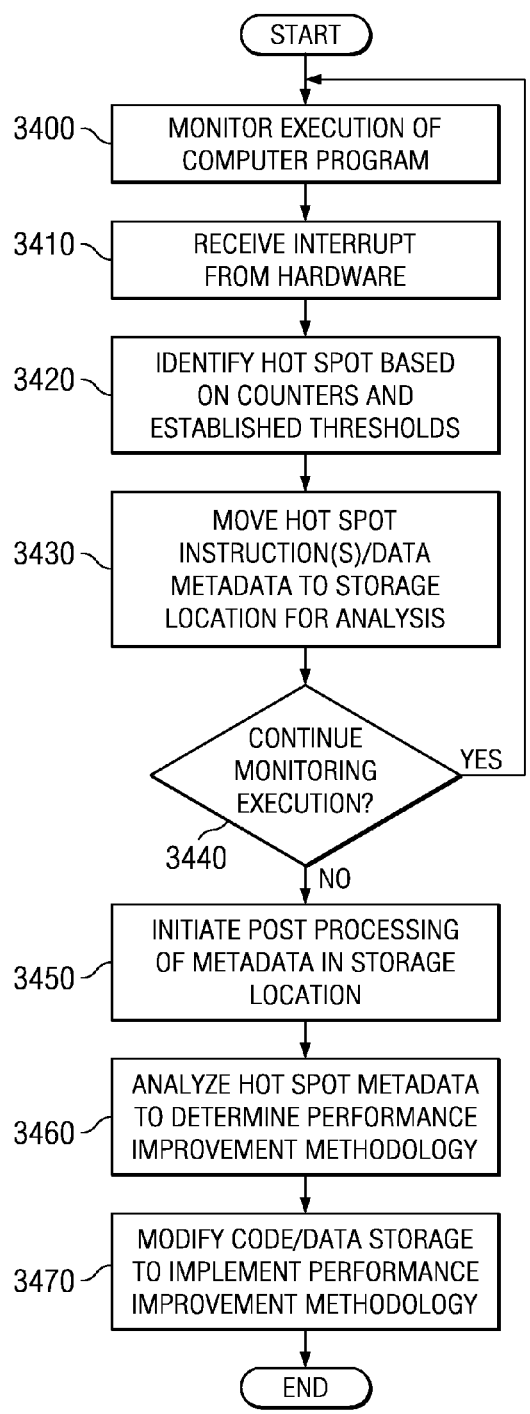
FIG. 34 is a flowchart outlining an exemplary operation of an embodiment of the present invention when identifying hot spots of instructions/data in a cache or memory.

FIG. 34 is a flowchart outlining an exemplary operation of an embodiment of the present invention when identifying hot spots of instructions/data in a cache or memory. As shown in FIG. 34, the operation starts by monitoring the execution of the computer program in the manner previously described (step 3400). This monitoring involves incrementing hardware counters of instructions/data addresses that have been instrumented with performance indicators. At some time during the monitoring of the computer program execution, an instruction is executed or a data address is accessed more than a threshold number of times and an interrupt is sent to the performance monitoring application. The interrupt is received by the performance monitoring application (step 3410) and the hot spots are identified based on the counters and established thresholds (step 3420).

That is, those instruction addresses/data addresses of the cache or memory that have been instrumented with performance indicators in the manner described above, and that are accessed more than a threshold number of times, are identified based on the values stored in the counters associated with these instruction/data addresses. The routines/methods associated with these instrumented instructions whose counter values exceed a predetermined threshold are identified based on the code of the computer program. The instruction/data addresses for these routines/methods in the cache or memory are then identified.

The metadata associated with these instruction/data addresses of the identified hot spot is copied to a storage location, such as a trace data file, designated by the performance monitoring application (step 3430). A determination is made as to whether continued monitoring of the execution of the computer program is to be performed (step 3440). If so, the operation returns to step 3400. If not, post-processing of the data obtained during the performance monitoring is performed (step 3450).

As part of this post-processing, the hot spot metadata stored in the designated storage location is analyzed to determine how the processing of the hot spot metadata may be optimized (step 3460). That is, characteristics of the metadata may be identified and compared to optimization criteria associated with different optimization techniques. An optimum optimization technique may then be selected and the code/data storage may be modified to implement the selected optimization technique (step 3470). Thereafter, the operation terminates.

Figure 35:
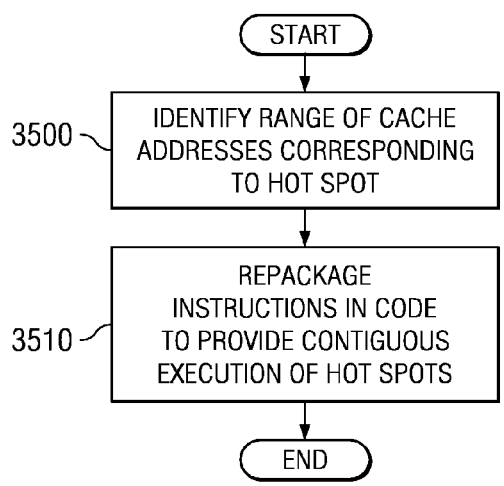
FIG. 35 is a flowchart outlining an exemplary operation of an embodiment of the present invention when repackaging instructions in code for contiguous execution.

As mentioned above, the optimization of the code/data storage may take many different forms. In some cases, optimizing of the code may include repackaging the instructions in the code to provide contiguous execution of the hot spots with the other instructions in the computer program. FIG. 35 illustrates such a method. As shown in FIG. 35, the range of cache addresses corresponding to the hot spot are identified (step 3500). Thereafter, the instructions are repackaged to provide contiguous execution of the hot spots (step 3510). Examples of ways in which instructions and data may be repackaged to provide contiguous access of hot spots are provided in U.S. Pat. No. 5,212,794 entitled "Method for Optimizing Computer Code to Provide More Efficient Execution on Computers Having Cache Memories" and U.S. Pat. No. 5,689,712 entitled "Profile-Based Optimizing Post-Processors for Data References", both of which are hereby incorporated by reference.

Figure 36:
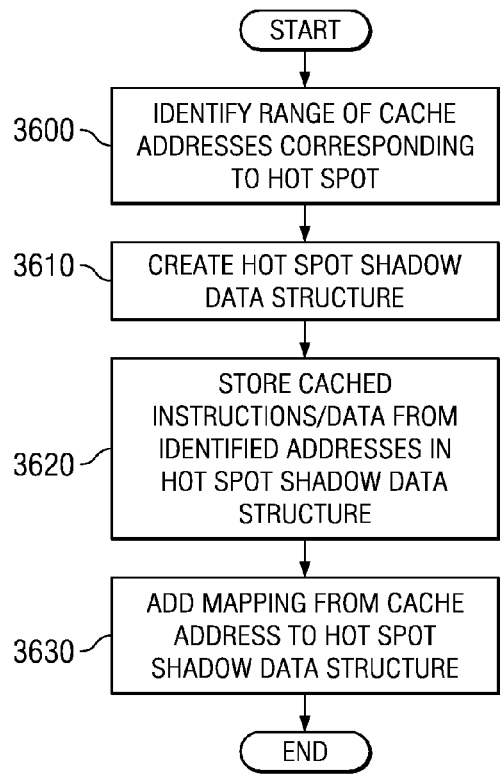
FIG. 36 is a flowchart outlining an exemplary operation of an embodiment of the present invention when optimizing the execution of code using a shadow data structure to store hot spots.

FIG. 36 illustrates an alternative method of optimizing the execution of code. As shown in FIG. 36, the code may be optimized by moving hot spots to a dedicated shadow data structure and mapping accesses to the old cache or memory addresses to go to the new addresses in the shadow data structure.

As shown in FIG. 36, the operation starts by identifying the range of cache addresses (either instruction or data) corresponding to the hot spot (step 3600). A hot spot shadow data structure is then created (step 3610). The instructions/data from the identified cache or memory addresses are then copied to the new addresses in the hot spot shadow data structure (step 3620). A mapping from the current cache or memory address to the new address in the shadow data structure is established (step 3630) and the operation terminates. Thereafter, when there is an access of a cache or memory address that has been mapped to the new shadow data structure, the access is redirected to the new address in the new shadow data structure. This mapping may be implemented by causing an interrupt whenever the old data area is accessed. The interrupt handler may then modify the code that accesses the old data area so that it will now access the new data area.

Thus, the present invention, in addition to the previously described embodiments, provides embodiments in which hot spots within caches or memories may be identified using the performance indicators, hardware counters and established thresholds. In addition, the present invention provides embodiments in which code and/or data storage may be optimized based on the detection of hot spots.

In a further embodiment of the present invention, the performance indicators and counters may be used in a more complex fashion to determine when an interrupt is to be sent to an interrupt handler of a monitoring application for processing. That is, the previous embodiments of the present invention have been described in terms of the counter values, individually, being used as a basis for determining whether to send an interrupt to the interrupt handler of the monitoring application. Thus, for example, when one counter associated with a particular instruction, range of instructions, data address, or range of data addresses, exceeds a given threshold, an interrupt may be sent to the interrupt handler of the monitoring application to thereby perform hot spot detection processing, as previously described.

In a further embodiment of the present invention, an arithmetic combination of counter values may be utilized to determine if an interrupt is to be sent to the interrupt handler of the monitoring application. The performance monitor unit may periodically check the counter values for a predetermined set of counters and combine them in an arithmetic manner, as specified in the microcode of the performance monitor unit, to determine whether a condition exists requiring an interrupt to be sent to the monitoring application.

FIG. 37 is an exemplary diagram illustrating an exemplary embodiment of the present invention when performing an arithmetic combination of counter values to determine whether to send an interrupt to a monitoring application or not. As shown in FIG. 37, counters 3720 and 3740 and registers 3710, 3730, and 3750 are provided in the hardware 3700 of the processor, such as the counters 241 and 242 of the performance monitor unit 240 in FIG. 2, of the computing device executing the program whose execution is being monitored. Register 3710 maintains a register value X corresponding to a value communicated to the performance monitoring unit by a performance monitoring application. Counter 3720 maintains a count A corresponding to a first performance indicator that is encountered during performance monitoring. Register 3730 maintains another register value Y corresponding to another value communicated to the performance monitoring unit by a performance monitoring application and counter 3740 maintain a count B of a second performance indicator during performance monitoring.

Register 3750 stores a threshold value Z against which the arithmetic combination of the values X, Y, A and B is to be compared in order to determine whether to send an interrupt or not. In the present invention, the performance indicators may be associated with instructions or portions of data. For example, the performance indicators may be associated with addresses in an instruction cache, data cache, or memory, i.e. instruction addresses or data addresses.

Periodically, or upon the occurrence of an event, such as incrementing of one of the counters 3720 or 3740, the microcode 3760 of the performance monitor unit checks the current values X, Y, A and B of the counters 3720, 3740 and registers 3710 and 3730 against the threshold value Z of the register 3750. The particular counters 3720 and 3740 and registers 3710 and 3730 whose values are to be combined to determine whether to generate an interrupt, are identified based on information passed to the performance monitor unit by the monitoring application. That is, the monitoring application, upon initialization, may inform the performance monitor unit that the counters associated with particular types of instructions, ranges of instructions, data addresses, or ranges of data addresses are to be combined along with particular register values and compared to a particular threshold value. In addition the monitoring application may instruct the performance monitor unit in the manner by which the counter and register values are to be combined. This information may then be stored in the performance monitor unit for use when combining the values of the counters to determine if an interrupt is to be generated. Alternatively, the performance monitor unit may be hard-coded with the particular combination of counters and registers that will always be checked.

For example, the performance monitoring application may interface with a device driver that initializes the counters in the hardware. The performance monitoring application may inform the device driver regarding what is to be counted, e.g., instructions, cache misses, memory accesses, etc., what thresholds to use, the vector, e.g., pointer, to a portion of code that is to be executed when the threshold is met or exceeded, and other miscellaneous control information. In addition, the performance monitoring application, through the device driver, may set the multipliers, i.e. the register values, for the original counter values in order to scale the events being counted by each counter, and the like. The device driver may then set appropriate bits and register values in the hardware to indicate which counters are to be combined and which register values are to be compared against. For example, a bit mask or the like, may be used to identify which counters and registers are to be combined as well as the manner by which these counters are to be combined.

Once the device driver has initialized the base event counters and the combined event counters, execution of the computer program is started. Every time the base counters are incremented, the hardware will update the combined counters based on the values of the base counters and the multipliers, i.e. the register values, and check if the thresholds have been reached or exceeded. When any of the thresholds have been reached or exceeded, the hardware may initiate an interrupt and transfer control to the interrupt handler of the performance monitoring application. At this point the interrupt handler executes to perform desired actions. For example, an event may be logged to the performance monitoring application buffer or log, a log daemon process may be notified that an event has occurred, or the like.

The microcode 3760 performs the check of the designated counters by first generating an arithmetic combination of the counter values to generate a combination counter value. The combination counter value may be stored in a combination counter or register and may then be compared against the value stored in register 3750 to determine if a predetermined relationship exists.

In the depicted example, the value X of register 3710 is multiplied by the value A of the counter 3720 and the value Y of register 3730 is multiplied by the value B of counter 3740. The products of these operations are then added to generate the combined counter value that is equal to $X*A+Y*B$. The combined counter value is then compared to the register value Z to determine if it is greater than Z. If not, performance monitoring is continued without generating an interrupt. If the combined counter value is greater than Z, then an interrupt is sent to the monitoring application for processing.

Thus, for example, the performance monitoring application may inform the processor that a particular routine is of particular interest and that the number of cycles per instruction for the routine is to be monitored and used as a basis for determining if an interrupt is to be generated. For example, it may be determined that when the number of cycles per instruction is greater than 3, an interrupt should be generated and sent.

In this example, when making the determination as to whether to send an interrupt, counter values may be associated with the routine for counting the number of instructions and the number of processor cycles. A multiplier value of 3 may be stored in a first register and a multiplier value of −1 may be stored in a second register. The threshold value may be designated to be zero and stored in a threshold value register. The resulting equation obtained from the combination of the register values and the counters may be of the type:

$$3*\text{number of instructions} - 1*\text{number of cycles} > 0$$

When this relationship is satisfied, the number of cycles per instruction is greater than 3 and thus, an interrupt is generated and sent. This relationship may be checked, for example, every time the number of instructions counter is incremented or the number of cycles counter is incremented.

Thus, rather than merely checking to see if the number of instructions is more than a predetermined number or if the number of cycles is more than a predetermined number, the combination of counter values according to the present embodiment allows for a complex condition in which a combination of the scaled number of instructions executed and the scaled number of cycles is used as a basis for determining whether to generate an interrupt.

While FIG. 37 illustrates a specific exemplary combination of two counter values and two register values being compared to a single register value, the present invention is not limited to such. Rather, any combination of counter and register values may be made by establishing the proper combination within the microcode 3760 of the performance monitor unit. Moreover, various combinations of counter and register values may be compared to various register values without departing from the spirit and scope of the present invention. The primary concept of this embodiment of the present invention being the ability of the present invention to combine the values of multiple performance monitor counters and register values in any suitable manner to determine whether to generate an interrupt.

Figure 38:
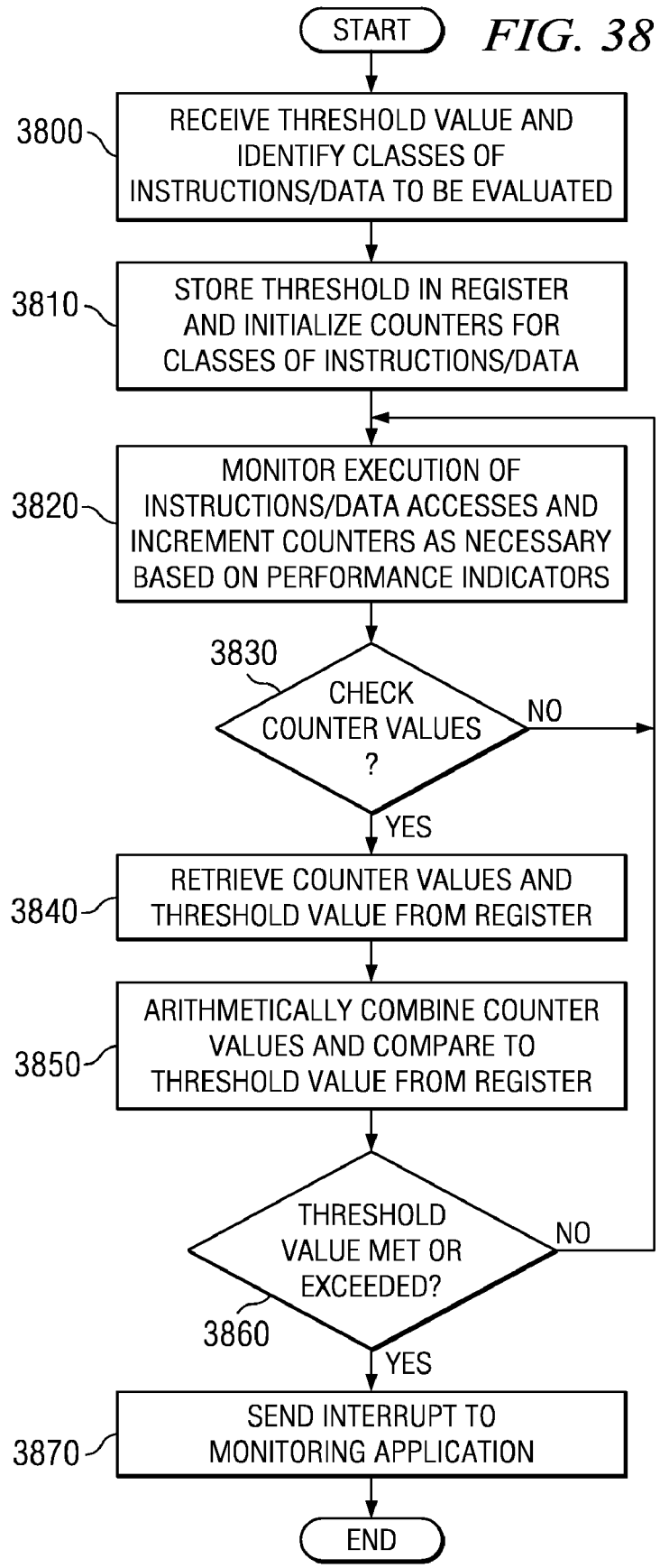
FIG. 38 is a flowchart outlining an exemplary operation of the present invention when combining the values of counters to determine if an interrupt should be generated or not.

FIG. 38 is a flowchart outlining an exemplary operation of the present invention when combining the values of counters and registers to determine if an interrupt should be generated or not. As shown in FIG. 38, the operation starts by receiving the threshold value, multiplier values, and the identity of the range of instructions/data addresses to be evaluated (step 3800). The threshold value and multiplier values are stored in registers, and counters for the instructions/data addresses are initialized (step 3810). The execution of the instructions/data address accesses are monitored and the associated counters are incremented as necessary based on performance indicators (step 3820). A determination is then made as to whether the counter values are to be checked (step 3830). If not, the operation returns to step 3820 and continues to monitor the execution of the computer program.

If the counter values are to be checked, the counter values for the designated range of instructions/data addresses are retrieved along with the threshold and multiplier values (step 3840). The counter values and register values are then arithmetically combined and the result compared to the threshold value (step 3850). A determination is then made as to whether the threshold value is met or exceeded (step 3860). If not, the operation returns to step 3820 to continue monitoring of the execution of the computer program. If the threshold value is met or exceeded, then an interrupt is generated and sent to the monitoring application for processing (step 3870). The operation then terminates. The steps 3810-3870 may be repeated until the monitoring of the execution of the computer program is completed.

Thus, in this further embodiment of the present invention, arithmetic combinations of counter values and register values may be used to determined when to send an interrupt to a monitoring application. In this way, more complex conditions may be selected as the basis for determining when interrupts are to be generated.

In a further embodiment of the present invention, functionality is provided in the performance monitoring application for initiating the measurement of secondary metrics with regard to identified instructions, data addresses, ranges of identified instructions, or ranges of identified data addresses, based on counter values for primary metrics. Thus, for example, when a primary metric counter, or a combination of primary metric counters, meets or exceeds a predetermined threshold value, an interrupt may be generated. In response to receiving the interrupt, counters associated with the measuring of secondary metrics of a range of instructions/data addresses may be initiated. In this way, areas of particular interest may first be identified using the primary metric performance counters with more detailed information being obtained through the use of secondary metric performance counters directed to measuring metrics associated with the particular area of interest.

With this exemplary embodiment, instructions/data addresses in memory, cache, or the like, are instrumented with performance indicators and counters and are initialized in the manner previously described above. The performance of the computer program is monitored in the manner previously discussed with performance indicators being encountered and counter values being incremented. The metrics being monitored by the use of the performance indicators and the associated counters are considered to be the primary metrics, i.e. the metrics for which the computer program is initially instrumented for monitoring. As previously discussed above, these counter values may be compared against threshold values to determine if certain conditions have occurred, e.g., entry into a routine more than a predetermined number of times.

When the comparison of the counter values to the thresholds results in a threshold value being met or exceeded, an interrupt is generated. The interrupt handler of the performance monitoring application receives the interrupt and performs appropriate processing based on the received interrupt.

In this present embodiment of the present invention, the processing may involve instrumenting the same or other instruction/data addresses with performance indicators and initializing counters for counting secondary metrics. The instrumenting of the instruction/data addresses involves storing performance indicators in association with the instruction/data addresses identified in a manner such as that used to instrument the instruction/data areas for the primary metrics described above. In one exemplary embodiment, as described above, this may involve storing performance indicators in a shadow cache data structure, for example.

The other instruction/data addresses to instrument for the monitoring of secondary metrics may be determined based on the particular implementation. For example, the interrupt handler of the performance monitoring application may be programmed such that when an interrupt is received in response to a threshold being exceeded, a particular class of instructions, within the routine associated with the instruction whose counter value exceeded the threshold value, may be instrumented by the storing of performance indicators in association with the instruction addresses. Thereafter, when performance monitoring continues by returning from the interrupt handler, the newly instrumented class of instructions within the routine will begin accumulating counts of executions of these instructions in a manner described previously with regard to the primary metric counters.

For example, as previously described above, the counter values for instruction/data addresses that have been instrumented with performance indicators may be used as a mechanism for identifying "hot spots" within the computer program being monitored. That is, for example, the number of times a routine is entered may be used as a means for determining whether that routine is a "hot spot", i.e. uses more computing cycles relative to other portions of code. In determining whether the routine is a hot spot or not, the counter value for the count of the number of times the routine is entered may be compared to a threshold that is established for identifying hot spots. If the threshold is met or exceeded, the routine is considered a hot spot.

With the present embodiment of the present invention, this hot spot may be further instrumented within the routine to determine which instructions of interest are "hot spots" within the "hot spot" routine. Alternatively, the secondary metric may be a measure of how many times, during execution of the computer program, the routine is identified as a hot spot, i.e. how many times during execution of the computer program do the counter values associated with the routine exceed the threshold defined for hot spots. Other secondary metrics may be initiated in a similar manner without departing from the spirit and scope of the present invention.

Thus, different levels of granularity of metric measurements may be made by the use of a first set of counters to measure primary metrics and a second set of counters to measure secondary metrics in accordance with this embodiment of the present invention. Of course the ability to initiate measurement of new metrics based on the previous metric measurements exceeding a threshold may be extended to even further iterations rather than stopping at only a primary set of metrics and a secondary set of metrics.

Figure 39:
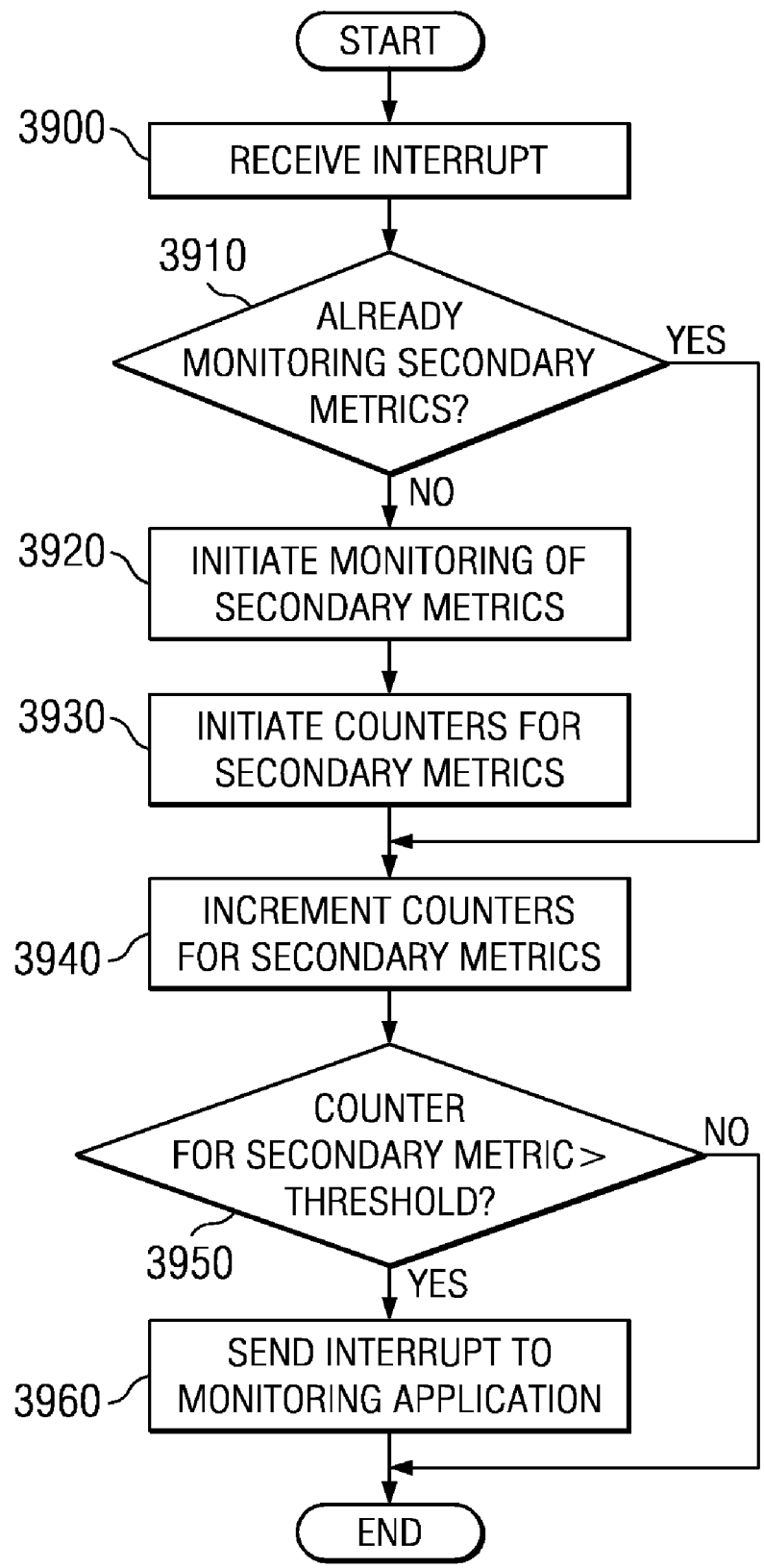
FIG. 39 is a flowchart outlining an exemplary operation of the present invention when initiating the monitoring of secondary metrics based on the performance counter values of primary metrics in accordance with this embodiment of the present invention.

FIG. 39 is a flowchart outlining an exemplary operation of the present invention when initiating the monitoring of secondary metrics based on the performance counter values of primary metrics in accordance with this embodiment of the present invention. As shown in FIG. 39, the operation starts with receiving an interrupt (step 3900). This interrupt may be received, for example, in response to an interrupt being generated based on a threshold being exceeded by a counter of a primary metric. For example, the interrupt that is received may have been generated in step 1308 of FIG. 13, step 2906 in FIG. 29, step 3870 in FIG. 38, or the like.

In response to receiving the interrupt, a determination is made as to whether secondary metrics for the instruction/data address or related instruction/data addresses have already been initiated (step 3910). If not, then monitoring of secondary metrics is initiated (step 3920). This step involves determining which instruction/data addresses associated with the instruction/data address that instigated the interrupt are to be instrumented with performance indicators and storing the performance indicators with the identified instruction/data addresses. The determination of which instruction/data addresses associated with the instruction/data address that instigated the interrupt is implementation specific and may be performed in any suitable manner, as previously discussed. The actual instrumenting of the identified instruction/data addresses may be performed in a similar manner to that described previously with regard to the performance indicators being stored for the primary metrics.

The counters associated with the performance indicators for the secondary metrics are then initiated (step 3930). Thereafter, or if monitoring of secondary metrics has already been initiated for the instruction/data address instigating the interrupt (step 3910), the counters for the secondary metrics are incremented in accordance with execution of the computer program (step 3940). A description of the incrementing of counters in association with performance indicators has been previously provided above.

A determination is then made as to whether the counter values for the secondary metric exceed a threshold (step 3950). If so, then an interrupt may be sent to the interrupt handler of the performance monitoring application (step 3960). This may cause the operation shown in FIG. 39 to be repeated in which case the primary metric is now the secondary metric and secondary metric would be a tertiary metric, etc. The operation then terminates.

Thus, with this embodiment of the present invention, performance monitoring of a computer program execution may be initially performed at a first granularity to identify areas of interest. Once these areas of interest are identified based on the monitoring of primary metrics, the computer program may be dynamically instrumented during execution of the computer program with regard to the identified areas of interest. This dynamic instrumentation involves instrumenting the instruction/data addresses associated with the identified areas of interest and initiating monitoring of secondary metrics within these areas of interest. Thus, a dynamic modification in the granularity at which the computer program may be monitored is achievable through the use of performance identifiers, hardware based counters, and thresholds in accordance with the present invention.

In an additional embodiment of the present invention, the performance indicators and counter values may be used as a mechanism for identifying cache hits and cache misses. With such an embodiment, performance indicators are associated with instructions for selected routines or portions of code of interest in the computer program. For example, as discussed above with regard to FIGS. 17, 24 and 26, performance indicators may be associated with instructions/data addresses and may be stored in the instructions/data, in a performance indicator shadow cache 404, or other type of metadata data structure.

Performance counters are incremented each time the instructions of the routines or portions of code, which have been instrumented with performance indicators, are executed. That is, as described previously, when an instruction is executed, or a data address is accessed, and it has an associated performance indicator, the performance monitor unit increments a counter in the shadow cache, the performance monitor unit, or the like. In addition, as described with regard to FIG. 8 above, a signal may be sent to the performance monitor unit when a cache miss occurs and an instruction or block of instructions must be reloaded into the cache. When the signal is received by the performance monitor unit, a counter may be incremented indicating a number of times a cache miss occurs on an instruction or portion of code using the counts in the shadow cache, performance monitor unit, or the like. From the values of these counters that indicate the number of times an instruction is executed and the number of times a cache miss occurs, the cache hit-miss ratio may be determined.

The cache hit-miss ratio may be stored in a metadata data structure associated with the cache. When the cache hit-miss ratio becomes less than a predetermined threshold, i.e. there is a greater number of cache misses than cache hits, an interrupt may be sent to the performance monitoring application indicating that a problem condition has occurred. An interrupt handler associated with the performance monitoring application may then handle the interrupt by initiating appropriate support to process this interrupt. Alternatively, the condition may be determined by periodically examining the information via a sampling approach.

As discussed above, one contributor to such a small cache hit-miss ratio may be the "chase tail" condition. A "chase tail" condition occurs when a block of instructions/data must be loaded into cache but there is not enough available room in the cache to store the entire block of instructions/data. In such a case, the instructions/data are written to the available space in the cache and any overflow is written over the least recently used portion of the cache. This may cause cache misses on the instructions/data overwritten, thereby increasing the number of cache misses, causing more reloads of the cache, and more overwriting of instructions/data in the cache.

To avoid this "chase tail" condition, the present invention employs support, instigated in response to a determination that the cache hit-miss ratio is falling below a threshold, that stores the instructions/data such that instructions/data that would have been overwritten in the cache are maintained in the cache and the instructions/data being reloaded are stored in a dedicated or reserved portion of the cache. This support, in one exemplary embodiment, may involve setting a mode bit in a mode register, such as mode register 1510, indicating that "chase tail" operation is to be followed by the processor.

This "chase tail" operation may involve determining, upon processing a reload operation on the cache, whether the cache has sufficient available space to store the block of instructions/data that are to be reloaded into the cache. If there is available space in the cache, then the block of instructions/data are stored in the cache in a normal manner. However, if there is not sufficient space in the cache to store the block of instructions/data that is to be reloaded, then the block of instructions/data, or at least the overflow portion of the block of instructions/data, is loaded into a reserved portion of cache, rather than reloading the instructions/data into a non-reserved area of the cache and overwriting instructions/data already present in the non-reserved area of the cache.

In addition, a performance indicator may be associated with the block of instructions indicating that when an instruction in this block of instructions is again executed, or when a data address in the block of data addresses is again accessed, the processor should look for the instruction/data in the reserved area of the cache. As with the other performance indicators described above, these performance indicators may be stored in a performance indicator shadow cache, with the instruction or portion of code itself, or the like.

The dedicated or reserved portion of the cache to which the block of instructions/data, or at least the overflow portion of the block of instructions/data, is written may itself be overwritten with subsequent operations of the present invention. However, a separate algorithm may be utilized to determine how to overwrite the instructions/data in the reserved portion of the cache. For example, a least recently used algorithm for the reserved portion of the cache may be used to determine which instructions/data in the reserved portion of the cache are to be overwritten. This approach allows for speculatively loading the reserved portion of the cache with new data and still allows access to the data recently loaded into the reserved area of the cache.

Alternatively, when a portion of the reserved area of the cache is to be overwritten, a more complex algorithm in which the comparison of instructions/data in the reserved area of the cache and the non-reserved area of the cache may be utilized in determining how to handle the reload of the instructions/data. For example, when it has been determined that a reload operation will result in instructions/data in the reserved area of the cache being overwritten, a comparison of the least recently used instructions/data in both the reserved area of the cache and the non-reserved area of the cache may be made. Whichever portion of the cache has the oldest instructions/data that have not been used recently may be determined to be the area where the reload operation will load the instructions/data. Other similar types of determinations may be made by weighing the affects of overwriting instructions/data in the non-reserved and reserved areas of the cache.

Thus, by invoking the "chase tail" operation of the present embodiment when the cache hit-miss ratio is below a predetermined threshold, the present invention avoids the "chase tail" situation by causing any reloads of instructions/data that cannot be accommodated by the available space in the non-reserved portion of cache to be stored in a reserved portion of the cache rather than overwriting existing cache entries in the non-reserved portion of the cache. In this way, the domino effect with regard to overwriting and reloads caused by overwriting the least recently used entries in the non-reserved portion of cache may be avoided. Furthermore, the cache hit-miss ratio will increase above the threshold since the block of instructions/data are guaranteed to be stored in a reserved area of the cache.

Figure 40:
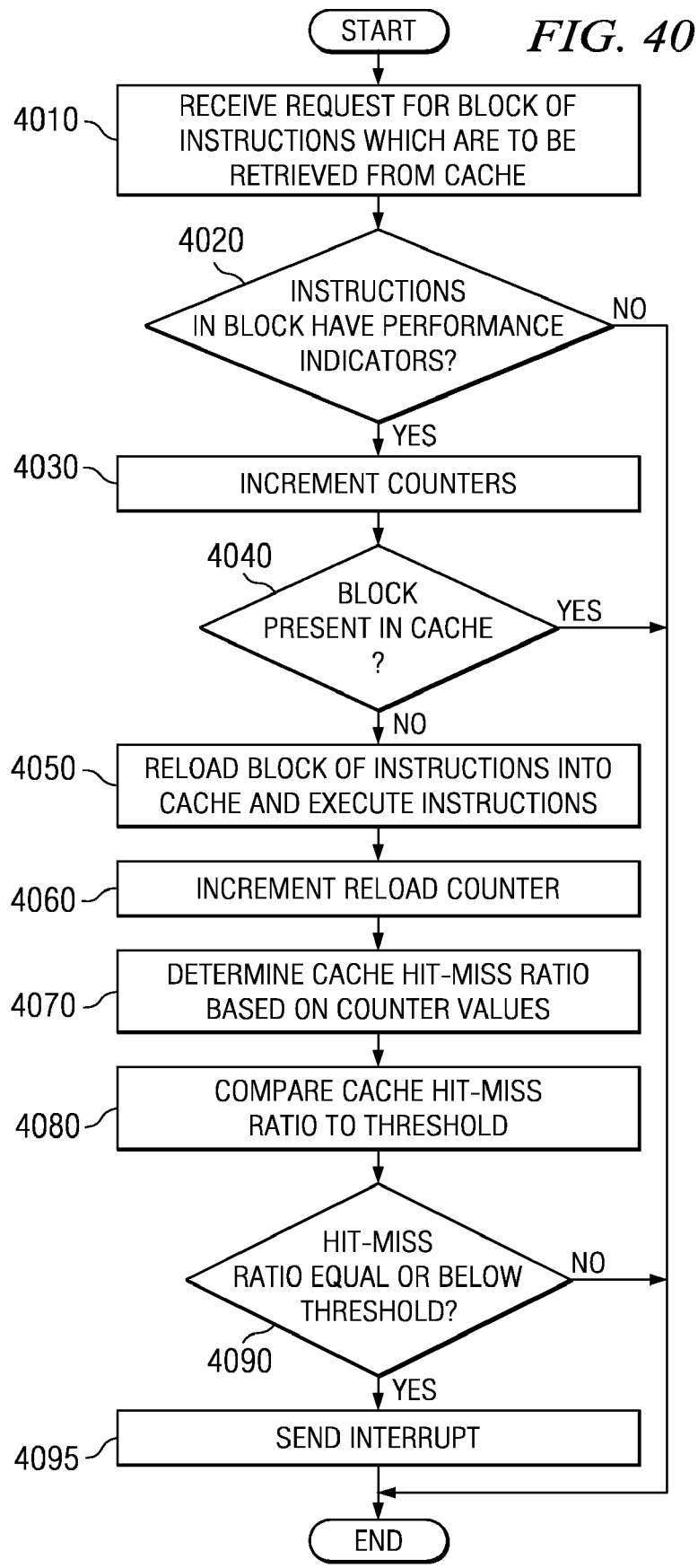
FIG. 40 is a flowchart outlining an exemplary operation of the present invention when used to invoke a "chase tail" operation of the processor.

FIG. 40 is a flowchart outlining an exemplary operation of the present invention when used to invoke a "chase tail" operation of the processor. The flowchart in FIG. 40 may be implemented in an instruction cache, however a similar operation may be performed with regard to a data cache as will be apparent to those of ordinary skill in the art in view of the following description.

As shown in FIG. 40, the operation starts by receiving a request for a block of instructions which are to be retrieved from cache or memory (step 4010). A determination is made as to whether instructions in the block of instructions have associated performance indicators (step 4020). If so, counters associated with the instructions that have performance indicators are incremented (step 4030).

A determination is made as to whether the block of instructions are present in the instruction cache (step 4040). If not, a reload of the block of instructions into the cache is performed and the instructions are executed (step 4050).

In addition, in response to the reload operation, a reload counter for the instruction cache is incremented (step 4060). The values for the instruction counters and the value for the reload counter are used to determine the cache hit-miss ratio (step 4070). The cache hit-miss ratio is then compared to a threshold that is established by the performance monitoring application (step 4080).

A determination is then made as to whether the cache hit-miss ratio meets or is below the threshold (step 4090). If so, an interrupt is sent to the interrupt handler of the performance monitoring application in order to initiate the "chase tail" operation of the processor (step 4095). If not, or if the block of instructions does not include an instruction having a performance indicator, the operation terminates. This operation may be repeated for each block of instructions requested from the cache.

Figure 41:
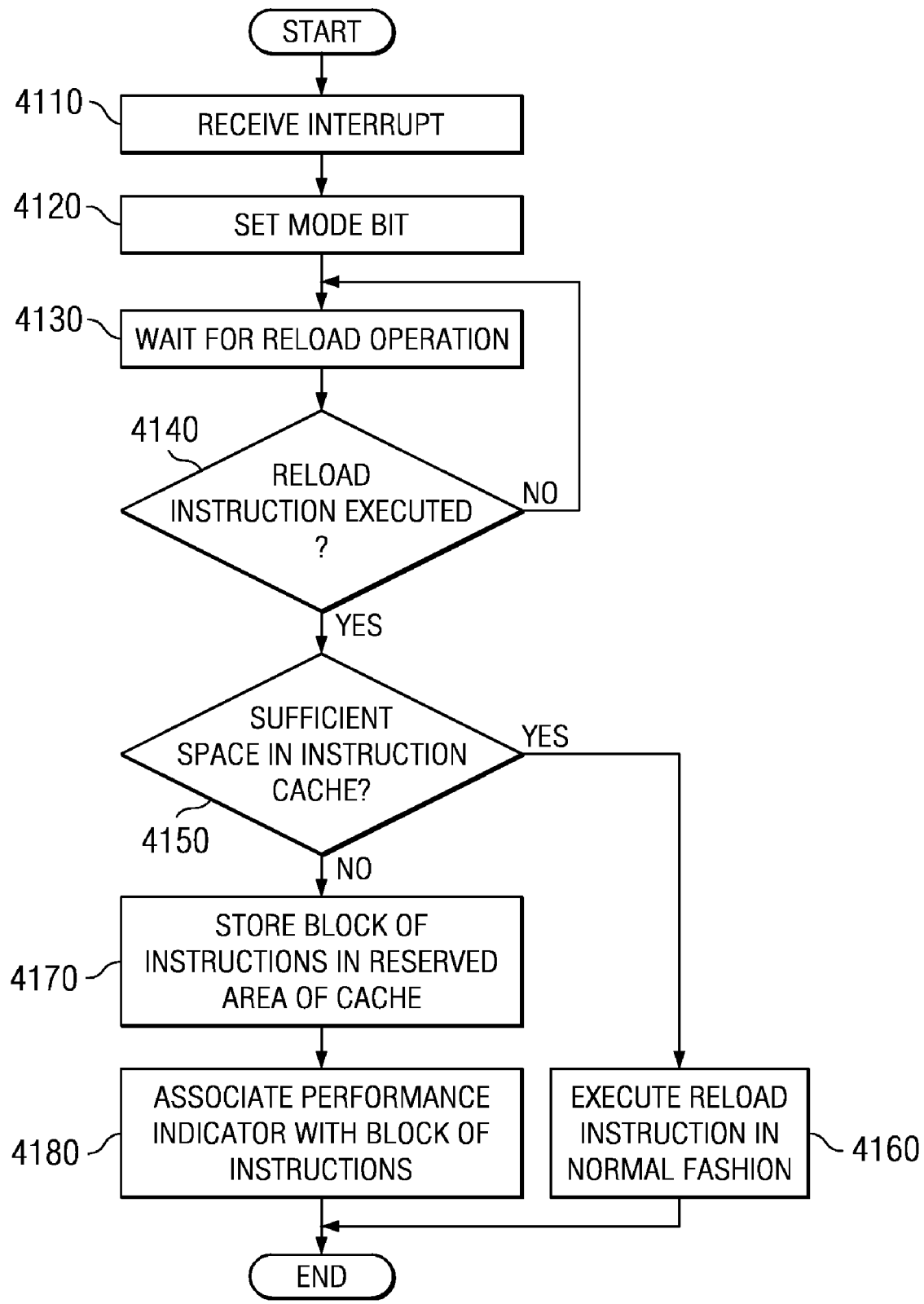
FIG. 41 is a flowchart outlining an exemplary operation of the present invention when performing a "chase tail" operation within a processor in accordance with the present invention.

FIG. 41 is a flowchart outlining an exemplary operation of the present invention when performing a "chase tail" operation within a processor in accordance with the present invention. Again, this flowchart is described in terms of an instruction cache, however, those of ordinary skill in the art will readily appreciate the applicability of the operation of FIG. 41 to data caches as well.

As shown in FIG. 41, the operation starts with receiving an interrupt indicating that the cache hit-miss ratio for the instruction cache meets or falls below an established threshold (step 4110). A mode bit in a mode register of the processor is then set (step 4120). The operation then waits for a reload operation to be executed by the processor (step 4130).

A determination is made as to whether a reload operation is executed by the processor (step 4140). If not, the operation returns to step 4130 and continues to await a reload instruction. If a reload operation is executed by the processor, a determination is made as to whether the instruction cache has sufficient available space to load the block of instructions without overwriting instructions already present in the cache (step 4150). If so, the reload operation is executed in a normal manner (step 4160). If not, the block of instructions are stored in a reserved portion of the cache (step 4170). A performance indicator is then associated with the block of instructions indicating that upon subsequent execution of an instruction in the block of instructions, the instruction should be retrieved from the reserved portion of the cache (step 4180). The operation then ends.

Thus, with this embodiment of the present invention, the performance indicators and counters may be used to determine when a cache hit-miss ratio falls to or below a predetermined threshold thus indicating a problem with the execution of the computer program. In addition, this embodiment of the present invention includes the ability for the processor to operate in a "chase tail" mode of operation in which the microcode of the processor determines whether subsequent reloads of the cache may be performed without overwriting existing entries in a non-reserved portion of the cache. If not, then the entries that need to be written to the cache may be written to a reserved portion of the cache and a performance indicator may be associated with the instructions/data of these entries indicating that the processor should look to the dedicated cache for these instructions/data.

It should be noted that while the above embodiment has been described in terms of the entire block of instructions/data being written to the dedicated memory or cache area, the present invention is not limited to such. Rather, in some exemplary embodiments, a portion of the block of instructions/data of the same size as the available space in the non-reserved portion of the cache may be written to the non-reserved portion of the cache while the remainder, i.e. the overflow, is written to the reserved portion of the cache. In such embodiments, the performance indicators directing the processor to the reserved portion of the cache will be associated with only those instructions/data within the block of instructions/data that are written to the reserved portion of the cache.

As an example of the benefit of this invention, consider a repetitive sequential read of data. If the block being read is long enough to overflow the cache then, on the second iteration of the read, it is possible that the data at the head of the block has been evicted from the cache and must be reloaded. This reloading of cache data evicts more data from the cache (potentially immediately prior to its being read). In this way it is possible for this repetitive read to never derive advantage from the cache.

With the invention described herein, some portion of the data consumes the stable portion of the cache and the remainder of the block overflows into the less stable overflow region. Then, on subsequent reads, data at the head of the block is still available in the stable portion of the cache without reloading. It is only the portion of the block beyond the extent of the cache that must be reloaded on subsequent reads.

Similar advantage may be derived from this technique for the case of four processors operating upon four independent blocks of code with a cache only large enough to support three of those blocks. This invention allows the system to identify this condition and split (for example) two of the instruction blocks into the (volatile) overflow region of the cache, leaving two of the blocks undisturbed in the stable portion of the cache.

In even further embodiments of the present invention, the performance indicators of the present invention may be utilized to obtain information regarding the nature of the cache hits and reloads of cache lines within the instruction or data cache. These embodiments of the present invention, for example, may be used to determine whether processors of a multiprocessor system, such as a symmetric multiprocessor (SMP) system, are truly sharing a cache line or if there is false sharing of a cache line. This determination may then be used as a means for determining how to better store the instructions/data of the cache line to prevent false sharing of the cache line.

False cache sharing is a result of the cache operating at a greater granularity than the processors of the system operate at. That is, processors operate on individual instruction/data areas, e.g. blocks of instructions/data, within a cache line. However, the cache operates on a cache line granularity. Thus, if there is any change to any portion of the cache line, and an access request is received for another portion of the cache line, the cache line must be reloaded before the access request is permitted.

This may lead to the case where one processor of the system writes to a first area of the cache line, and a second processor reads data from a second area of the cache line that is not modified by the write to the first area of the cache line, yet the cache line as a whole must be reloaded by the cache prior to the access to the second area being permitted. Thus, even though the data or instructions in the second area have not been modified by the write to the first area and thus, the read could be completed without having to reload the cache line, because of the granularity at which the cache operates, the cache line is reloaded. This causes a performance degradation due to having to process the reload of the cache line.

This is often referred to as false sharing of a cache line or a "dirty" cache hit. It would be beneficial to be able to identify when such situations are present in the cache. Embodiments of the present invention provide a mechanism for identifying such situations.

With these embodiments of the present invention, individual instruction/data areas or portions of code within cache lines are instrumented with performance indicators and processor write and read flags. The performance indicators and/or processor write and read flags may be stored within the cache line itself in association with their instruction/data areas, in a performance indicator shadow cache, or other metadata data structure. The performance indicators operate in a similar manner as discussed above with regard to the previous embodiments of the present invention.

With the present embodiment of the present invention, upon an access request to the instruction/data area, a determination is made as to whether there is a performance indicator associated with the instruction/data area. If so, the processor that issued the access request is identified, i.e. which processor of the multiprocessor system is reading from or writing to that instruction/data area of the cache. In a preferred embodiment, the access request includes header information or metadata that identifies the processor from which the access request was received. From this information, it can be determined which processor sent the access request.

Thereafter, a processor access flag bit associated with the instruction/data area in the cache line, and associated with the identified processor, is set, Depending on whether the access request is a read or a write, either a read processor access flag bit or a write processor access flag bit is set. That is, each instruction/data area or portion of code that is instrumented by a performance indicator has both a read processor access flag bit and a write processor access flag bit for each processor of the multiprocessor system associated with it and stored in a corresponding portion of the cache line.

When the instruction/data area is written to, and the instruction/data area has an associated performance indicator, a write processor access flag bit corresponding to the processor that sent the write access request is set. Similarly, when the instruction/data area is read from, and the instruction/data area has an associated performance indicator, a read processor access flag bit corresponding to the processor that sent the read access request is set. In this way, it can be determined which processors have written to which instruction/data areas, which processors have read from which instruction/data areas, and whether reloads of the cache line are due to true sharing of the cache line between processors, or false sharing of the cache line.

When a reload of a cache line is to be performed, for example due to an access request to an area of the cache line but a previous change to the cache line having been performed, an interrupt is generated and sent to an interrupt handler of the performance monitoring application. The interrupt handler obtains the write and read processor access flag bit values for the instruction/data areas of the cache line that are being reloaded. The values of these write and read processor access flag bits are then compared to determine if false cache line sharing occurred. That is, a determination is made as to whether there were data areas in the same cache line being written to by at least one processor and different data areas being accessed by another processor. True cache line sharing occurs when the same data area is written to by one processor and then accessed by one or more other processors.

Figure 42:
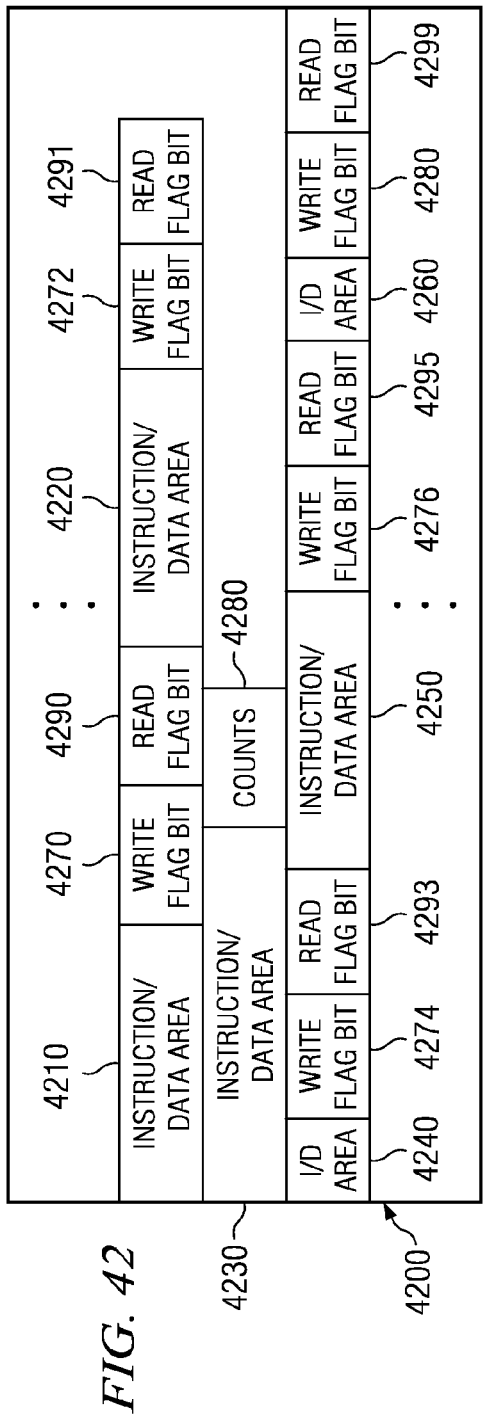
FIG. 42 is an exemplary block diagram illustrating a portion of a data cache in accordance with an exemplary embodiment of the present invention.

FIG. 42 is an exemplary block diagram illustrating a portion of a data cache in accordance with an exemplary embodiment of the present invention. While FIG. 42 illustrates a data cache 4200, it should be appreciated that the same mechanisms may be applied to an instruction cache without departing from the spirit and scope of the present invention.

As shown in FIG. 42, each data area 4210-4260 has associated write flag bits 4270-4280 and read flag bits 4290-4299. While the write flag bits 4270-4280 and read flag bits 4290-4299 are illustrated as being stored in the data cache 4200 in association with their respective data areas 4210-4260, the present invention is not limited to such. Rather, the write flag bits 4270-4280 and read flag bits 4290-4299 may be stored in the performance indicator shadow cache or other metadata data structure outside the data cache 4200 without departing from the spirit and scope of the present invention.

As previously described, either all or certain ones of the data areas 4210-4260 may be provided with performance indicators in accordance with the present invention. These performance indicators may be stored in the data areas 4210-4260, write flag bit areas 4270-4280, read flag bit areas 4290-4299, a separate performance indicator shadow cache, or other metadata data structure.

When the processor processes an access request to a data area, the processor determines if there is a performance indicator associated with the data area. If so, an interrupt is sent to the interrupt unit that causes the performance unit to operate to determine which processor sent the access request. A determination is then made as to whether the access request is a read access request or a write access request and an appropriate read or write flag bit in the read or write flag bit area associated with the data area is set indicating that the processor has written to the data area. Thus, for example, if the access request is a write to data area 4210 and data area 4210 has an associated performance indicator, a write flag bit in the write flag bit area 4270 may be set for a processor that sent the access request.

Figure 43:
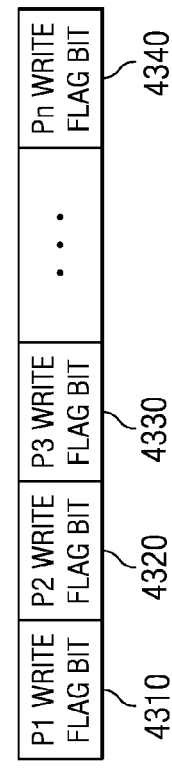
FIG. 43 is an exemplary block diagram of a write flag bit area in accordance with one exemplary embodiment of the present invention.

FIG. 43 is an exemplary block diagram of a write flag bit area in accordance with one exemplary embodiment of the present invention. While FIG. 43 illustrates a write flag bit area, it should be appreciated that a similar read flag bit area may also be present for each instruction/data area.

As shown in FIG. 43, the write flag bit area 4300 includes a write flag bit 4310-4340 for each processor of the multiprocessor system. Thus, for example, write flag bit 4310 is for a first processor P1, write flag bit 4320 is for a second processor P2, write flag bit 4330 is for a third processor P3, and write flag bit 4340 is for a processor Pn. These write flag bits 4310-4340 may be present in a portion of a cache line in association with their associated data/instructions, in a shadow cache data structure, or other metadata data structure. These write flag bits 4310-4340 may be set in response to a determination that the corresponding processor P1-Pn has written to the data area associated with the write flag bit area 4300. These write flag bits 4310-4340 may be reset, paged out to memory, or the like, after the processing of the present invention is performed in response to a reload of the cache line.

Similar structures and functionality may be provided for read access requests. That is, a read flag bit area similar in structure to write flag bit area 4300 may be provided in which read flag bits are set in response to a read access request being processed for a particular processor. These read flag bit areas may be reset, paged out, or the like, after the processing of a reload operation of a cache line in accordance with the present invention.

FIG. 44 is a flowchart outlining an exemplary operation of one exemplary embodiment of the present invention when processing an access request to an area of a cache line. As shown in FIG. 44, the operation starts by identifying the areas of the cache that are of interest for monitoring (step 4400). Performance indicators are set for each of the identified areas of the cache that are to be monitored (step 4410). Write and read flag bits are then initiated for each cache area of interest (step 4420). That is, each cache area of interest is provided with write flag bits and read flag bits in an associated write flag bit area and read flag bit area, one write flag bit and read flag bit for each processor of the multiprocessor system.

Thereafter, the processor monitors for accesses to the cache (step 4430). For each cache access request, a determination is made as to whether the access to the cache references a cache area that has been instrumented with a performance indicator (step 4440). If not, the operation processes the access request in a normal fashion and then goes to step 4480 to determine whether to continue to monitor for access to the cache by returning to step 4430.

If the access request references a cache area that has an associated performance indicator, then the processor that issued the access request is identified (step 4450). A determination is then made as to whether the access request is a write access request (step 4460). If the access request is a write access request, then an appropriate write flag bit for the cache area and the identified processor is set (step 4470). If the access request is not a write access request, then it must be a read access request. As a result, an appropriate read flag bit for the cache area and the identified processor is set (step 4475). Thereafter, a determination is made as to whether continued monitoring of cache access requests is to be performed (step 4480). If so, the operation returns to step 4430. If not, the operation terminates.

Figure 45:
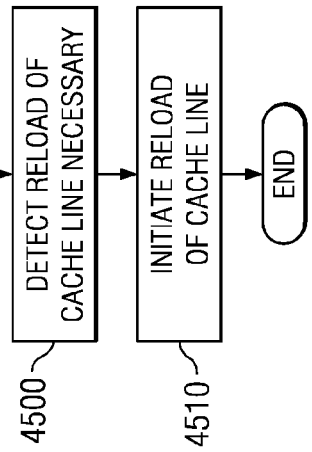
FIG. 45 is a flowchart outlining an exemplary operation of an exemplary embodiment of the present invention when processing a reload of a cache line.

FIG. 45 is a flowchart outlining an exemplary operation of an exemplary embodiment of the present invention when processing a reload of a cache line. As shown in FIG. 45, the operation starts by detecting the reload of a cache line (step 4500). This detection may be performed, for example, by the processor detecting that a cache line reload interrupt is being processed by an interrupt handler. Thereafter, a reload of the cache line is initiated (step 4510). The operation then terminates.

FIG. 46 is a flowchart outlining an exemplary operation of an exemplary embodiment of the present invention when processing a cache line reload interrupt, such as that generated in the operation of FIG. 45. As shown in FIG. 46, the operation starts by initiating a reload of a cache line (step 4600). The write bit flag and read bit flag values for the areas of the cache line that is being reloaded are then obtained (step 4610).

A determination is then made as to whether the write flag bits and/or read flag bits for other processors, i.e. processors other than the one that sent the access request that initiated the cache line reload, for the cache area that is being accessed by the present access request are set (step 4620). This determination is basically one that determines whether the reload may be due to another processor having previously written to the same data area being accessed, which is an indication of real sharing of the cache line. If so, then the reload is determined to be due to a different processor writing to the cache area being accessed and thus, the cache line is truly being shared by the processors of the system (step 4630).

If other processors have not previously written to the cache area being accessed by the present access request, then a determination is made as to whether the write flag bits or read flag bits for any of the other processors are set for the other data areas of the cache line (step 4640). If so, then a determination is made that other processors of the multiprocessor system have accessed other areas of the cache line but have not accessed the area of the cache line being accessed by the present processor. This is an indication of false cache line sharing. As a result, the reload is determined to be due to false cache line sharing (step 4650). If the write or read flag bits for other processors have not been set for any of the other areas of the cache line, then a determination is made that the reload of the cache line is due to true sharing of the cache line (step 4630).

An indication of the determined basis for the cache line reload may be output for use in performance analysis (step 4660). The cache line is then reloaded and the write flag bits and read flag bits may be reset (step 4670). The operation then terminates.

While the above embodiments illustrate the present invention performing the check of false cache line sharing with each reload of a cache line, the present invention is not limited to such. Rather, in an alternative embodiment, the check for false cache line sharing may be performed periodically. That is, after the computer program has run for a predetermined amount of time, a check to see if there are false cache line sharing may be performed. The periodic nature of this check may be associated with a predetermined amount of execution time since a previous check for false cache line sharing, the occurrence of an event, such as a determination that a particular thread or threads are no longer active, and the like.

In addition, while the present invention has been described in terms of the read and write flag bits being reset when the processing of a reload operation is completed, the present invention is not limited to such. Rather than resetting the read and write flag bits, or in addition to resetting the read and write flag bits, the present invention may page out the values of the read and write flag bits to memory in order to preserve a copy of the state of the read and write flag bits for later processing.

Thus, the mechanisms of the present invention provide an ability to monitor performance within a cache line. More specifically, the mechanisms of the present invention allow for the identification of reloads of cache lines as being due to true or false cache line sharing amongst processors of a multiprocessor system.

The determination of true or false cache line sharing may be beneficial in determining the manner by which data and instructions are stored in a cache. That is, if it is determined that cache lines are being falsely shared and thus, cache line reloads are often being performed due to writes to areas of the cache line by a first processor that are not being accessed by the second processor, then appropriate measures may be taken to minimize the amount of false cache line sharing.

For example, in a further embodiment of the present invention, when it is determined that a cache line is being falsely shared using the mechanisms described above, an interrupt may be generated and sent to the performance monitoring application. An interrupt handler of the performance monitoring application will recognize this interrupt as indicating false sharing of a cache line. Rather than reloading the cache line in a normal fashion, the data or instructions being accessed may be written to a separate area of memory dedicated to avoiding false cache line sharing.

The code may then be modified by inserting a pointer to this new area of cache or memory. Thus, when the code again attempts to access this area of the cache, the access is redirected to the memory area rather than to the previous area of the cache that was subject to false sharing. In this way, reloads of the cache line may be avoided.

FIG. 47 is a flowchart outlining an exemplary operation of an exemplary embodiment of the present invention in which cache areas identified as being falsely shared are moved to avoid the false sharing. As shown in FIG. 47, the operation starts by receiving an interrupt, such as may be generated based on the operation of FIG. 46 (step 4600). A portion of a dedicated cache or memory area is allocated for the cache area subject to false sharing (step 4710). The data/instructions in the cache area are then written to the new dedicated cache or memory area (step 4720). A pointer to this new dedicated cache or memory area is then stored in the code of the computer program being monitored (step 4730). The operation then ends.

Thus, through the operation of the mechanisms outlined in FIGS. 46 and 47, the storage of instructions/data in the cache may be modified to avoid false cache line sharing and thereby minimize the amount of cache line reloading that is performed during the execution of the computer program. In this way, the performance of the computer program may be increased.

The above descriptions of the various embodiments of the present invention have been focused on the use of the performance indicators, counters, flags, and the like, to provide information about the manner by which instructions are executed, data areas are accessed, and the like. Information regarding the counter values, determinations made based on the counter values and flag values, and the like, may be used to annotate performance profile data that is obtained by the performance monitoring application during a trace of the execution of the computer program. This annotated performance profile data, hereafter simply referred to as the performance profile data, may be stored to a performance profile data storage area for use in analyzing the performance of the computer program.

In a further embodiment of the present invention, a compiler may obtain this performance profile data along with the instructions/data of the computer program and use this information to optimize the manner by which the computer program is executed, instructions/data are stored, and the like. That is, the compiler may optimize the application and instruction/data storage so that the runtime component of the application is optimized.

The manner by which the compiler optimizes the runtime aspects of the computer program may vary depending on the particular performance profile data obtained, which is annotated by the output obtained from the use of performance indicators, counters, flags, and the like, previously described. The optimizations may be to optimize the instruction paths, optimize the time spent in initial application load, the manner by which the cache and memory is utilized, and the like. The following are intended to only be example ways in which the runtime aspects of a computer program may be optimized based on the information obtained through the use of the performance indicators, counters, flags, and the like, and are not intended to limit the application of the present invention in any manner.

As a first example of the manner by which the compiler may optimize the runtime components of the computer program based on the performance profile data, an optimization of the storage of instructions/data in a cache will first be described. For example, the mechanisms of the present invention have been described as including an embodiment in which false cache line sharing may be detected. As described above, this false cache line sharing may be identified and an indication of the false cache line sharing may be output for later analysis. This indication may be output and stored in the performance profile data and may be utilized by the compiler to determine whether an alternative approach to storing data/instructions in the cache is needed.

That is, in one exemplary embodiment, the compiler may determine from the performance profile data that there is a problem with false cache line sharing in the execution of the computer program and, as a result, the instructions/data should be arranged in memory in such a manner that cache line sharing is minimized. For example, the compiler may determine that blocks of instructions/data are to be written 64 bytes away from each other. In this way, each block of instructions/data is allocated a 64 byte area of the cache and blocks of instructions/data are guaranteed to be on separate cache lines in a 64 byte cache. Thus, each cache line is accessed by only one processor of the system and false cache line sharing is eliminated.

In a further example of how the compiler may optimize the runtime components of the computer program, the performance profile data may indicate that certain paths of execution are followed more often than others. That is, at a branch instruction, the same path of execution tends to be taken more than 50% of the time. This may be determined based on, for example, hot spot detection or the like, as previously described above. From the performance profile data obtained, the compiler may determine, when compiling the code of the computer program into an executable, to make the path that is executed more often at the branch contiguous with the branch instruction. That is, the branch checks may be reordered so that they are more contiguous.

Alternatively, the information regarding how the code may be optimized may be provided to the programmer such that the programmer may perform these optimizations offline. Thus, rather than actually modifying the code or the storage of the data/instructions in cache, recommendations regarding the manner by which the runtime components of the computer program may be optimized may be provided to the programmer for use in modifying the code or operation of the computing system. The programmer may then decide whether to implement the recommended optimizations.

The optimizations that may be performed by the compiler, or recommended by the compiler, may be done automatically upon detection of the possible optimization based on the performance profile data. Alternatively, the compiler may provide an alert to the programmer indicating the identified optimizations that may be performed and allow the programmer to select the optimizations that are to be performed. For example, a graphical user interface may be provided that includes a listing of the optimizations with check boxes and virtual buttons that allow the programmer to select the particular optimizations to be performed and then initiate those optimizations through the compiler. Alternatively, the optimizations may be completely left up to the programmer such that the present invention provides only the alert of the possible optimizations and leaves it to the programmer to decide whether to actually implement those optimizations or not.

Figure 48:
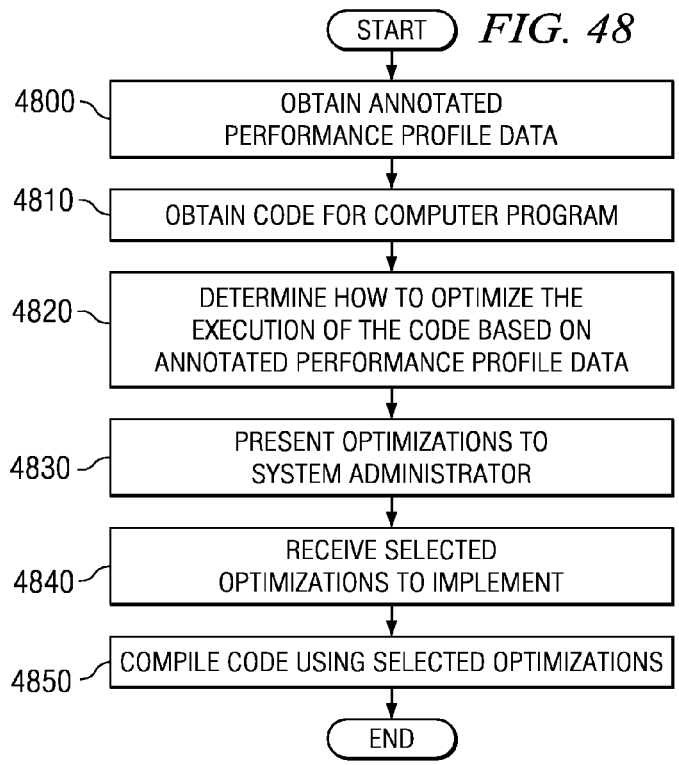
FIG. 48 is a flowchart outlining an exemplary operation of an exemplary embodiment of the present invention when optimizing the execution of an application.

FIG. 48 is a flowchart outlining an exemplary operation of an exemplary embodiment of the present invention when optimizing the execution of an application. As shown in FIG. 48, the operation starts by obtaining annotated performance profile data for the application (step 4800). This performance profile data is obtained from a trace of the execution of the computer program using the performance indicators, counters, flags, and the like, of the present invention.

The code for the computer program is then obtained (step 4810) and determinations are made regarding the manner by which the compilation of the code may be performed to optimize the execution of the computer program based on the performance profile data (step 4820). These optimizations may then be presented to a programmer via one or more graphical user interfaces (step 4830). The optimizations selected by the system programmer are then received (step 4840) and the code is compiled using the selected optimizations (step 4850). The operation then ends. Of course, as noted above, the optimizations may be performed automatically without contacting the programmer.

While the above embodiments have been described in terms of a single source of the performance profile data, the present invention is not limited to such. Rather, the performance profile data from a plurality of sources may be compiled into a single performance profile data set that may be used to optimize the compilation of the computer program. For example, various traces of the computer program execution from a plurality of customers may be compiled into a single performance profile data set in order to address the various problems with the execution of the computer program on the different customer platforms in a single optimization of the computer program compilation.

Therefore, using the mechanisms of the present invention, the results of the use of the performance indicators, counters, flags, and the like, of the various embodiments of the present invention may be used to optimize the compilation of a computer program in order to obtain an optimum runtime execution of the computer program.

The above embodiments of the present invention are described in terms of the performance indicators being stored in the instructions themselves, in a performance indicator shadow cache, or the like. Moreover, the above embodiments are described in terms of the counters being hardware counters. The present invention is not limited to such embodiments. In a further embodiment of the present invention, elements of a page table may be used to store performance indicators and/or counts of events.

A page table is a data structure in memory that provides a means of mapping virtual memory addresses to physical memory addresses, permitting the virtualization of program memory. A page is a block of memory with which attributes (e.g., read only, read/write, cacheable) can be associated. When instructions or data are to be retrieved from memory, the processors uses the values stored in the page table to translate the address specified by the program (e.g., the address computed by a load instruction or the address of the next sequential instruction) into the physical address of the desired location in physical memory. Since the page table must be referenced to translate each program address to a physical address, the page table is an ideal place in which to store performance indicators and/or event counts.

Figure 49:
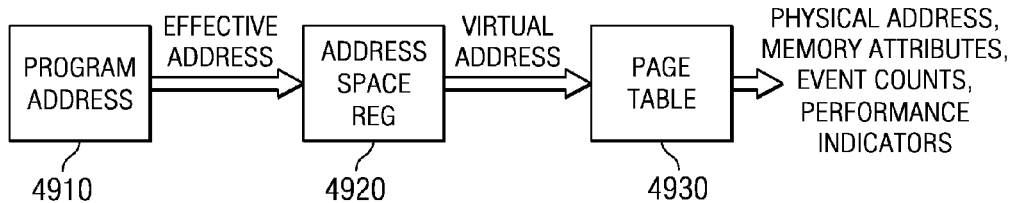
FIG. 49 illustrates an exemplary block diagram of data flow in which a page table is utilized to map from a virtual address to a physical address.

FIG. 49 illustrates an exemplary block diagram of data flow in which a page table is used to translate the memory address specified by the program into a physical address in accordance with an exemplary embodiment of the present invention. As shown in FIG. 49, a program address 4910 (for data or instruction) is translated to a virtual address by way of the address space register 4920 using one of the various means of specifying the active address space. The resultant virtual address is used by the processor to search the page table 4930 for a page descriptor in the page table 4930 that matches the virtual address. The contents of the matching page descriptor commonly contain the physical address and attributes associated with the virtual page. These contents are used to translate the virtual address to a physical address and to determine the attributes of the page (e.g., access rights).

In a further embodiment of the present invention, the page table is expanded to include additional fields for each entry for storing performance monitoring structures such as performance indicators, event counts, thresholds, ranges of addresses within the corresponding page that are of interest, and the like. When a process accesses the page table to perform virtual to physical page address mapping, these additional fields may be queried, values from these fields retrieved, and values in these fields updated based on the particular event causing the access to the page table.

Alternatively, to avoid any degradation of performance, the performance indicator information in these fields may be cached in processor resources similar to a Translation Lookaside Buffer (TLB) or an Effective to Real Address Translation Buffer (ERAT). For example, a Performance Indicator Look-Aside Buffer (PILAB) may be provided in which the virtual to real address translation information and the performance indicator information provided in the above fields of the page table may be cached. When an instruction or data address access request is received, a lookup of the program or virtual address may be performed in the PILAB to obtain both the address translation information and the performance indicator information. If the program or virtual address is not present in the PILAB, the page table may be consulted to obtain this information.

Figure 50:
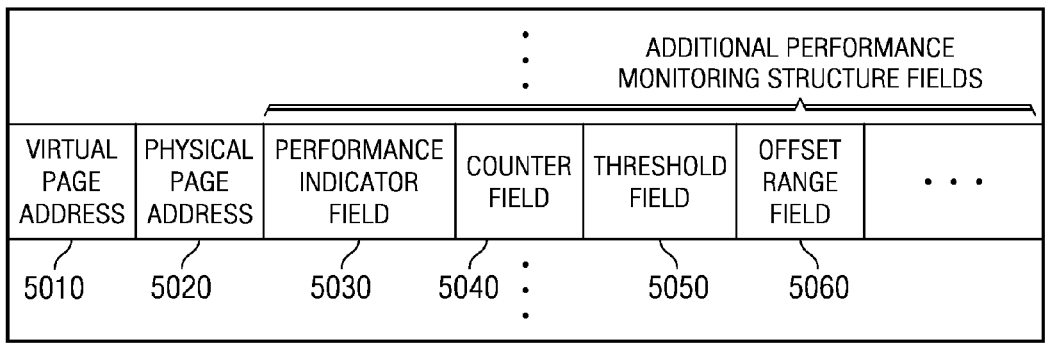
FIG. 50 illustrates an exemplary page table entry in accordance with an exemplary embodiment of the present invention.

FIG. 50 illustrates an exemplary page table entry in accordance with an exemplary embodiment of the present invention. As shown in FIG. 50, the page table entry 5000 includes a field 5010 for storing a virtual page address, a field 5020 for storing a physical page address, and additional fields 5030-5060 for storing performance monitoring structures. These performance monitoring structures are structures used by performance monitoring applications for determining the performance of a computer application that is under trace. These performance monitoring structures may include, for example, a performance indicator, an event counter, a threshold, a range of addresses within the page that are of interest, and the like. The values of these additional fields 5030-5060 may be set by a performance monitoring unit based on information provided to the performance monitoring unit by a performance monitoring application.

For example, in a similar manner that performance indicators are associated with instructions and/or portions of data as described above, the performance indicators may be associated with these instructions and/or data portions within the page table. Thus, when determining whether an instruction or data portion has an associated performance indicator, the virtual address of the instruction or data portion may be used to identify an entry in the page table and the values stored in the additional field 5030 and 5040 may be checked to see if a performance indicator is associated with the physical page or a portion of the physical page. That is, if the offset associated with the virtual address falls within an offset range identified in field 5040 and the field 5030 has a performance indicator stored therein, then the instruction corresponding to the virtual address has an associated performance indicator.

Similar to the hardware counters discussed above, the field 5050 may be used to store an event count and may be incremented when certain events occur. For example, in the above embodiments where cache misses result in the incrementing of a counter, the count field 5050 may be used to store this count rather than, or in addition to, a physical counter. Thus, for example, when an instruction or portion of data must be retrieved from physical storage, the page table is consulted to identify the physical storage location of the instruction or portion of data. At the same time, the fields 5030-5060 may be queried and the counter value in field 5050 may be incremented indicating the number of times the page must be fetched from physical storage and loaded into the memory or cache.

The field 5060 may be used to store threshold information for determining when to send interrupts to an interrupt handler of the performance monitoring application. As discussed above, when an event occurs that results in the fields 5030-5060 being accessed in the page table, the value in the count field 5050, or a plurality of count fields 5050, may be compared against the threshold stored in the field 5060 to determine if the threshold has been met or exceeded. If so, then an interrupt may be generated and sent to an interrupt handler of the performance monitoring application.

It should be appreciated that while FIG. 50 shows only a single field for storing a performance indicator, a single field for storing a count, a single field for storing a threshold, and a single field for storing a range of offsets into the page, the present invention is not limited to such. Rather, any number of fields for storing a plurality of performance indicators, thresholds, event counts, ranges of offsets, and the like, associated with the physical page may be used without departing from the spirit and scope of the present invention.

FIG. 51 is a flowchart outlining an exemplary operation of the present invention when using an augmented page table to store performance monitoring structures. As shown in FIG. 51, the operation starts with initiating the page table by setting values in a performance indicator field of the page table for entries corresponding to instructions/data that are of interest to the performance monitoring application (step 5110). In addition, the thresholds, offset ranges associated with the thresholds, and counter values in the respective fields of the page table entries may be initialized (step 5120). Thereafter, execution of the computer program and monitoring of the execution is started (step 5130).

A determination is made as to whether an event requiring access to physical storage occurs (step 5140). If so, a determination is made as to whether the performance indicator field in the page table entry for the virtual address is set (step 5150). If so, the counter field value or counter field values are incremented for the range of offsets in which the offset of the virtual address falls (step 5160).

A comparison of the counter field value or counter field values may then be made against corresponding threshold values in the threshold fields of the page table entry (step 5170). A determination may then be made as to whether the threshold is met or exceeded by the counter field value or counter field values (step 5180). If any of the threshold values are met or exceeded, an interrupt may be generated and sent to the interrupt handler of the performance monitoring application (step 5190).

Of course, in parallel to this operation, the retrieval of the instructions/data from the physical storage address location is performed. A determination is then made as to whether the operation is to terminate (step 5195). If not, the operation returns to step 5140; otherwise, the operation terminates.

Thus, in this further embodiment of the present invention, rather than requiring separate data structures or hardware devices, the present embodiment allows for an extension of an already existing page table to include additional fields for storing performance monitoring structures. Since many events that are to be monitored by the performance monitoring application are closely tied to the accessing of physical storage, the use of the page table to store these performance monitoring structures provides a less invasive solution to assisting the performance monitoring application in determining the performance of an execution of a computer program.

Thus, the present invention provides an improved method, apparatus, and computer instructions for providing assistance in monitoring execution of programs and using the information obtained through monitoring the execution of the program to optimize the execution of the programs. The mechanism of the present invention includes employing an indicator that is recognized by the processor to enable counting the execution of an instruction associated with the indicator. Various types of counting as described above are enabled through this mechanism. Further, with the information provided through the use of associating indicators with particular instructions, the mechanism of the present invention also provides for various types of adjustments to programs in monitoring and analyzing performance of programs. Further, as described above, programs may be automatically adjusted to allow for monitoring of selected instructions and even routines and modules without having to modify the program.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, instead of using a field in an instruction or in a bundle, a new instruction or operation code may be used to indicate that a subsequent instruction, or a subsequent set of instructions are marked instructions. Also, the architecture of a processor may be changed to include additional bits if spare fields for performance indicators are unavailable in the case in which it is desirable to include performance indicators within fields in the instructions. Also, although examples of events, such as execution of the instruction, time, such as clock or processor cycles, needed to execute an instruction, time to access data, entry into a section of code, have been given, these examples are not meant to limit the present invention to the types of events that can be counted. Any event relating to execution of an instruction or access to a memory location may be counted using the mechanisms of the present invention.

The illustrative embodiments were chosen and described in order to best explain the principles of the invention, the practical application, and to enable others of ordinary skill in the art to understand the invention for various embodiments with various modifications as are suited to the particular use contemplated.

What is claimed is:

1. A computer program product in a computer readable medium for executing instructions in a data processing system, comprising:
    first instructions for associating one or more instructions of a computer program with one or more performance indicators;
    second instructions for storing the one or more performance indicators in one or more performance indicator fields of a page table;
    third instructions for initiating one or more counter fields in the page table for the one or more instructions in association with corresponding performance indicators of the one or more performance indicators;
    fourth instructions for incrementing counter values in the one or more counter fields during execution of an instruction of the computer program based on whether the instruction has an associated performance indicator in a performance indicator field of the page table;
    fifth instructions for storing one or more threshold values in one or more threshold fields of the page table in association with the one or more performance indicator fields and the one or more counter fields, wherein each of the one or more threshold values specifies a maximum counter value in an associated counter field; and
    sixth instructions for generating a selected action in response to the counter value in an associated counter field exceeding the threshold value in an associated threshold field.

2. The computer program product of claim 1, wherein the fourth instructions for incrementing counter values in the one or more counter fields during execution of an instruction include:
    instructions for determining if an event associated with a performance indicator stored in the one or more performance indicator fields has occurred; and
    instructions for incrementing the counter value in the associated counter field of the one or more counter fields if the event has occurred.

3. The computer program product of claim 2, wherein the event is a cache miss.

4. The computer program product of claim 1, further comprising:
    seventh instructions for comparing, upon the occurrence of an event, one or more counter values in the one or more counter fields to a threshold value in the one or more threshold fields, and wherein the sixth instructions comprises:
    instructions for generating an interrupt in response to the counter value in the associated counter field exceeding the threshold value in the associated threshold field.

5. The computer program product of claim 1, further comprising:
    seventh instructions for receiving an access request for portion of code or portion of data, wherein the access request includes an identifier of a virtual address of the portion of code or portion of data;
    eighth instructions for converting the virtual address to a real address of a storage location of the portion of code or portion of data in a storage device;
    ninth instructions for accessing the portion of code or portion of data via using the real address; and
    tenth instructions for determining whether an event has occurred during the accessing of the portion of code or portion of data, wherein incrementing the counter values in the one or more counter fields is performed in response to a determination that the event has occurred during the access of the portion of code or portion of data.

6. The computer program product of claim 1, wherein the first instructions for associating one or more instructions of a computer program with one or more performance indicators include instructions for associating the one or more performance indicators with a virtual and a real addresses of the one or more instructions in the page table.

7. An apparatus for executing instructions in a data processing system, comprising:
   means for associating one or more instructions of a computer program with one or more performance indicators;
   means for storing the one or more performance indicators in one or more performance indicator fields of a page table;
   means for initiating one or more counter fields in the page table for the one or more instructions in association with corresponding performance indicators of the one or more performance indicators;
   means for incrementing counter values in the one or more counter fields during execution of an instruction of the computer program based on whether the instruction has an associated performance indicator in a performance indicator field of the page table;
   means for storing one or more threshold values in one or more threshold fields of the page table in association with the one or more performance indicator fields and the one or more counter fields, wherein each of the one or more threshold values specifies a maximum counter value in an associated counter field; and
   means for generating a selected action in response to the counter value in an associated counter field exceeding the threshold value in an associated threshold field.

8. The apparatus of claim 7, wherein the means for incrementing counter values in the one or more counter fields during execution of an instruction includes:
   means for determining if an event associated with a performance indicator stored in the one or more performance indicator fields has occurred; and
   means for incrementing the counter value in the associated counter field of the one or more counter fields if the event has occurred.

9. The apparatus of claim 8, wherein the event is a cache miss.

10. The apparatus of claim 7, further comprising:
    means for comparing, upon the occurrence of an event, one or more counter values in the one or more counter fields to a threshold value in the one or more threshold fields, and wherein the means for generating a selected action in response to the counter value in an associated counter field exceeding the threshold value in an associated threshold field, comprises:
    means for generating an interrupt in response to the counter value in the associated counter field exceeding the threshold value in the associated threshold field.

11. The apparatus of claim 7, further comprising:
    means for receiving an access request for portion of code or portion of data, wherein the access request includes an identifier of a virtual address of the portion of code or portion of data;
    means for converting the virtual address to a real address of a storage location of the portion of code or portion of data in a storage device;
    means for accessing the portion of code or portion of data via using the real address; and
    means for determining whether an event has occurred during the accessing of the portion of code or portion of data, wherein incrementing the counter values in the one or more counter fields is performed in response to a determination that the event has occurred during the access of the portion of code or portion of data.

* * * * *